J. H. BAIR.
CALCULATING MACHINE.
APPLICATION FILED SEPT. 21, 1915.

1,371,138.

Patented Mar. 8, 1921.
14 SHEETS—SHEET 4.

Witness
Oscar V. Payne

Inventor,
Joseph H. Bair,
By Knight Bros
Attorneys.

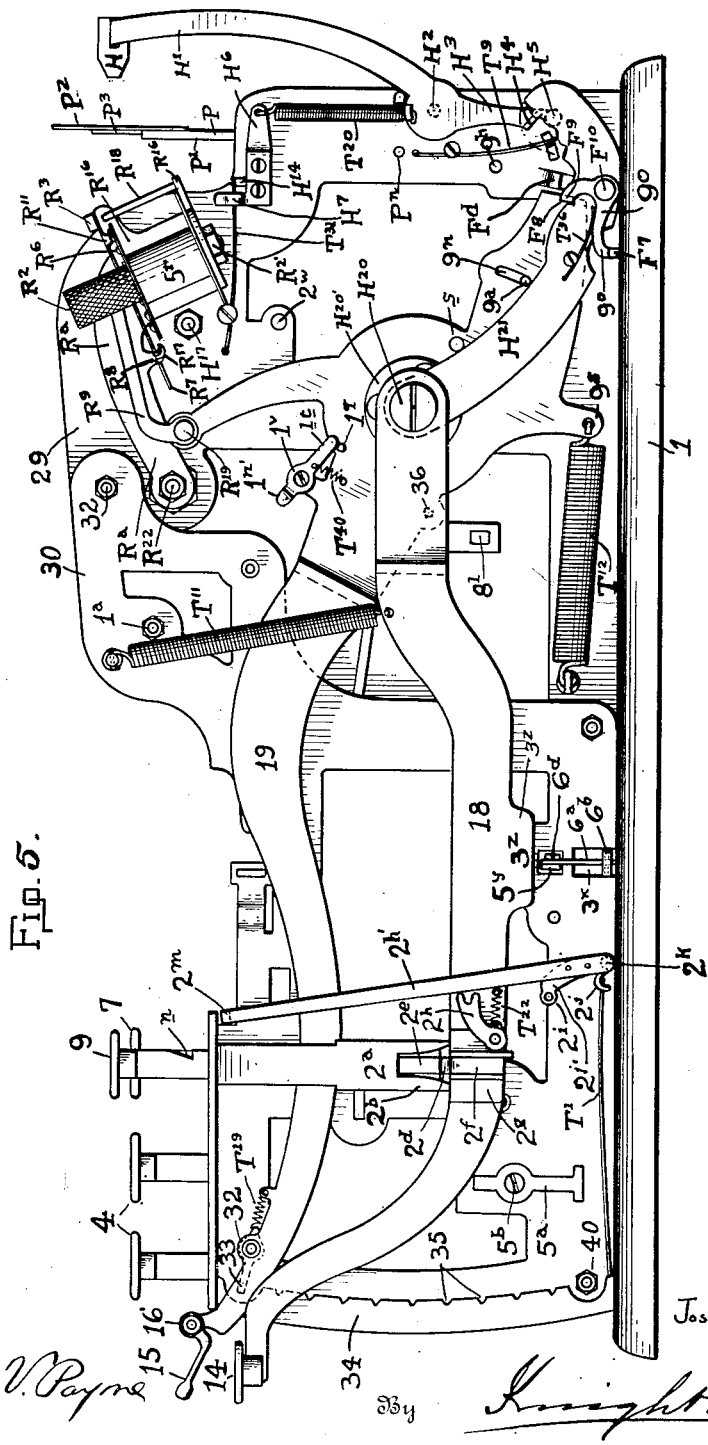

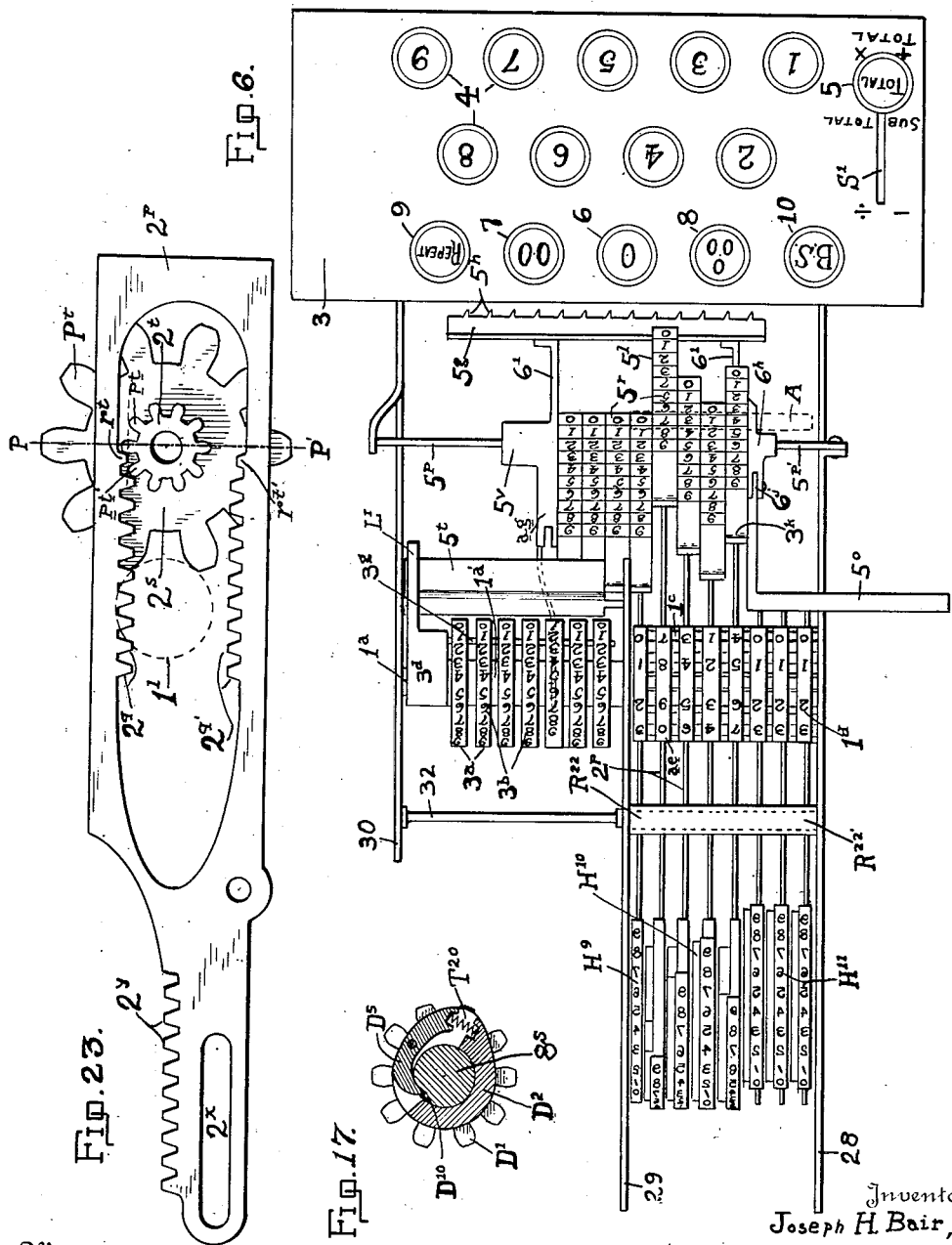

J. H. BAIR.
CALCULATING MACHINE.
APPLICATION FILED SEPT. 21, 1915.
1,371,138.
Patented Mar. 8, 1921.
14 SHEETS—SHEET 7.
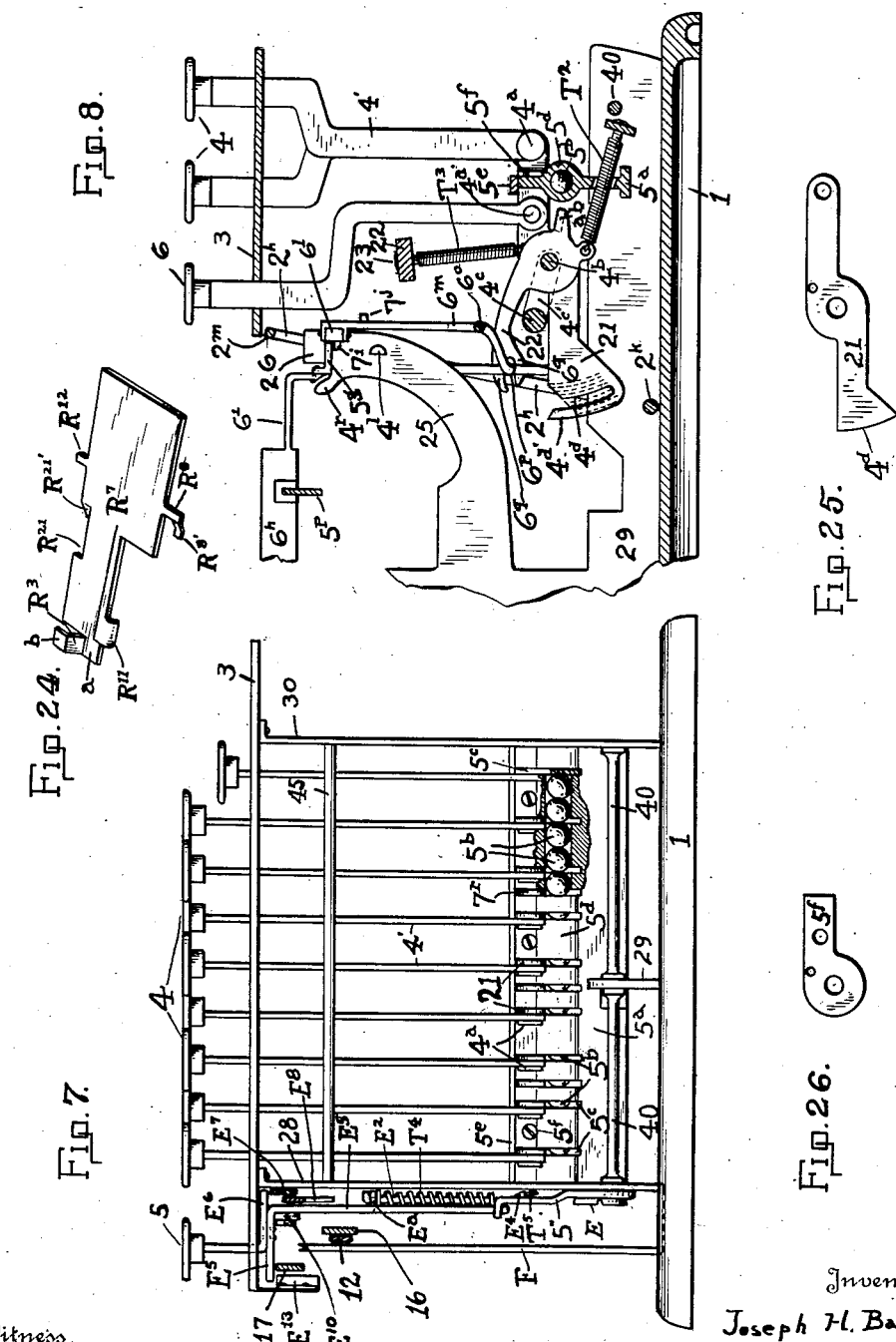
Inventor,
Joseph H. Bair,
By Knight Bros
Attorneys
Witness
Oscar V. Payne J. H. BAIR.
CALCULATING MACHINE.
APPLICATION FILED SEPT. 21, 1915.
1,371,138.
Patented Mar. 8, 1921.
14 SHEETS—SHEET 8.
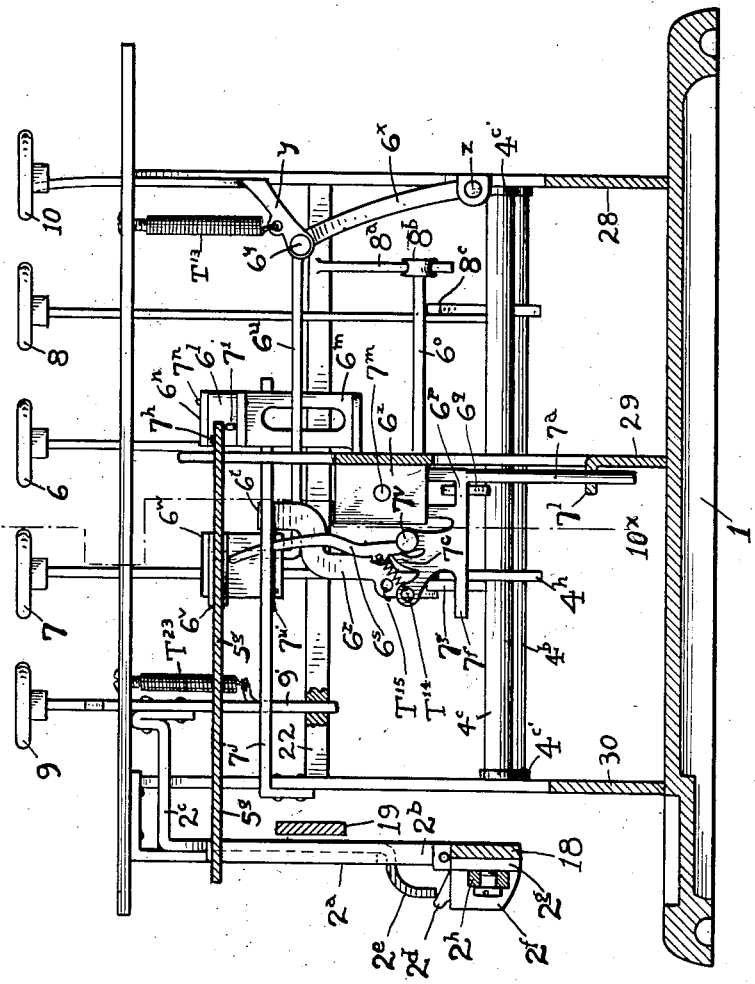
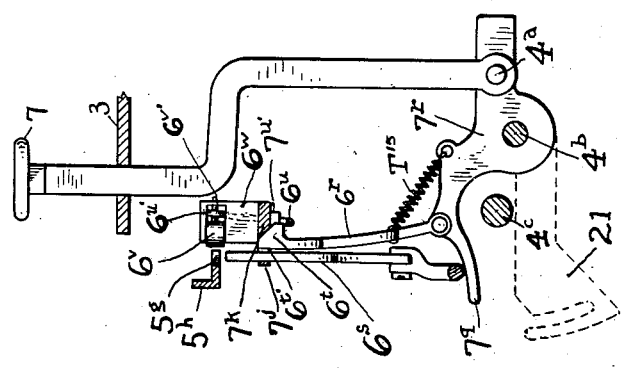
Witness
Oscar V. Payne
Inventor,
Joseph H. Bair,
By Knight Bros,
Attorneys.

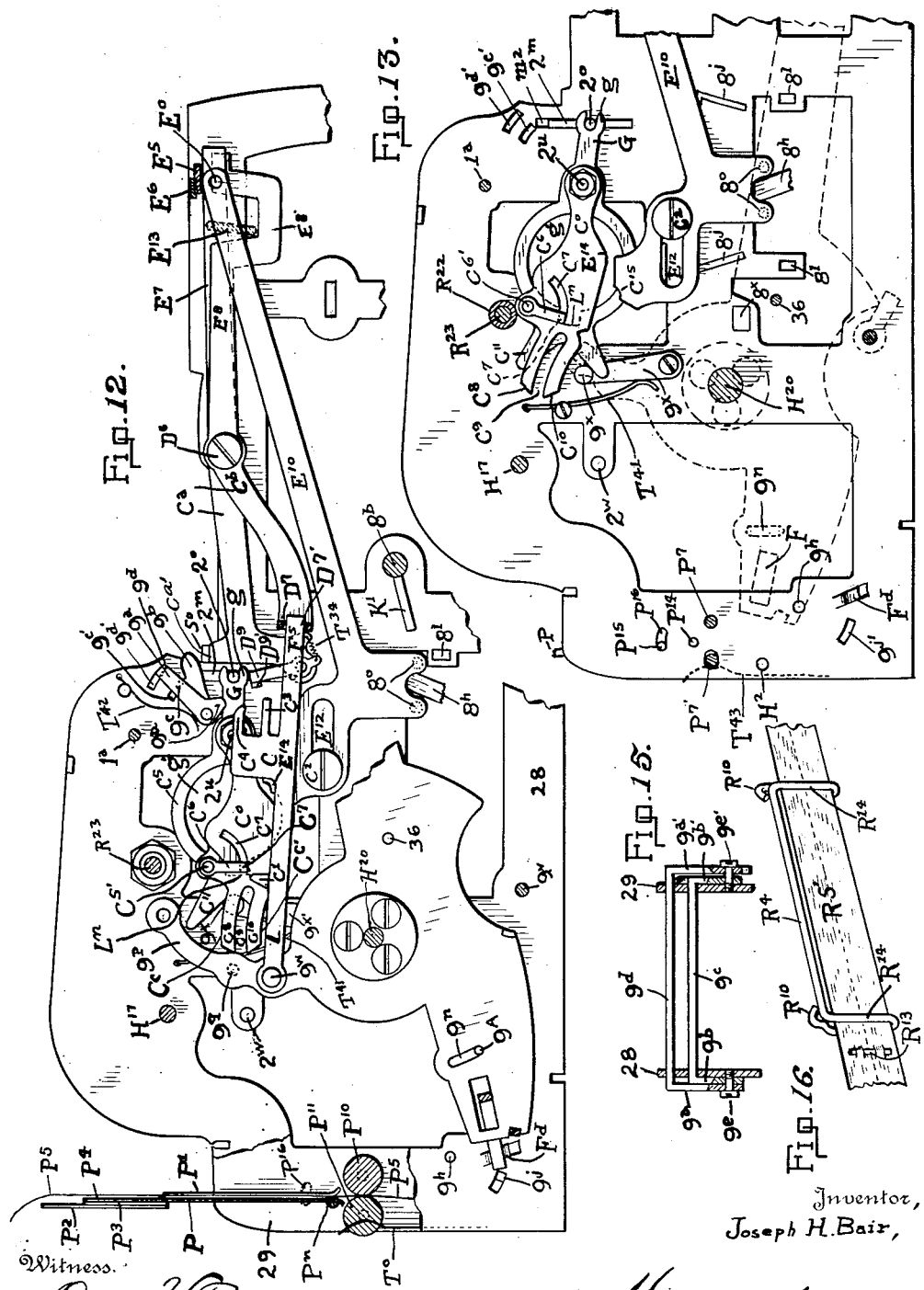

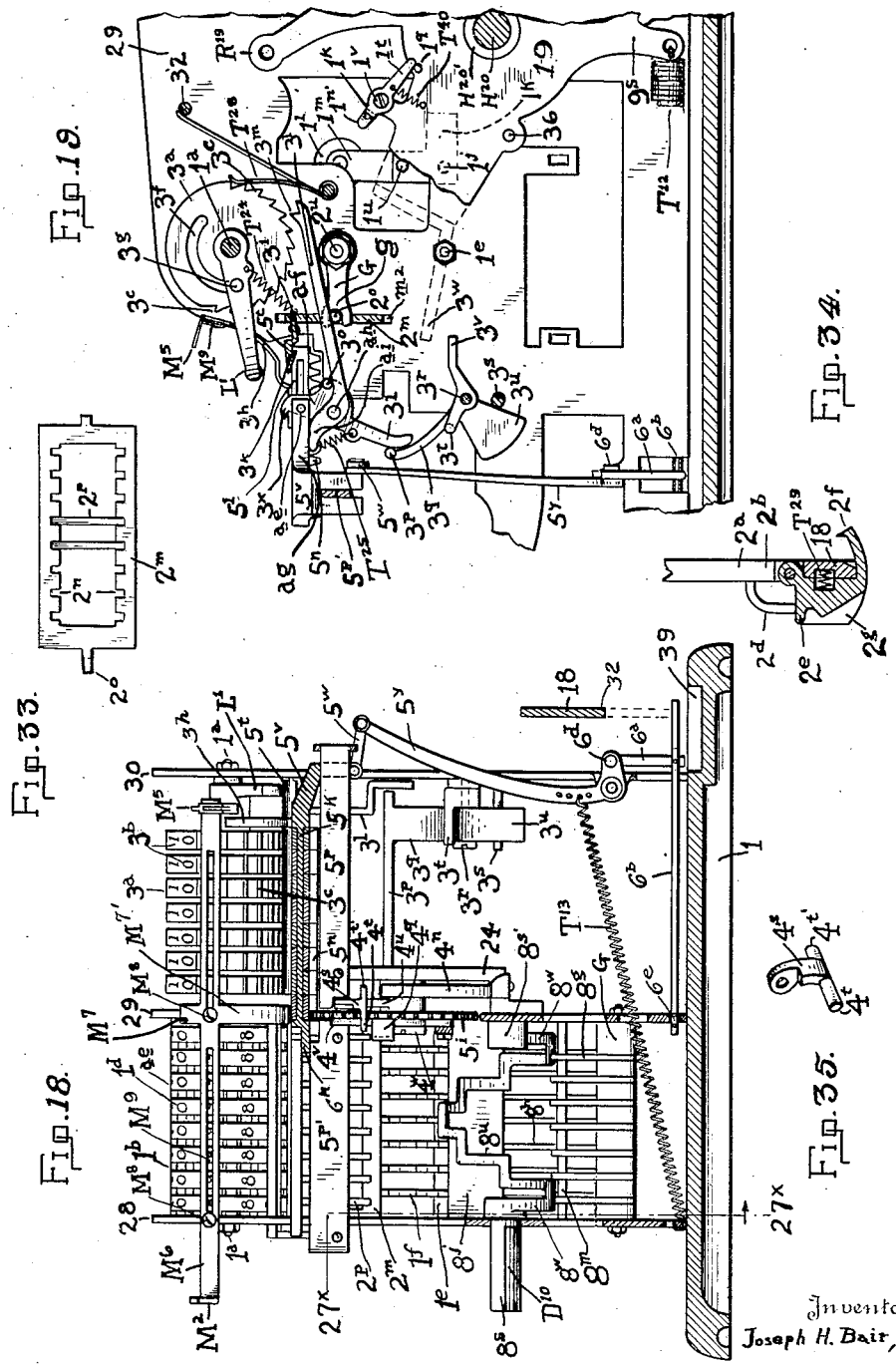

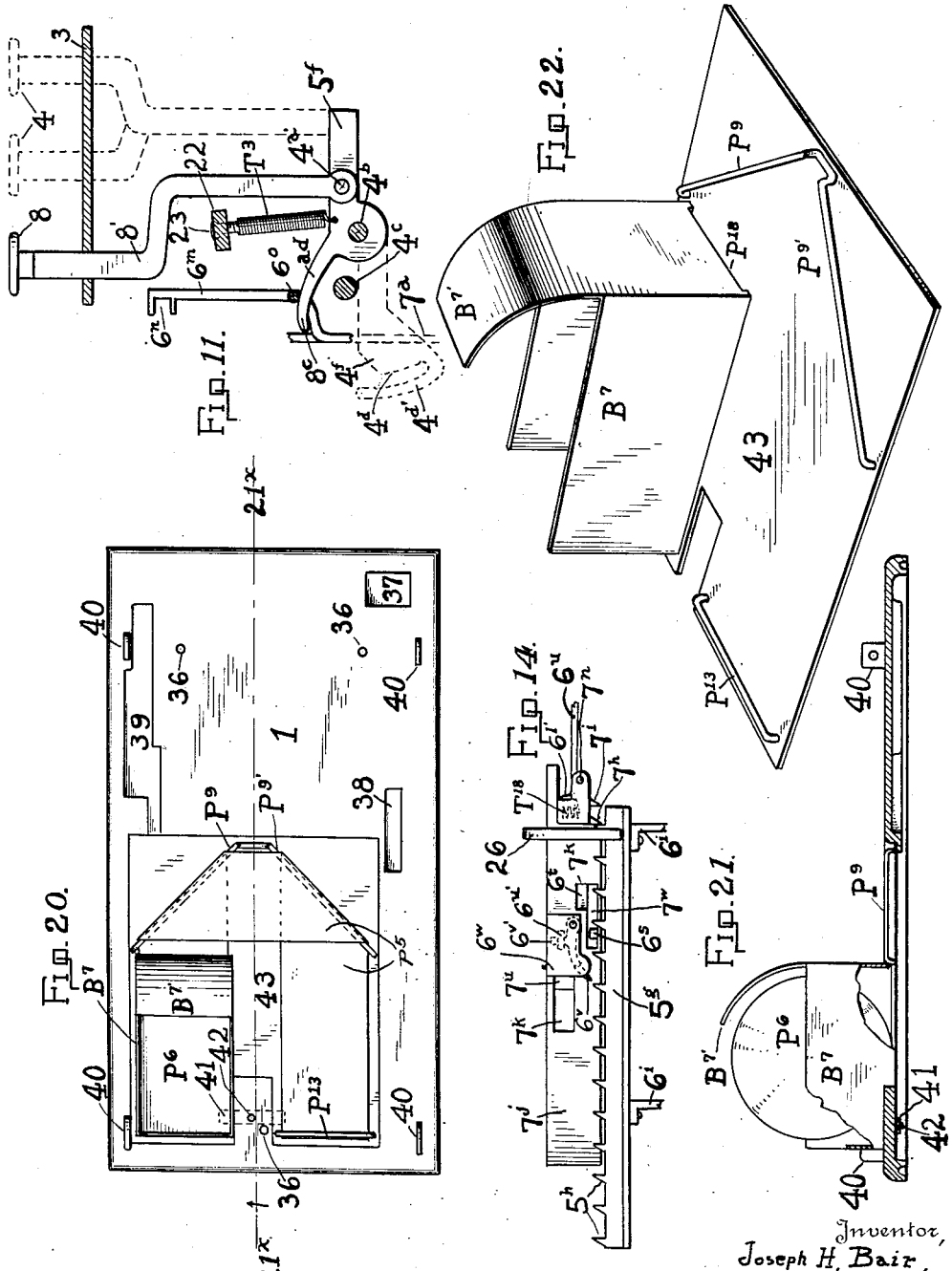

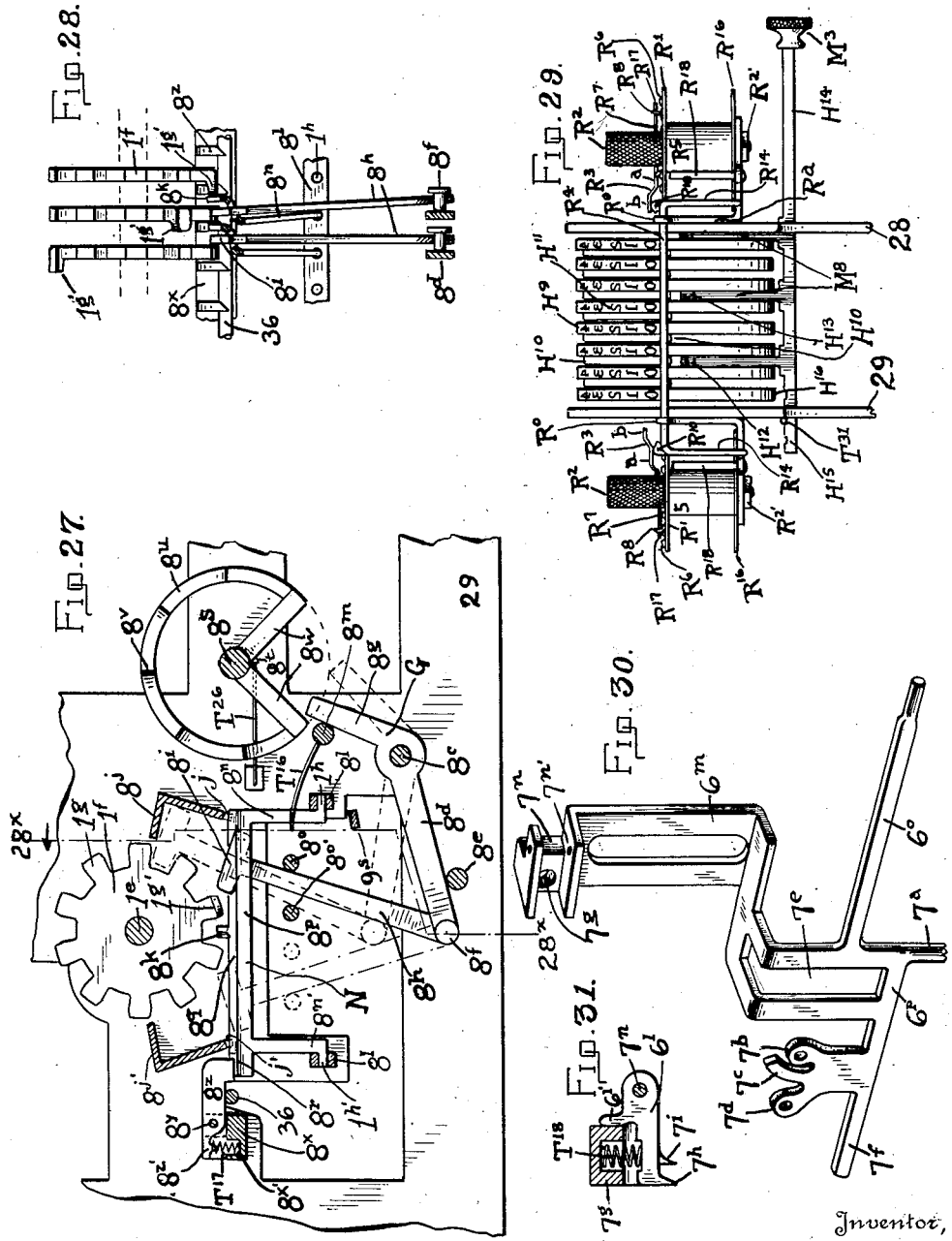

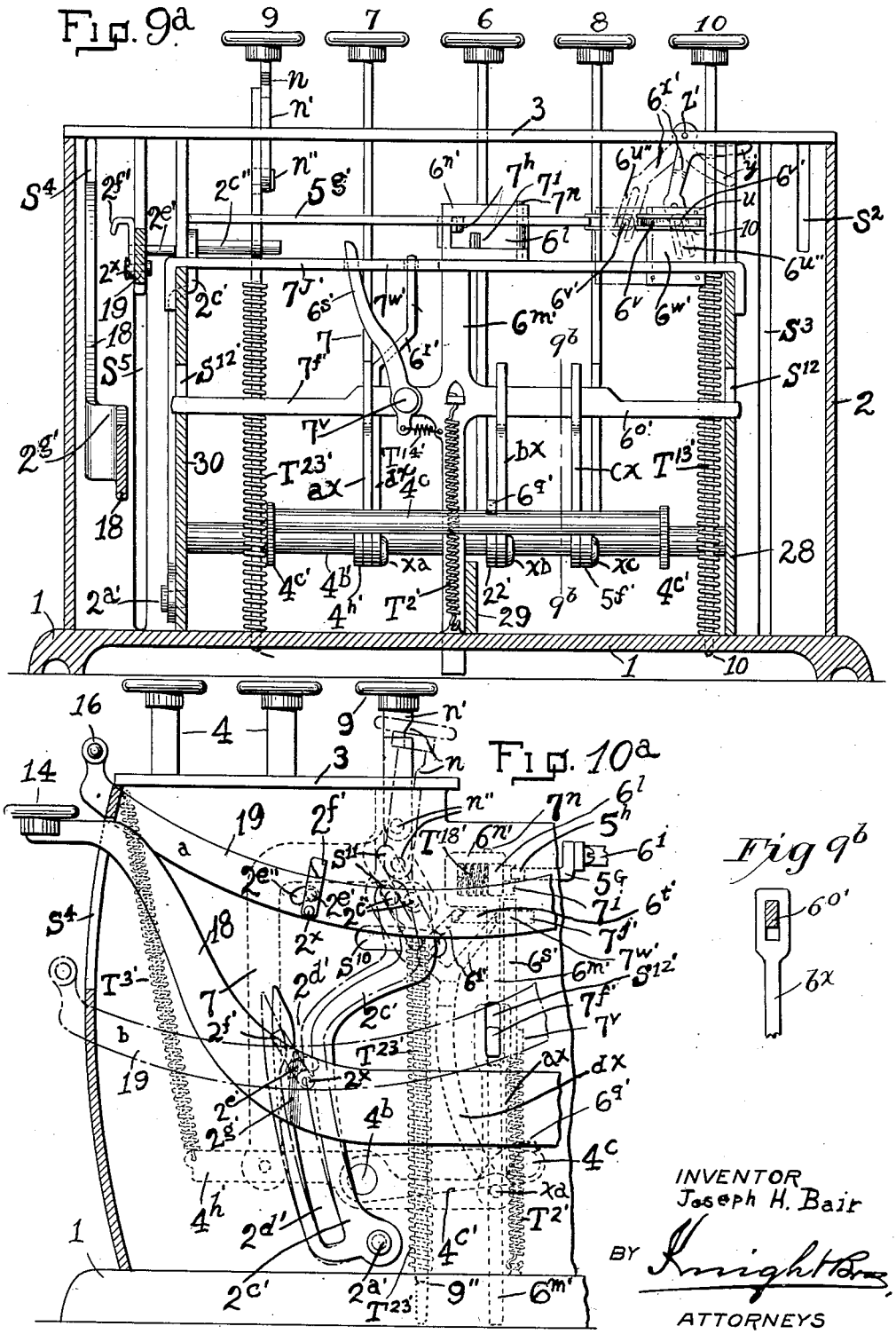

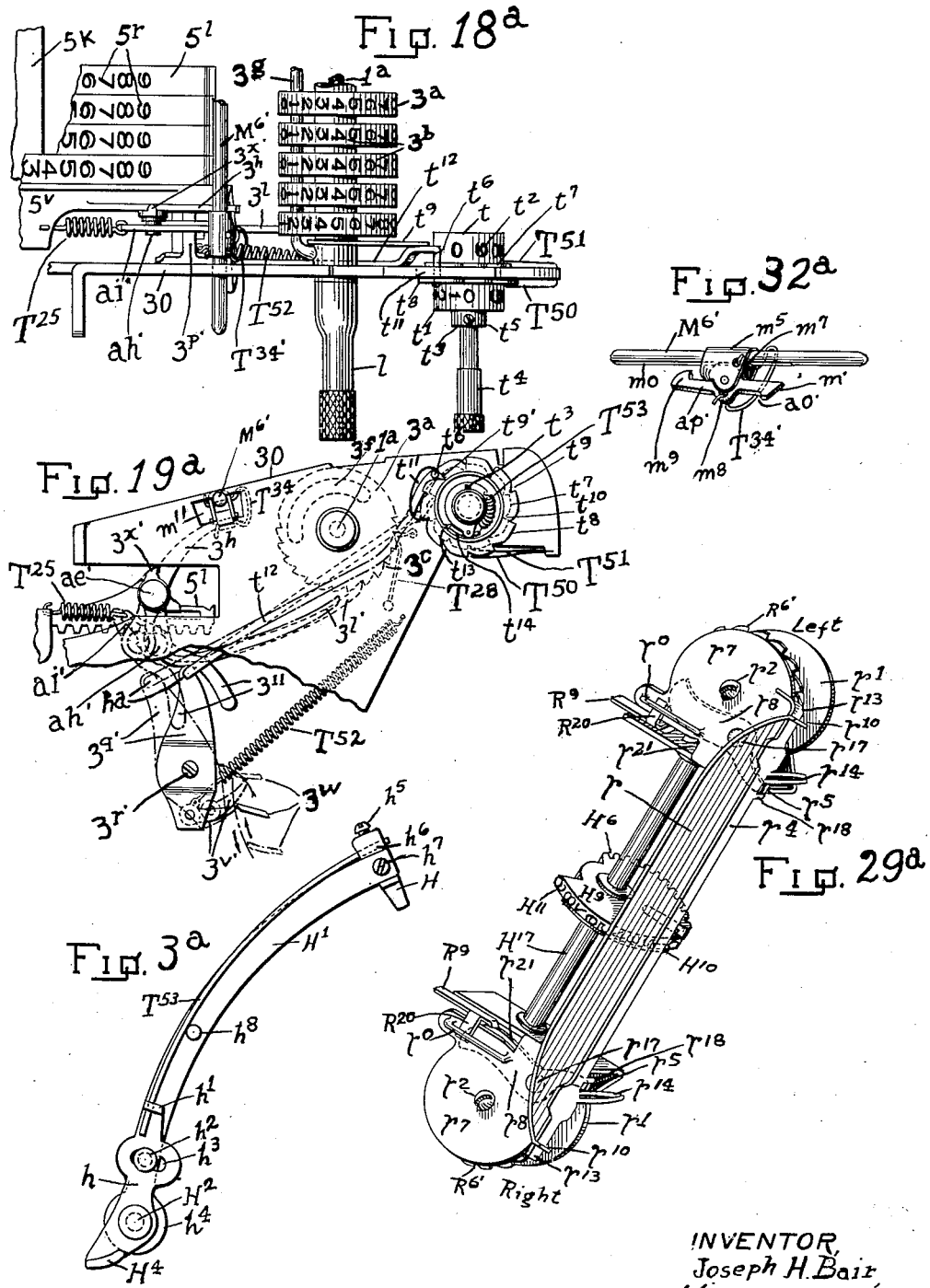

UNITED STATES PATENT OFFICE.

JOSEPH H. BAIR, OF PHILADELPHIA, PENNSYLVANIA, ASSIGNOR OF FIVE-TWENTIETHS TO LEWIS H. TAYLOR, JR., THREE-TWENTIETHS TO JAMES O. DAVID, AND TWO-TWENTIETHS TO WILLIAM C. HADDOCK, ALL OF PHILADELPHIA, PENNSYLVANIA.

CALCULATING-MACHINE.

1,371,138. Specification of Letters Patent. Patented Mar. 8, 1921.

Application filed September 21, 1915. Serial No. 51,875.

*To all whom it may concern:*

Be it known that I, JOSEPH H. BAIR, a citizen of the United States, residing at Philadelphia, in the county of Philadelphia and State of Pennsylvania, have invented certain new and useful Improvements in Calculating-Machines, of which the following is a specification.

My invention relates to calculating machines and particularly to that class known as self-denominating adding machines. In the particular embodiment herein illustrated, it can be operated either as a listing or as a non-listing machine; but the listing mechanism may be omitted if desired.

My invention comprises a simply constructed, simply operated machine, performing with equal facility all the fundamental operations, and embodying accessories, which, arbitrarily combined in various ways by control keys, adapt it to the numerous uses to which calculating machines are applied.

My invention is adapted to be embodied in a machine which is durable, small and compact, so that it may be carried about in a small hand bag or carrying case, or placed conveniently to the work, even upon an open ledger book while computing items therefrom.

My machine comprises a compact keyboard with but one set of numeral keys, and to set up any number, it is required to depress these keys in the order in which a number is read, *i. e.* highest decimal value first and the lowest or unit value last. These numbers appear in a register and move leftward in the order set up. Whenever a mistake in setting up a number is made, the item can be instantly eliminated and reset correctly. The whole key-board including all shift keys and actuating handle (which comprises a depression cross-bar which is comparable to the space-bar on a typewriter key-board) can be operated without changing the position of the forearm. By dispensing with serial columns of digit keys and substituting therefor one set of well arranged digit keys, including one, two and three naught keys, connected with an item register indicating numbers set up, I reduce discrimination, lost motion of hand and eye to a minimum, thus conserving the mental and physical energy of the operator at the same time increasing the speed and accuracy of the work performed. My machine, designed to be hand-operated, can be placed in competition with the elaborate electrically driven machines. Technique in operating is more efficient in my construction than in any other arrangement of operating parts thus far displayed in the development of the art.

My machine provides a total register, overlying the item register from which the number is transferred to it by means of the handle pull. In addition operations, or in multiplication, which is addition repeated the number of times indicated by each digit of the multiplier, with the item carriage previously positioned (as by appropriate strokes of one or more naught keys) to correspond with the decimal position of the digit, the total register accumulates or shows the sum of the respective amounts shown in the item register. In subtraction, or in division which is subtraction repeated with the subtrahend expressed on the item carriage, appropriately located in successive decimal relations to the item register, as by the operation of a back space key, the total register shows the remainder after each operation. To the right and transversely in line with the total register is the decimal register which may denote, in the operation of addition, the number of items of each denomination added, while in division, it develops the quotient, and in multiplication, the multiplier as the operations proceed. The item register is operated by means of the number keys, while the total register and the decimal register are actuated by the cross-bar operating handle, hereinafter referred to as the handle pull, the total register being controlled both decimally and digitally by the item register, while the decimal register is controlled decimally by the item register and digitally by the number of pulls on the handle.

A denominating device connects the readings of the item and total registers, and is shiftable to enable the operator instantly to change the decimal readings in the respective registers. I have also provided an accessory device for the three registers just described, whereby, in division, it automatically "brings down" the next number and makes division as easy as addition, as neither complements nor trial divisor are required.

My invention embodies a machine which provides a very simple and unique recording mechanism. A cross hammer impresses the rubber-dam, paper and ribbon (when this form of inking is preferred) against such of the type as are in the printing position. The printing is done in full view of the operator, and immediately upon the impression, the hammer and the paper holder move back and the paper is fed up one step so as to show the recorded item to still greater advantage. The item printed is always punctuated, and I can change the punctuation in any way required by a single shift button. By the arrangement which my machine provides, of transmitting and punctuating devices, all sorts of decimals can be added, subtracted and recorded, and the punctuation is shown in the registers as well as in the records. By means of an unshifting key, the entire printing mechanism can be left in an inactive position and the machine can be operated as a non-listing machine. Or the printing mechanism may be wholly omitted without affecting the integrity of the calculating machine.

I determine the character of operation of the entire calculating mechanism, with one shift key which is placed to the left of the numeral keys and is designated as total key. Throwing it to one position, the machine adds; to another, it causes the machine to subtract. In an intermediate position, it non-adds, i. e. the item in the item register is transferred to the printed record without affecting the total register. Depressing this key in the non-add position, causes the machine to take a sub-total, and depressing it in the add position, causes printing of the total and clearing of the total register. Total and sub-total are always printed in a different color from the other items, but any item may be printed in the different color by depressing a key provided for the purpose.

In multiplication and division are involved as accessories, the repeat, the back space and the one, two and three naught keys. While the repeat key is effective, the item set up by the numeral keys remains stationary and is not eliminated by the depression of the operating cross-bar. By each depression of the back space key, the carriage is moved one decimal step to the right, thus dividing the item by ten, or bringing it one decimal denomination lower. This key is used in division. Depressing the naught key moves the item leftward one step, multiplying the item by ten, or raising it into the next higher denomination. By depressing the two or three naught keys, the item shifts two or three decimal places, as the case may be, and is multiplied by either one hundred or by one thousand. These naught keys are escapement keys which allow the item-bearing carriage to advance either one, two or three steps upon their respective depression. Each of the numeral keys depressed effects the escapement one step to the left.

A peculiar and very advantageous feature of the decimal escapement is its connection with naught printing. As many decimal places (or steps) as the item-bearing stop carriage is advanced by the operation of the naught keys, so many naughts are shown in the item register and will be printed on the paper record. An item containing naughts of any predetermined number up to the limit of decimal places provided by the machine, either before or after a digit, can be printed. Any number of naughts can precede a numeral item (as e. g., .0009), and in connection with the punctuating device, its decimal value is denoted on the printed record.

A special feature of my machine is the advantageous arrangement of the operating lever. It is customary in machines of this class, to place the operating crank at the right-hand side of the machine, the handle end being up and forward of the keyboard. The item is set up on the keyboard of whatever form by the right hand. Then it is required to thrust this hand forward and upward, grasp the handle, pull it forward and downward through an arc of not less than a quarter revolution. The hand now leaves the handle in the down position and returns to the keyboard to set up next item. If the keyboard happens to be one of the denominating type where the hand must select both the proper decimal row and the key of the proper digital value therein, the movement required and the discrimination necessary—the mental and physical effort— are the maximum, while speed and accuracy are the minimum. Many efforts have been made, by those advancing the art, to increase accuracy and speed and decrease the effort and personal equation of the operator, but usually at the expense of a more elaborate and bulky mechanism operated by motor power. The amount of movement necessary and of energy expended in operating my machine by means of my cross-bar lever is not much greater than that expended in operating a power driven machine. Any machine power driven or actuated by a side handle must necessarily be bulky, else the handle pull will jerk it off its base or fumble it about; whereas my machine, weighing but a few pounds, will remain firmly on its support while being actuated, because the power applied to the actuating bar will be weight added to the machine which holds it firmly in its position on the support.

My invention meets the requirement of making the machine do more and the operator less and the resultant mechanism embodies the following combination of factors and points: a self-denominating setting-up mechanism; an actuating depression crossbar, backward of the setting-up mechanism; item, total and decimal registers; simple control and locking mechanism; self-denominators for the registers and printing mechanism; means for dividing and subtracting without use of complements; recording mechanism which can be included or excluded from a calculating operation, or which can be operated independently of the calculating mechanism, all in a compact portable machine with all the operating parts, registers and recorders and records in full view all the time, as fully set forth hereinafter, and as illustrated in the accompanying drawings, in which—

Figure 3:
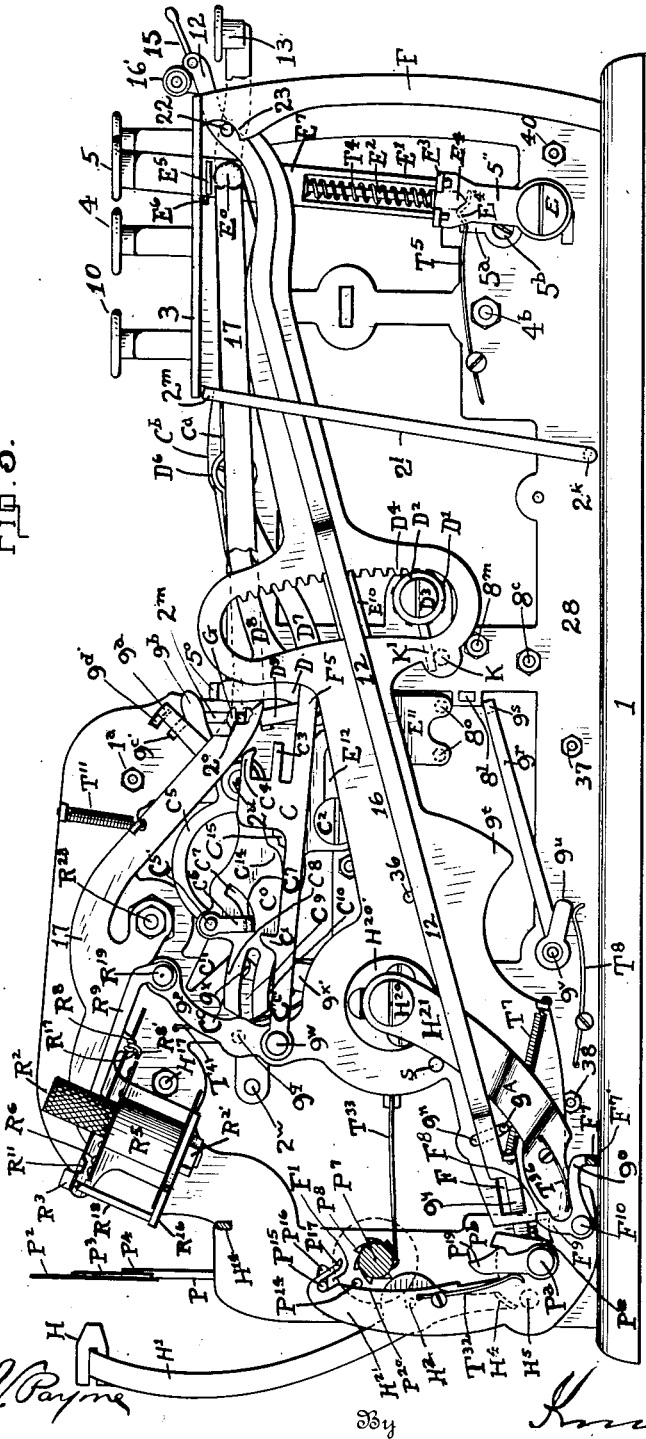
Fig. 3 is a left side view showing the unlocking and actuating mechanism, also printing-actuating and printing-shifting mechanism.

Fig. 3ª is a detail view showing the preferred construction of the printing hammer shown in Fig. 3.

Figure 4:
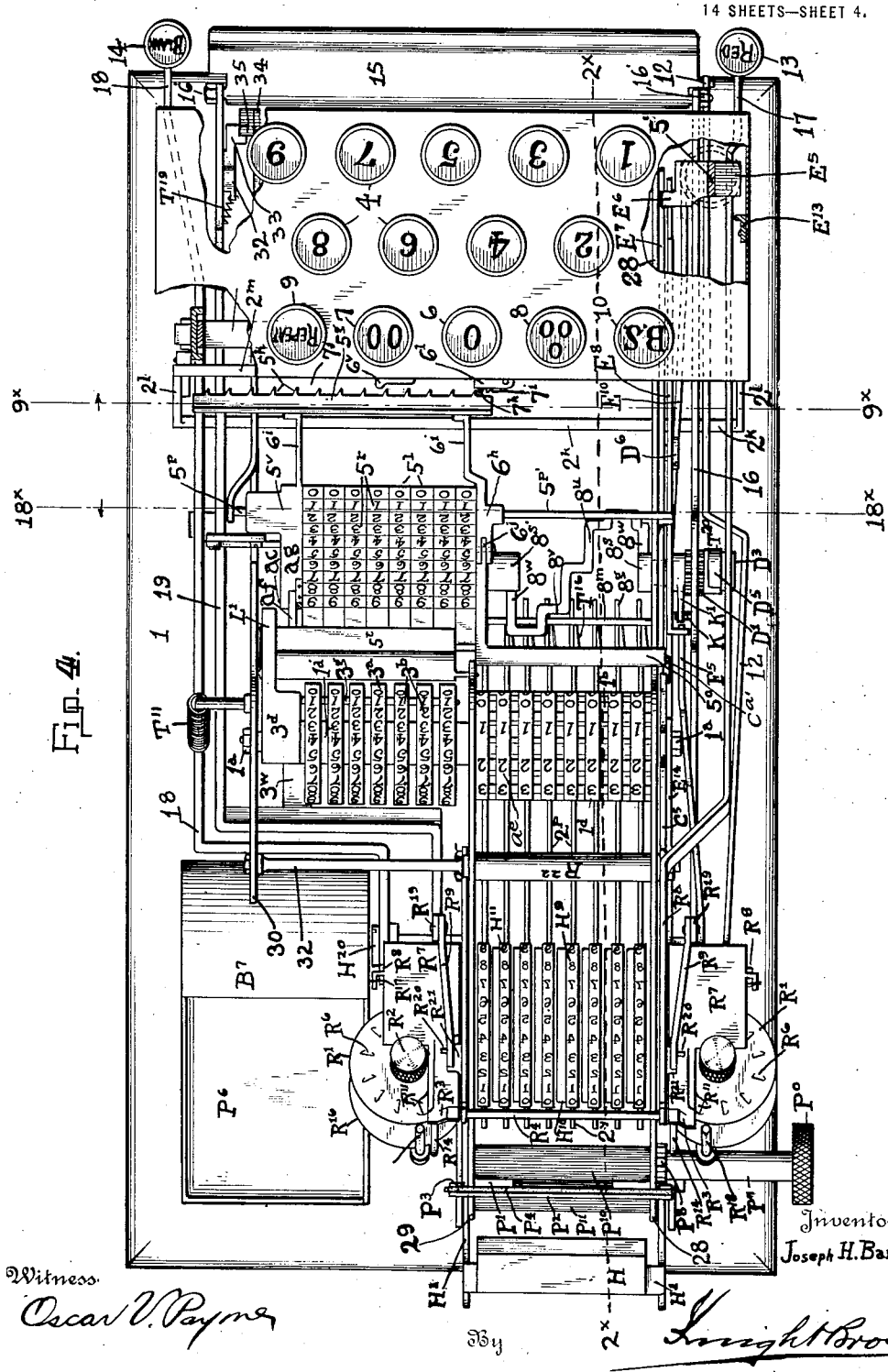

Fig. 4 is a plan view with the cover, except the keyboard plate, removed.

Fig. 5 is a right side view showing the actuating arm, blanking arm, locking, item-eliminating and resetting mechanism.

Fig. 6 is part of a plan view showing the relation between the item mechanism and the transmitting and printing mechanism when an item is set up.

Fig. 7 is a front elevation, partly in section, showing key bars and levers and key-locking mechanism.

Fig. 8 is a left side view of the front part of the machine, showing the relation of one of the number keys and the one naught key.

Fig. 9 is an enlarged view in transverse section through the front part of the machine, on line 9ˣ—9ˣ, Fig. 4, looking toward the front, showing the escapement and the back-spacing mechanism, also the one, two and three naught keys in the middle, the back-space key to the right and the repeat key with its accessories to the left.

Fig. 9ª is a view similar to Fig. 9, showing the preferred construction of the back space, the multiple naught keys, and the repeat mechanism.

Fig. 9ᵇ is a detail sectional view taken on line 9ᵇ—9ᵇ of Fig. 9ª illustrating a detail of the "one" naught key.

Fig. 10, also enlarged, shows a side view of the escapement mechanism and the two naught key, on the line 10ˣ—10ˣ, Fig. 9.

Fig. 10ª is an enlarged side view of the front end of the machine, showing by full and broken lines the preferred construction of repeat mechanism, and by dotted lines, modified construction of the multiple naught spacing mechanism.

Fig. 11 is a side view of the three naught key and its actuated parts.

Fig. 12 is a view of parts disclosed in Fig. 3, showing detail of shifting mechanism for addition, subtraction and total-taking, with total key set for addition, and before actuation.

Fig. 13 shows parts of Figs. 3 and 12 when actuated, and set for subtraction.

Fig. 14 shows in plan the escapement rack of the indicating stop-carriage also top of escapement pawl and of back-space pawl, with mountings.

Fig. 15 is a detail of total and sub-total cross-bars.

Fig. 16 is a perspective view of ribbon-holding and ribbon-reverse piece showing ribbon held thereby.

Fig. 17 is a detail of pinion and pawl on end shaft of spiral drum.

Fig. 18 is a transverse section through the front of the machine on line 18ˣ—18ˣ of Fig. 4, looking toward the rear of the machine. Above on the left are shown the total wheels and the spiral drum with the tens-carrying mechanism below. On the right above are the decimal counter wheels, below in section the indicating stop carriage, and track for said carriage, also parts actuating the decimal counter. Above and in front of both counters is a slide to use in division calculations with indicator fingers thereon.

Fig. 18ª is a detail view, showing in plan, a handle pull register related to the decimal register of Fig. 18; also preferred construction of the division stop.

Fig. 19 is a right side view of the decimal counter and of the indicating stop-carriage, showing actuating relation between the two.

Fig. 19ª is a detail view showing in side elevation, parts shown in Fig. 18ª, the same being the preferred form of the upper left-hand portion of Fig. 19.

Fig. 20 is a plan view of the base upon which the machine is mounted. At the left in position is the removable paper holder with guides showing paper roll and feed.

Fig. 21 is a section of the base on the line

21ˣ—21ˣ of Fig. 20, showing also side elevation of paper roll holder.

Fig. 22 is a perspective view of the paper roll holder showing paper guides.

Fig. 23 is a detail of the reverse double rack blade and pinion of the transmission mechanism.

Fig. 24 is a perspective view of the ribbon feed pawl carrier showing holding spring, incline cam and bearing posts.

Fig. 25 is a detail of "9" key-lever.

Fig. 26 is a detail of the one naught key-lever.

Fig. 27 is a longitudinal section through the tens-carrying mechanism, on the line 27ˣ—27ˣ of Fig. 18.

Fig. 28 is a transverse section of selected parts of the carrying mechanism on the line 28ˣ—28ˣ of Fig. 27.

Fig. 29 is a selected portion of the back of the machine, showing printing wheels, ribbon spools and shift; also punctuating mechanism showing shift button.

Fig. 29ᵃ is a perspective view showing the preferred form of the ribbon mechanism shown in Fig. 29, one of the printing wheels being shown in position.

Fig. 30 is a detail of the reciprocating escapement pawl-carrying part (with pawl removed,) showing also transverse arms by means of which the naught keys actuate it.

Fig. 31 is a section of the upper end of reciprocating arm, shown in Fig. 30, with double-toothed escapement pawl in position.

Fig. 32 is a detail view of a sliding finger for the division indicating slide shown in Fig. 18.

Fig. 32ᵃ is a detail view of the adjustable stop on the division bar shown in Figs. 18 and 32.

Fig. 33 is the shiftable guide piece through which the double rack blades (sown in Fig. 23) slide, showing two of the blades in position.

Fig. 34 is a detail of a detent manipulated by the repeat key.

Fig. 35 is a detail of the setting-up pawl, and,

Fig. 36 is a detail of a slide piece which disconnects the printing mechanism.

Figure 1:
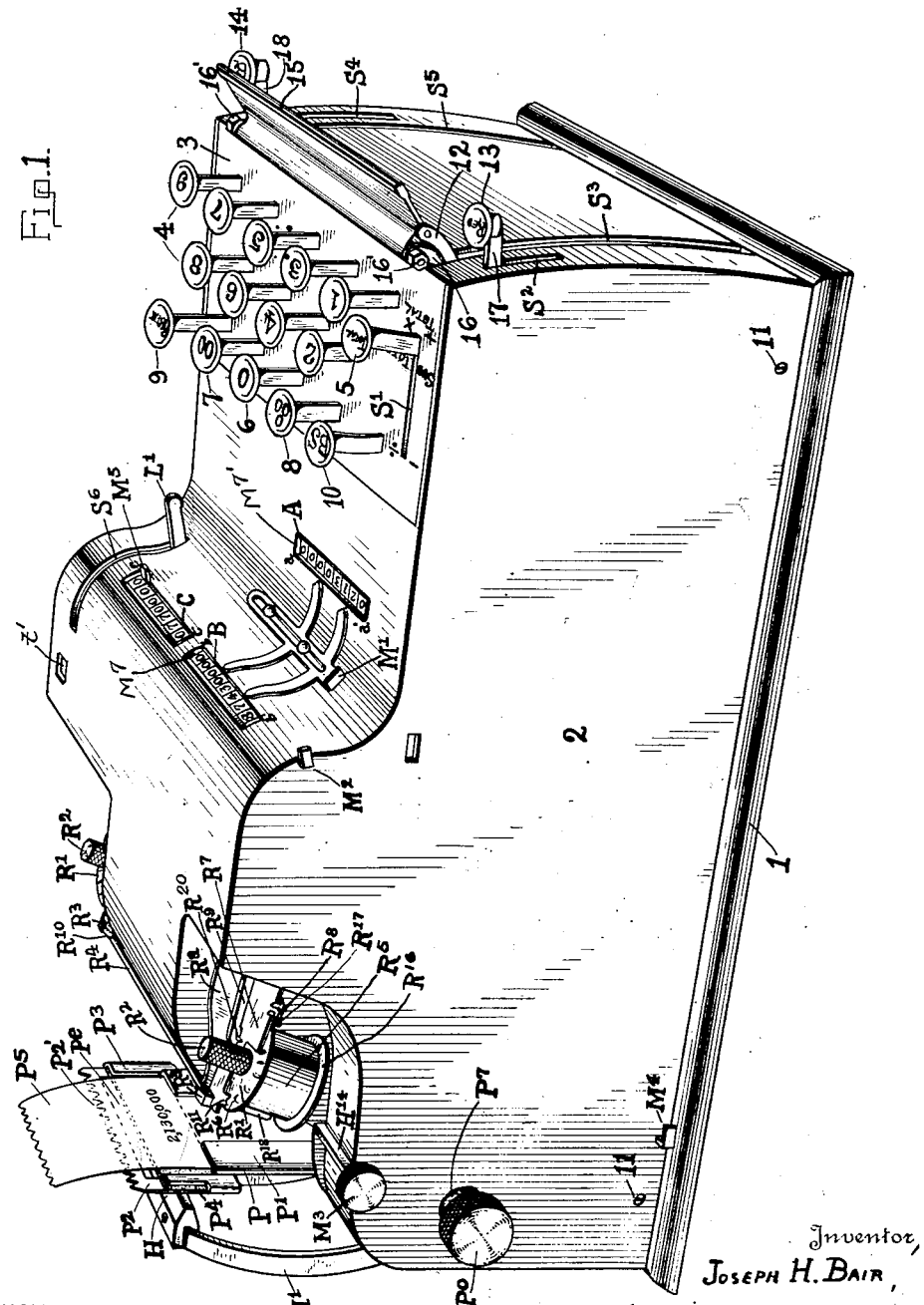
Figure 1 is a perspective view of the machine housed and ready for operation.

Referring now to Fig. 1, the machine has a base 1 supporting the frames mounting the working parts, which are inclosed by a casing 2, at the front end of which is a key plate 3, through which project depressible key-levers 4' supporting key tabs 4 with characters thereon. At the front of the machine is a cross-bar 15 mounted pivotally at 16 at both ends on the free ends of depressible bars 12 and 19 projecting through slots $S^3$ and $S^5$ of casing 2 (see also Fig. 4). On the right side of the front, projecting through slot $S^4$, is eliminating arm 18 having at its free end key 14 marked "B¹". On the left side of the front projecting through slot $S^2$ in the casing, is the two-color ribbon control-arm 17 with key tab 13 marked "Red". The keyboard contains fifteen keys. The first row on the front contains the odd numbers; the second row the even numbers. The top row contains the naught (6), two naught (7) and three naught (8) keys; also repeat (9) and back-space (10) keys. On the left in a slot $S^1$ in the key plate 3, is the shiftable total key 5.

A is the item register. B is the total register and C the decimal register. $L^1$ is the lever to clear decimal register C by pushing it upward in slot $S^6$. $M^1$ is the slide which points off in registers A and B. By means of it, the amount in the respective registers is changed from whole numbers to dollars and cents. $M^2$ is a slide tab used for dividing. $M^5$ is a sliding indicator also connected with $M^2$ in division, as also are the projecting parts of a cross plate $M^6$, Fig. 18. $M^4$ is a tab on slide disconnecting the printing mechanism. $M^3$ is a slide button to shift the punctuating mechanism $M^8$, Fig. 29.

$P^o$ is a knob to unwind the paper $P^5$ from roll $P^6$ (see also Fig. 20), when it is desired to seperate the record part from the rest of the roll by means of knife $P^2$. P is the paper-feeding and paper-holding mechanism. $P^1$ is a flange thereon forming a channel to guide the paper. $P^2$ is a sawtooth cutting-off knife. $P^3$ are slits through which the ends of a rubber dam $P^4$ are pulled, which hold it stretched across the cut-out quadrant for hammer H to strike. $P^5$ is the paper. In the printing operation, paper holder P moves forward resting the paper $P^5$ against the ink ribbon $R^5$, which is stretched across the type on the printing line. Behind the paper is the rubber dam $P^4$. The hammer now moves forward, impressing the paper against the type with ribbon interposed. The hammer and paper quickly move away and the paper is fed up one step for the next impression. All the items on the printed record are in full view.

I will now describe the operation of the machine by means of Fig. 1, and will refer to other figures only where it is necessary to understand the specific construction in order to comprehend the process involved. First problem: Add $67.50, $275.00 and $3,000.00. The operation: Set indicator $M^1$ shown in Fig. 1, so that it will point off for dollars and cents in registers A and B. Pull out punctuator knob $M^3$ one notch so that the decimal point will point two places. Have the total key 5 thrown toward the front as shown by the arithmetical figures on the two ends of slot $S^1$ of the key plate 3 in Fig. 1. Now set up the first number, namely, sixty seven fifty in the order read 6—7—5—0 on the key-board. When the first key—the "6" key is depressed, 6 will appear at *a* in register A. When the second key—the "7" key is depressed, 6 will move one step in the direction of $a^1$ and 7 will replace it. When the third key—the "5" key is depressed, 6 and 7 both move one step toward $a^1$ and 5 appears at *a*. Depressing the fourth key—the "0" key moves 675 over one step toward $a^1$ and 0 appears at *a*. In the item register A now is shown 67.50. Now move the actuating hand backward toward you until the fingers rest on cross-bar 15 which is pivotally held at each end 16 to two operating arms 12 and 19 (Figs. 3 and 5) which are held locked in this upward position. The downward pressure first swings around the free end of the bar 15 so as to move in lock-bar 12 (pivoted to bar 15 at 21) to clear the pin 22 thereon of notch 23 (see Fig. 3). Bar 12, during this unlocking period, is moved forward and unlocks the transmitting mechanism and sets the printing wheels in the position predetermined by the key operation, *i. e.* 67.50 will be placed in the printing line. The cross-bar 15 now being freed, proceeds downward carrying arms 12 and 19 downward through the slots $S^3$ and $S^5$ respectively. The downward movement of the side operating bars 12 and 19, produces the following sequential movements: Paper carrier P moves forward against ribbon $R^5$ and type $T^2$ followed by hammer H taking the impression on paper $P^5$ and both paper holder P and hammer H move back. Paper is shifted for next impression. Printing wheels are pulled back to their locked inactive position and the amount (namely 67.50) is transferred to the total register B. Last operation of the downward movement of handle bar 15 is the elimination of item (namely 67.50) in register A. Now hand leaves bar 15 and hastens to the keyboard in order to set up next item, namely, 275.00. The bar 15 returns by spring action, and on the return stroke operates the tens-carrying mechanism, feeds the ribbon, resets the tens-carrying mechanism and locks bar 15 by swinging upward its free end almost to the level of the top of the keys 4, thus allowing pin 22 to engage notch 23, as shown in Fig. 3.

The next item, 275.00, can be set up before the bar 15 has returned, provided the hand can beat the handle bar 15. The next item is set up similarly to the first, except that the two naught key 7 is depressed once instead of the naught key 6 twice, thus moving 275 toward $a^1$ in register A two steps and throwing up two naughts showing now (in register A) 275.00. The hand again moves back and actuates the machine by means of the depression of bar 15. 275.00 has been printed under 67.50, but in the total register B is shown 342.00, the sum of the two items added. Now the third item is set up, namely, 3,000.00. This requires but three key depressions: first the "3" key, then the three naught key 8, then the two naught key 7. It will be seen that in round numbers, the keys are pressed in the order in which a number, like the above, is read, and denominated as *e. g.* three (the "3" key) thousand (the three naught key) dollars (the two naught key). The item now shown in register A is 3,000.00. The bar 15 is again depressed; the item 3,000.00 is printed below the other two items, and the total register B shows their sum, namely, 3,342.50, and the item register A is clear. Now a finger of the left hand is placed on the total key 5, depressing it, and the actuating bar 15 is depressed with the other hand. The total (3,342.50) is printed in red and the total register B is cleared. The paper $P^5$ containing the printed record is moved up a suitable distance with the hand by means of knob $P^0$ and cut off by means of knife $P^2$. In taking the total, the item register A was not affected and remained clear. The machine is now ready for a new transaction.

The second problem—subtraction: 8,972—6,004 (whole numbers). The operation: Set punctuator $M^1$ for whole numbers *i. e.*, make a point off by threes from the right. Push knob $M^3$ in one notch so that the decimal point is to the right of your printing wheels where it is inactive, and the commas are inserted three spaces apart from the right. Set up by keys 4 minuend 8,972. Suppose a mistake is made and the item in register in A shows 8,872. Depress eliminating key 14 and clear register A. Set up again this time correctly, namely, 8,972. Pull handle *i. e.*, by means of cross bar 15. You now have 8,972 on the printed record and 8,972 in the total register B. Now throw the total key 5 for subtraction, set up subtrahend, 6,004 by the keys, see by item register A that you made no mistake. Pull handle. 6,004 is printed below 8,972 on the paper record, but in the total register B is shown 2,968 which is the difference. Now you can take this in the way the total was taken in the addition example above by depressing total key 5 when set for addition, or by leaving it set for subtraction and setting up the difference 2,968 by means of the keys. Do it by the latter method. Now pull and you will have printed 2,968 similarly to any item, but you will have cleared total register A of its difference item 2,968 by subtraction. In the latter case, the total (or difference) 2,968 will be printed in black unless the red key 13 is depressed while you pull; in which case it prints red and the result is identical with a regular total.

Third problem—multiplication: 645 times 215. Operation: Set total key 5 for addition. Set up 645 with the keys 4. Set the repeat key 9. When the repeat key 9 is operative, the item 645, shown in the register A, will not be eliminated by the handle pull. Every time the handle is pulled 645 is added to itself in the total register B; every handle pull also prints 645 unless the printing mechanism is disconnected by means of slide $M^{4'}$. For this demonstration, we will leave it connected, however. Every handle pull counts in the decimal register C. Now—pull one (registered in counter C)—prints 645 on paper $P^5$, leaves 645 in the register B. Pull two (registering 2 in the counter C) prints 645 underneath the first record and leaves the total register B showing 1,290. When you have made five pulls, you have listed 645 five times. The total register B shows 3,225 and the decimal register C shows 5. Five times 645 is 3,225. Next press the naught key and the item in register A shows 6,450; pull the handle once. You have printed on the paper under the other item 6,450 and the total reads 9,675, and the decimal counter C shows 15, i. e. $645 \times 15 = 9,675$. Press the naught key again. The item in register A now reads 64,500; press the handle once, twice, and the item 64,500 is twice printed on the record with the right hand side kept straight. The total register B now reads 138,675 and the decimal register C reads 215 i. e. $645 \times 215 = 138,675$. Press eliminating key 14 to clear register A. Hold the total key 5 depressed while pulling handle and you print 138,675 the product, and leave the total register B cleared. Clear register C by means of arm $L^1$ and tear off the record and you are ready for the next transaction.

The fourth problem—division: 19,980÷36: Set up by means of the keys 4 the dividend 19,980. Press the handle and you have printed on the paper the item 19,980 and you have 19,980 in the total register B. Set up 36. Press the naught key 6 once, twice, the item is now 3,600, but you have by means of the naughts moved over the 36 (in register A) toward $a^1$ until 36 is under 199. Now pull out tab $M^2$ so that finger $M^7$ (see Figs. 1 and 18) leaves 199 of item 19,980 in register B to its left and finger $M^{7'}$ leaves 36 of item 3,600 in register A, to its left, and the 36 therein stands directly under 199. Push finger $M^5$ in the direction of $c^1$ in register C until it stops, which in this case is at the fourth decimal position. Set down the repeat key and throw the total lever 5 for subtraction. Pull the actuating handle 15. You have printed on the record under the 19,980, 3,600. The 36 stands still because of the depressed repeat key 9. You have subtracted 36 from 199 and register B now reads 163. The register C shows 1 over finger $M^5$. Keep on pulling bar 15, each time writing 3,600, on the record and in the total register B decreasing the amount successively by 36, and after pulling five times leaves only 19, which is less than 36 the divisor, remaining in the register B. Press the back space key 10. The 36 in register A is moved one step toward a; the 8 is uncovered (corresponding to bringing down the next number as in long division) showing now 198 in the register B and finger $M^5$ is moved one step toward c in register C. 36 is now in line with 198. Press the handle bar 15. 360 is printed directly under the 3,600 series. 198 has been decreased by 36 in total register B and stands 162. Decimal register C shows 51. Keep on pulling bar 15 successively until the item in register B is less than 36. You stop at 5 when C shows 55 and B shows 18 (which is less than the divisor 36). Back space brings down next number in B (showing 180) and pushes 36 another step toward a in register A. The 36 is now under 180. Pull—you have 36 under the series 3,600, and 360 on the printed record. The 180 in the total register B has been decreased by 36 to 144. Register C shows 551. Keep on pulling bar 15. You pull five times—it comes out even. The total register is clear. The quotient register C shows 555. The item register A shows 36, the divisor. The entire transaction is before you. 19,980÷36 equals 555, both on the paper and in the registers. The operation was performed without use of complements or of trial divisor. As the total register B is clear, no total need be taken. Had the dividend been 19,990, there would have been a remainder of 10. This remainder would be written same as a total.

Another special feature of my machine is decimal calculating and decimal writing. This I shall illustrate by another example. If one wishes to write in three decimal places pull out knob $M^3$ two notches, so that the period will print three places to the right, e. g., .009; pull tab $M^1$ toward $a^1$ $b^1$ same as in whole numbers. Problem, addition of decimals:

$$.002 + 1.6 + .021 = ?$$

See that total lever 5 is set for addition. Depress the two naught and the two keys respectively. Pull handle. The printed record shows .002. The total register B shows 2. Now set up 1.6, but as it is required to keep decimal point straight, you must press in their order 1—6—00. Pull handle. Item printed is 1.600. Total B shows 1.602. Set up third item 0—2—1. Pull handle. Printed record shows .021. Total shows 1.623. Take total which shows printed 1.623. Were you to add .009 and .014, you could not print the sum by pulling total. Total if normally printed would show 23. You would instead copy the total B into item register A by means of the keys 0—2—3. Set total key 5 for subtraction.

Pull handle and the item printed is .023 and the total register B is cleared.

The detail of construction of my machine whereby the above transactions are accomplished, is embodied and illustrated in the accompanying drawings, already identified, which I shall now describe. For the sake of convenience and clearness, I shall divide the description into the following general heads according to the functions of the machine: The Setting-Up Mechanism; The Transmitting Mechanism; The Actuating Mechanism, and The Printing Mechanism. Each general head will again be divided into its several convenient sub-heads, as e. g., the setting-up mechanism will be elaborated under descriptions of the keyboard, selecting mechanism, the indicating stop carriage, escapement mechanism, naught keys, back-space key, etc.

*The setting-up mechanism.*

In a ten-key machine, the denominating is automatic by means of a transversely moving stop mechanism which is advanced step by step, by the successive action of the keys, and which has as many stop series as the machine has decimal capacity. The stop series pass the setting-up point leftward in their order, and the key struck for that series sets the stop of the series corresponding to the key struck. I accomplish the same result in a much simpler way than my predecessors. I have a carriage (Figs. 2 and 6) made up of slidable racks $5^1$ passing successively over a pinion $5^i$ of the same pitch. This pinion is actuated by the keys 4 and slides the racks forward the number of teeth represented by the key depressed. The top of the rack has a series of numbers $5^r$ which indicate in register A, the numbers set up.

Figure 2:
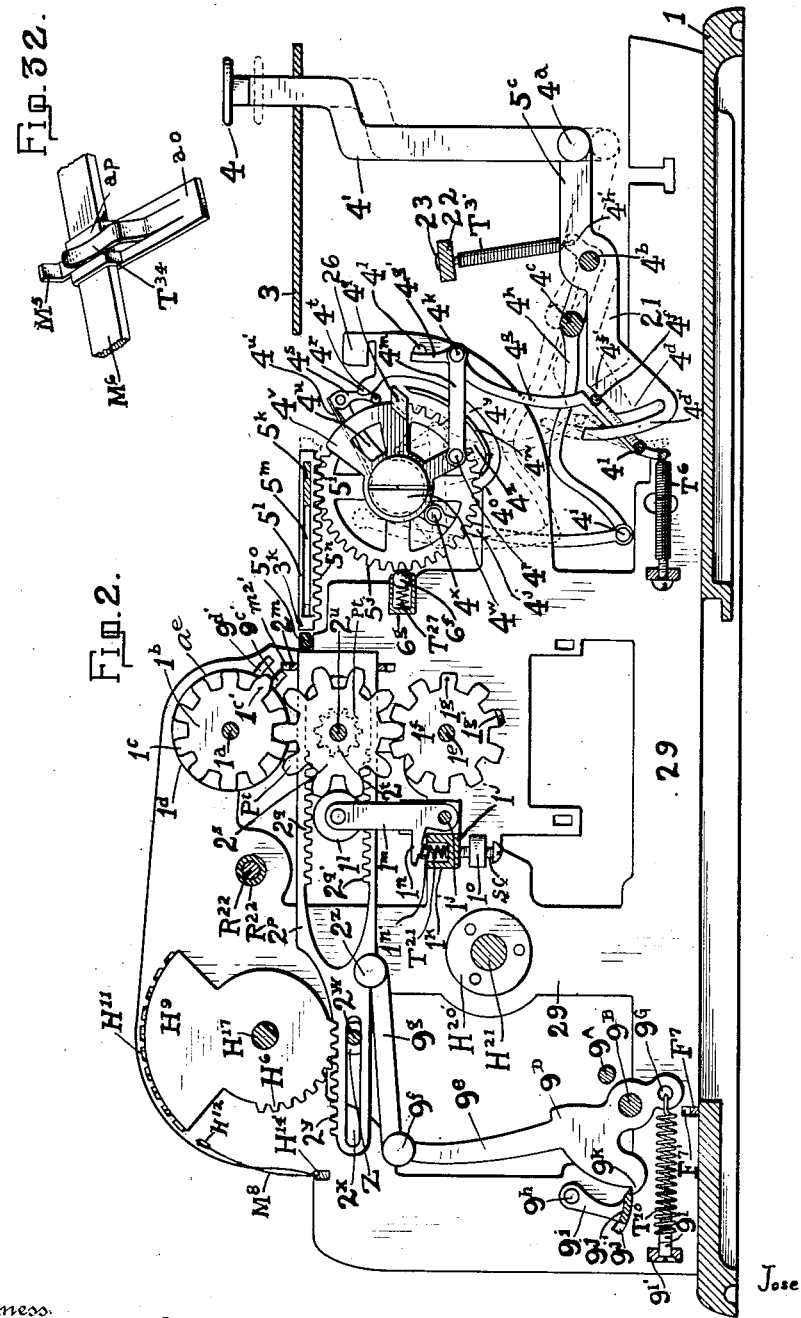
Fig. 2 is a longitudinal view through the machine on line 2ˣ—2ˣ of Fig. 6, showing by selected parts the relation of the setting-up with the transmitting, registering and recording parts.

*The keys.*—The operator sets up any item, as already described, by the successive manipulation of the numeral and naught keys in the order in which a number is read. The keys are arranged in a keyboard 3, through which the key arms $4^1$ with the number tabs 4 thereon project upward, suitable to be depressed. The key arm $4^1$ is pivoted to key levers 21 by means of stud $4^a$. Lever 21 is journaled on cross shaft $4^b$ (Figs. 2 and 8). The rearward end of lever 21 rests in a slot $5^c$ of the cross piece $5^a$ having channel $5^b$ for balls $5^d$. Covering top of slot $5^c$ on cross piece $5^a$ is plate $5^e$ which forms a stop or support for key levers 21 resting in slot $5^c$ and pulled up by spring $T^3$ (Fig. 8). The balls $5^d$ fill up the channel $5^b$ with the exception of the space the width of the thickness of key lever 21. Any one lever 21 pressed (in its slot) between the balls takes up this place and every other lever 21 is locked upward and consequently no other key can be depressed until the depressed lever 21 rises up from among the balls and allows displacement somewhere else. This affords the safeguard essential to ten-key adding machines.

The free end of each key lever 21 has on it an incline cam and arc $4^d$. Each numeral key has on it an arc $4^d$ of a different arc face, key "1" having the greatest radius, key "9" the least radius, and the intervening keys having radii of relative length according to their denomination, and an arc face guard $4^{d'}$.

*The setting-up pawl and pinion.*—Against the incline cam $4^d$ of the key levers 21 rests cross rod $4^f$ pivotally mounted at $4'$ in the end frames 28 and 30. On this cross rod is an upwardly extending arm $4^g$ resting against detent $4^l$ as a definite stop. Arm $4^g$ is connected by link $4^m$ to guard $4^v$ pivoted on the same stud $4^w$ which forms the bearing for pinion $5^i$. The outer edge of guard $4^v$ is an arc with a radius but slightly larger than the largest arc described by any tooth $5^j$ of pinion $5^i$. On the lower end of the guard is an inclined race-way $4^q$. When any key is depressed, cross rod $4^f$ slides on incline $4^{f'}$ and tilts up and rests on the arc $4^d$. Arm $4^g$ moves forward and by means of link $4^m$ rocks guard $4^v$ with race-way $4^q$ thereon downward to a predetermined position. The "9" numeral key 4 (see Fig. 25) swings up free of the rod $4^f$, consequently $4^g$ remains at rest against stop $4^l$ and incline $4^q$ also remains in the position shown in Fig. 2. $4^h$ is an arm journaled on the key-bearing cross rod $4^b$ and through it passes another cross rod $4^c$ parallel to its fulcrum $4^b$. $4^c$ and $4^b$ are held in line by a link $4^{c'}$ at each end rigid on rod $4^c$ and with $4^b$ the fulcrum. Now $4^h$ is connected by means of link $4^j$ with a pawl-bearing rock arm $4^u$ pivoted on stud $4^w$ with pinion $5^i$ between it and guard $4^v$. Pawl $4^s$ is pivoted to rock arm $4^u$ as shown in Fig. 18. A small pressure spring $4^{u'}$ rests on the rounded top part of pawl $4^s$ to keep it from turning too freely. Pawl $4^s$ has two laterally extending pins $4^t$ and $4^{t'}$ at its lower free end. When the "9" numeral key 4 is depressed, its bar swinging up will not move the rocking rod $4^f$ (Fig. 2), as its arc face $4^d$ will slide past the rocking rod $4^f$ and consequently $4^v$ will remain (and its cam guide $4^q$ will remain) in the inactive position shown in the drawings. When the end $4^d$ of any key lever 21 moves up, it carries with it, cross rod $4^c$ carrying $4^h$ also, and by means of link $4^j$ moves down rocking pawl arm $4^u$ upon which is pawl $4^s$. When pawl $4^s$ is moved downward, the pin $4^t$ strikes into the cam inclined race-way $4^q$ and deflects the pawl into the tooth, and the forward movement of arm $4^u$, together with the pressure of spring $4^{u'}$ will hold it in mesh with the tooth $5^j$ until the end of the excursion, the length of which is equal to an arc containing 9 teeth of the wheel $5^i$, when it strikes an inclined stop $4^o$ which jams pawl $4^s$ into wheel $5^1$ and locks wheel from spinning, i. e., from exceeding nine notches. Every numeral key depression rocks arm $4^u$ from its up-position of rest to the stop $4^o$. That excursion is over an arc covering nine teeth. If the "8" numeral key 4 is pressed, when guard link $4^v$ with its inclined guide-way $4^q$ moves down one notch or the space between adjacent teeth, and the pawl by means of its pin $4^t$ rides on the guard for one notch free of the pinion, and then enters between the teeth of the wheel $5^1$ by means of the cam-way $4^q$ and advances the pinion only eight notches. Actuating the "1" numeral key 4, rides the pawl free of eight teeth or notches instead of 1 tooth as in the former example and leaves only one after it is thrown into mesh with the pinion $5^1$ by means of incline $4^q$ (Fig. 2). When the "9" key is actuated, the guard $4^v$ remains stationary, and when keys "8" to "1" are actuated, the guard moves a short distance first and then the pawl $4^s$ immediately follows, that is the guard $4^v$ gets a "head start"; however, when the cam-way $4^q$ approaches the selected notch between the teeth of the wheel $5^1$, it slows up and stops in alinement therewith and the pawl $4^s$ keeps on going, enters the cam-way and then the selected notch between the teeth and forces the wheel $5^1$ to rotate upon its axis until the pawl $4^s$ abuts the stop $4^o$. The dotted lines show the parts in the actuated position upon the depression of the "1" key. On the right side of the pawl arm $4^u$ is a segmental flange $4^n$, (see Figs. 2 and 18) which guides pin $4^{t'}$. This flange does not extend as far up as incline $4^q$ at rest so as to afford room for the pin or pawl to pass up into its upper position free of $4^q$. Flange $4^n$ terminates below one tooth short of the stop $4^o$. At this point, it extends upward and in line with incline $4^q$ when it is in position placed by the depression of the "1" key. Going down, the pin $4^{t'}$ on pawl $4^s$ always slides inside of the segmental flange 4 (Fig. 2) and is kept from contacting with the cogs on pinion $5^1$ its predetermined distance, by means of the guard $4^v$. Coming up, it moves out of mesh with the cog against the stop $4^o$ with any resistance whatever and leaves the pinion stand still and from fumbling by means of the spring-pressed ball $6^f$. The pin $4^t$ always passes up outside of flange $4^n$ through the channel $4^y$. At the upper end, it is deflected by guide $4^r$ which throws it against guard $4^u$ in position of rest. A segmental guard $4^{d'}$ (see bottom of Fig. 2) on the free end of each numeral key lever 21 prevents rod $4^f$ from swinging away from the cam $4^d$ when a key 4 is struck with force, or when the pin $4^t$ on pawl $4^s$ strikes incline $4^q$, arm $4^g$ cannot be forced forward, but pawl $4^s$ must engage proper tooth 5 on wheel $5^1$. The rod $4^f$ is brought back after a key 4 is released against stop $4^1$ by means of spring $T^6$. The cross rod $4^c$ tends to drop of its own weight, throwing rock arm $4^u$ up, but it has also a spring $T^3$ (see Fig. 2) similar to the springs $T^3$ of the key lever 21. (Fig. 8.)

*The indicating stop carriage.*—Figs. 4 and 18 show the stop carriage $5^v$ in the cleared position to the right. Fig. 6 shows it after a number of five decimal places has been set up, and the dotted rectangular A indicates the position of the register A with the number, namely 41,370 showing therein. The carriage slides on two transverse blades $5^p$ and $5^{p'}$. Attached to the carriage is a rack $5^g$ with teeth $5^h$, which cooperate with the pawl $6^{1'}$ of the escapement mechanism, Figs. 4, 6 and 14. The carriage frame $5^v$ has a cross plate $5^k$ (Figs. 2, 18 and $18^a$) which extends to the other end piece $6^h$ thereof. Stop racks $5^l$ having channel $5^m$ are slidably strung side by side on cross plate $5^k$. The carriage is advanced step by step as the escapement mechanism (hereinafter more specifically referred to under the heading: "The Escapement Mechanism") allows by means of spring $T^{13}$ pulling on arm $5^y$ attached to carriage $5^v$ by means of link $5^w$ (Fig. 18). Arm $5^y$ and end part $6^h$ have groove slides for plates $5^{p'}$ and $5^p$, respectively. Plate $5^p$ clears the teeth of the racks $5^l$, but plate $5^{p'}$ is as high as the notches between the rack teeth. The pinion wheel $5^1$ over which the carriage $5^v$ passes laterally on the transverse slide plates $5^p$ and $5^{p'}$, has its perpendicular tooth in line with slide blade $5^p$. The carriage when cleared has the first stop rack $5^l$ to the left resting on the pinion $5^1$, with their respective teeth meshed. The rack is about three times as wide as the pinion. The left-hand faces of both rack and pinion are normally in line. Now, the actuation of the pinion, as described in the paragraph preceding, advances the stop rack $5^l$ on the pinion as many teeth as the pinion advances. During the downward movement of a numeral key 4 while the pinion $5^1$ is advancing together with the stop rack $5^l$ resting on it (with their teeth meshing), a half-step escapement takes place, the stop rack in mesh has slid leftward (during its forward movement on the pinion) with the carriage, so that the right face of rack and pinion are now in line. Upon the release by the finger of the depressed key, i. e., upon the return of the key lever 21, the other half-step of the escapement takes place and the stop rack $5^l$ actuated is free of the pinion which is now in mesh with the next stop rack of the carriage to the right. The stop rack which has just moved off from the pinion leftward has caught two of its teeth $5^n$ astride the tooth plate $5^p$, in which position it is locked and slides as the carriage advances leftward. On the top of the slide racks $5^l$ are number series "0" to "9", beginning at the near end with "0", there being a tooth $5^n$ for each number $5^r$. If the carriage is advanced by the action of the naught keys alone, the carriage advances leftward by steps. The cross rod $4^c$ (Fig. 2) is not lifted and consequently pawl arm $4^u$ is not moved. Pinion $5^l$ stands still and only escapement takes place without changing the forward position of the stop rack $5^l$. In Fig. 6, the dotted rectangle A shows the position of the opening for register A, Fig. 1. When the carriage is moved over (without sliding the racks $5^l$ forward) through mere escapement effected with the naught keys, the naughts which are in line on the stop rack will appear in the sight hole A. If the carriage has advanced four steps, four naughts will show. If a stop rack $5^l$ has been slid forward (say five cogs $5^n$) by the use of a numeral key (the "5" key), then the number $5^r$ corresponding to the number of cogs $5^n$ it slid will show in the sight hole A.

The carriage $5^v$ is pulled back to the cleared position shown in Figs. 2, 4 and 18 by means of side arm 18. (Fig. 5.) Moving downward (upon handle pull) and at its lower movement resting on and carrying down the free end of arm $6^b$ (fulcrumed at $6^e$) by means of link $6^a$, bell crank $5^y$, and link $5^w$, $5^v$ is returned (Figs. 18 and 19). Upon the return of the handle 18 (Fig. 5), notched dog $2^h$ thereon is below loop $2^l$ and resting against loop arm $2^{l'}$, and when it (handle 18) rises, loop $2^l$ engages notch in dog $2^h$, which dog now forms a thrust link with its fulcrum at loop $2^i$, and as its pivoted end on handle 18 swings around upward with said returning handle, it pushes loop $2^l$ on the arm $2^l$ beyond the radius of dog $2^h$. Loop $2^l$ is on arm $2^l$ (with its bearing in the frames 28 and 30) and has a cross bar $2^m$ which when it is thrown forward, abuts against the racks $5^l$ of the carriage and pushes them home.

*The repeat key.*—While the repeat key (9) is set, the indicating stop carriage remains standing in its leftward advanced position, no matter how many times the handle is pulled. Its setting shifts the carriage back pull and carriage clearing mechanism. Figs. 4, 5, 9 and 34 show one form of this repeat mechanism, while Figs. $9^a$ and $10^a$ show the preferred form. According to the embodiment shown in Figs. 4, 5, 9 and 34, it is set by pulling key 9 backward so as to release notch $n$ (Fig. 5) from the key plate 3 and letting it come up in a position above the level of the other keys 4. Side arm 18 (Fig. 5) is normally carried down with side arm 19, both being fastened on the main cross shaft $H^{20}$. This cross shaft has rigidly fastened at its ends extending through the bearings O in the housing frames 28 and 29, handle arms 16 on the left side and 19 on the right side respectively, thus turning with them when they are depressed. These handle arms 16 and 19 have their free ends at the front of the machine united by a cross bar 15, by means of which they are depressed and the machine is actuated. Arm 18 (the indicating stop carriage clearing arm) is pivotally mounted on a spindle $H^{20'}$ projecting from main shaft $H^{20}$ at the right side. This arm 18 is held in its upward position against a stop $2^b$ (on guard arm $2^a$) and returned to it when depressed by means of spring $T^{11}$, Fig. 5. When the repeat key 9 is down and held there on level with other keys by means of notch $n$ (in the case of addition or subtraction), thumb $2^d$ sets on tab $2^e$, compressing $T^{29}$, setting forward detent arm $2^f$ of lock on arm 18, Fig. 34. When the handle 15 is pulled *i. e.* when arm 19 is depressed, it abuts against detent $2^f$ in its line of downward movement, and carries arm 18 down with it, thus pulling back carriage $5^v$ by means of lug $3^z$ bearing down on arm $6^b$ and clearing the carriage on return stroke by means of dog $2^h$ catching under cam loop $2^i$, (Fig. 5,) pushing it out of its path and throwing arm $2^l$ and its cross bar $2^m$ against the stop racks $5^l$ of carriage $5^v$, as already described. When the repeat key 9 is pulled free of the notch, it rises by means of spring $T^{23}$ (Fig. 9). Thumb $2^d$ is lifted away from pad $2^e$ and detent $2^f$ is pulled in, flush with arm 18 by means of spring $T^{29}$, and when arm 19 descends, arm 18 is free of it and consequently does not move, and the carriage $5^v$ is not returned home. This is the requirement for multiplication and division. The carriage $5^v$ can be returned independently of the handle pull by depressing blanking key 14 (Fig. 5) which operation is now obvious. According to the form shown in Figs. $9^a$ and $10^a$, the repeat key 9 is set by depressing it and catching the notch $n$ in the key plate, when it is desired to repeatedly introduce the same item in the calculation. According to this preferred construction, arm 19 engages the arm 18 through means of a coupling hook $2''$ fulcrumed at $2^x$ on said arm 19 and whose path of travel may be shifted to bring it opposite the offset $2^{g'}$, when there will be no movement of arm 18 by arm 19, or to intersect the inset portion of arm 18 when said arms will be caused to move together to return the carriage and eliminate the item after each stroke of the machine. To shift the hook $2''$ by the repeat key 9 and thus determine at will whether or not each item will be eliminated after a single stroke, or left to be repeatedly put into the calculation, repeat key 9 is connected by a pin $2^{c''}$ with the cam lever $2^{c'}$, fulcrumed at $2^{a'}$ and movable to shift its slot $2^{d'}$ which engages the pin $2^{e'}$ at each downward stroke of operating lever 19 and thus determine the path of the hook $2^{t'}$. Thus, if repeat key 9 is depressed, its slot $S^{11}$ will throw cam lever pin $2^{c'''}$ to the left in Fig. $10^a$, fixing the path $2^{d'}$ of the pin $2^{e'}$ to the left, so that when operating arm 19 is depressed, pin $2^{e'}$ is thrown to the left in the clearance slot $2^{e'''}$ and hook $2^{t'}$ passes beyond the offset $2^{g'}$, so that arm 18 remains unmoved and the item carriage retains its position, so that the item set up thereon can be used repeatedly, subject, of course, to voluntary shifting, decimally, by the back space or naught keys. But if the repeat key 9 has its notch $n$ released, by moving its upper end to the left in Fig. $10^a$ and is projected to its upward position by its spring $T^{23'}$, slot $S^{11}$ and pin $2^{c''}$ will position the lever $2^{c'}$ with its path-forming slot $2^{d'}$ to insure engagement of the hook $2^{t'}$ with the blanking arm 18 and thus restore normal operation of the machine, in which the item carriage is returned and the item eliminated at each stroke.

*The back space key.*—The back space key 10 moves the indicating stop carriage $5^v$ back step by step toward the right. This action is necessary in division. According to the form shown in Fig. 9, the back space key 10 with its link $6^x$, fulcrumed at $z$, constitutes in effect a toggle lever and is held in its raised or normal position by means of spring $T^{13}$. It is connected (by means of a stud $6^y$) to an L-shaped link arm $6^u$ having a loop $6^{u'}$ at its angle end which extends upward into a hollow pawl holding slidable box $6^w$. The pawl $6^v$ is pivoted at $u$. It has a pin $6^{v'}$ extending through loop $6^{u'}$ on arm $6^u$ (Figs. 9 and 14). The slidable pawl box $6^w$ is mounted on a horizontal cross plate $7^j$ fastened to the frames 29 and 30, in which is a slot $7^k$ in which it is slidably held with slight friction by means of slightly bent springs $7^u$. When the key 10 is up, arm $6^u$ is drawn outward, pawl box $6^w$ is pulled in the same direction to the end of the slot $7^k$ and pawl $6^v$ is withdrawn clear of teeth $5^h$ on carriage rack $5^g$. When the back space key 10 is depressed, the link arm $6^u$ is advanced first, it protrudes pawl $6^v$ and sets its free end into the rack $5^g$ by means of pin $6^{v'}$ extending through loop $6^{u'}$. Then as $6^u$ advances pawl holding box $6^w$ advances with pawl $6^v$ engaging a tooth $6^h$ of rack $5^g$ of the carriage $5^v$. When key 10 is all the way down, box $6^w$ has advanced to the end of slot $7^k$, the carriage has been pushed back one step, and the holding pawl $7^h$ of the escapement mechanism has engaged a new tooth $5^h$ on the rack. According to the embodiment shown in Fig. $9^a$, the back space key 10 is held normally elevated by spring $T^{13'}$ and acts through the medium of a bell crank lever $6^{x'}$ pivoted at $z'$, one of whose ends $y'$ engages with the key, while the other end is provided with a slot $6^{u'''}$ that engages the pin $6^{v'}$ on the pawl box $6^v$, the construction and operation of which have already been sufficiently described in connection with Fig. 14. A special advantage in this form of operating connection between the back space key 10 and the pawl box is that the back spacing stroke leaves the carriage at its end, so that when the carriage is at its home position, and back spacing movement is imparted to the key 10, there is no resistance to the full stroke of the key, and, therefore, no tendency to injure the mechanism or annoy the operator with the suggestion of disarrangement of the parts. In other words, it renders the mechanism proof against the effect of untimely or even violent operation of the back space key.

*The escapement mechanism.*—The escapement includes the naught keys. Escapement takes place upon the depression of any of the numeral or naught keys. According to the form shown in Figs. 9, 30 and 31, this escapement is effected by means of a pawl $6^l$ with two teeth $7^h$ and $7^i$ coöperating with the teeth $5^h$ on the carriage rack $5^g$. The forward tooth is above the rearward one (shown in Fig. 9). The pawl $6^l$ (Fig. 31) is mounted on a bent reciprocating piece $6^m$ (Fig. 30), the top of which is formed suitably for holding it yieldingly (like any spring pressed pawl) by means of a pocket spring $T^{18}$ (when pivoted thereon by pin $7^n$) against the stop $6^{l'}$ which limits the forward movement of pawl $6^l$. At the end of pawl $6^l$ are the escapement teeth $7^h$ and $7^i$.

In Figs. 9, 30 and 31, the escapement pawl carrying piece $6^m$ has transverse arms $6^o$ and $7^f$. The three naught key lever $8^c$ operates it by means of the right side horizontal arm $6^o$, and the two naught key lever $7^g$ operates it by means of its leftwardly extending arm $7^f$ in connection with projections $7^b$, $7^c$ and $7^d$ thereon. At $7^h$ is pivoted, by means of studs $7^v$ (Fig. 9) lever arm $6^s$ which is normally held against stop $7^c$ by means of spring $T^{14}$. Part $6^m$ also has perpendicular guide rod $7^a$ held in line by guide bearing $7^l$ in frame 29. The other guide bearing for part $6^m$ is held by means of stud $7^m$ having a large head holding it slidably in slot $7^e$ of part $6^m$ to flange $6^z$ on frame 29. Arm $6^o$ also has at its free end a grooved guide roller $8^b$ resting against perpendicular rod $8^a$. The escapement pawl carrying piece $6^m$ is lifted by the operation of any numeral or the naught keys (Fig. 8) by means of the naught key lever 22 which engages at its bifurcated end $6^q$ the pintle $6^p$ of the carrying piece $6^m$, and when the depressed key is released, this carrying part is dropped to its normal position by spring $T^2$ shown in Fig. 8.

Normally when a key is not depressed, the upward forward tooth $7^h$ of pawl $6^1$ is in line with the carriage rack $5^g$ and engages with a tooth thereof $5^h$ (Figs. 8, 9 and 14). When any numeral key 4, or the naught key 6, is depressed part $6^m$ moves up, raising up pawl $6^1$ until upper forward tooth thereon $7^h$ is lifted free of the tooth $5^h$ of rack $5^g$. Rack $5^g$ makes a half escapement i. e. a half step, and $5^h$ abuts against tooth $7^1$ of pawl 6 which is now in the plane of the rack $5^g$. When the depressed key is released, arm $6^m$ with pawl $6^1$ thereon drops from the plane of its upper tooth $7^h$ to the plane of its lower tooth $7^1$, thus releasing $7^1$ from $5^h$ and catching $5^{h'}$ on $7^h$ effecting the other half of the step of escapement. Key 4 depressed lifts key lever $4^d$ against cross bar $4^c$ which abuts against naught key lever 22 pivoted at $4^b$. The free end $6^q$ of naught key lever 22 (engaging cross pintle $6^p$ of escapement piece $6^m$ upon which is escapement pawl $6^1$) lifts the pawl $6^1$ so that half escapement takes place as described. When key is released $6^m$ drops of its weight plus tension of spring $T^2$. According to Figs. $9^a$ and $10^a$, the pawl box $6^{n'}$ carrying pawls $6^1$ with its spring $T^{18'}$ and teeth $7^h$, $7^1$, is substantially identical in construction and operation with corresponding parts of Figs. 9, 30 and 31. But here, the carrying bar $6^{m'}$ with its transverse arms $6^{o'}$, $7^t$ resting in guide slots $S^{12}$, $S^{12'}$, lies in one plane beneath the pawl box and is greatly simplified in construction. Carrying bar $6^{m'}$ is held normally downward by spring $T^{2'}$ and is adapted to be elevated by any one of the figure keys, as well as any of the naught keys as already described, to effect a single space escapement upon depression of either the one naught or any of the figure keys and escapement of an appropriate number of spaces upon depression of one of the multiple naught keys. But the pawl box controls only the single space escapement, while multiple space escapement is controlled by mechanism next to be described in connection with the action of the multiple naught keys. To render the carrying bar $6^{m'}$ and the escapement box responsive to any one of the single space keys (one naught and figure keys), there are provided thrust rods $a^x$, $b^x$, $c^x$, pivoted, respectively, to the one naught, two naught, and three naught key levers $4^{h'}$, $22'$ and $5''$, and having the bifurcated upper ends of the respective push rods $a^x$, $b^x$ and $c^x$ straddling and in engagement with the cross bar $7^{t'}$ $6^{o'}$ of the carrying bar $6^{m'}$. Whenever the thrust bar $b^x$ is raised and released, the pawl box $6^{n'}$ will be moved upward and downward, so that the teeth $7^h$, $7^1$, of its pawl $6^1$ will effect an escapement of the item carriage a distance of one tooth. Whenever the thrust rod $a^x$ or $c^x$ is raised, it moves the carrying bar $6^{m'}$ upward a distance sufficient to wholly remove the pawl box from controlling relation with the carriage, and leaves the carriage under control of the multiple space pawl $6^{s'}$. Pawl $6^{s'}$ has a maximum effect equivalent to three spaces of the item carriage feed and when left unrestricted, will develop a throw appropriate to the three naught key. Such a throw results from the elevation of the carrying bar $6^{m'}$ by the thrust rod $c^x$ which is just sufficient to place the normal or single space ratchet teeth $7^h$, $7^1$ beyond the path of the carriage ratchet. But an arresting stop $6^{i'}$ is so connected by a link $d^x$ with the two naught lever $4^{h'}$ that when the latter is employed for lifting the bar $6^{m'}$, said stop $6^{i'}$ will enter the path of the multiple space pawl $6^{s'}$ and arrest it at the end of a movement which is sufficient to develop but two spaces, or a movement appropriate to the two naught key. In order that the figure keys may each develop a single space movement whenever they are depressed, a universal bar $4^c$ overlying the forward ends of all the figure key levers is adapted through means of a hook $6^g$ to raise the one naught thrust bar $b^x$. Hence, each figure key lever advances the carriage one decimal space each time it is depressed. In varying the effect of the several thrust bars corresponding respectively to the one naught, two naught and three naught keys, they are preferably given a uniform throw, but the slots through which the respective thrust bars $a^x$, $b^x$ and $c^x$ engage the cross arms $7^x$—$60'$ of the carrying bar are varied in depth and consequently have a greater or less lost motion before encountering the cross arm. That is to say, the one naught thrust bar will have the greatest depth to the slot of its bifurcated end, whereby it develops a vertical reciprocation in the pawl box only near the upper limit of its throw and just sufficient to permit the ratchet bar to escape from one to the other of the teeth $7^h$, $7^1$; while the two naught and three naught thrust bars have the depth of their slots in their bifurcated ends gaged to raise the pawl box entirely beyond the path of the ratchet bar on the carriage, so that the multiple space pawl will be left free to develop its throw which is full length and develops a three space feed when the three naught key is depressed, but will only develop a two space feed when the two naught key is depressed, because the latter will simultaneously project into the path of the multiple space pawl, the stop member $6^{i'}$, already described.

*The naught keys.*—The (one) naught key 6 is pivoted to lever bar $5^t$ by means of stud $4^{a'}$. Lever $5^f$ is journaled on the key lever bearing cross shaft $4^b$. When key 6 is depressed, stud $4^{a'}$ abuts against lug $a^b$ on lever 22 and swings its free bifurcated end $6^q$ in engagement with pintle $6^p$ up away from cross rod $4^c$ and causes the escapement as already described. When numeral key 4 is depressed, lug $a^b$ moves down away from stud $4^{a'}$, lever arm 22 being lifted by means of cross rod $4^c$ and lever arm $5^t$ of naught key 6 remains at rest (Fig. 8). The two and three naught keys 7 and 8 (Fig. 9) when depressed lift carrier piece $6^m$ higher and clear both teeth $7^h$ and $7^i$ (on escapement pawl $6^l$) of the rack $5^g$. Finger $6^s$ on the escapement piece $6^m$ extending through a slot $7^w$ of cross plate $7^j$ (Figs. 9, 10 and 14) is in line with rack teeth $5^h$. When $6^m$ is lifted $6^s$ moves up between two teeth $5^h$ of rack $5^g$ and when pawl $6^l$ is clear of the rack, the carriage shoots forward carrying intercepted arms $6^s$ with it to the end of the slot $7^w$ which is, in the case of the two naught key, one and a half steps, and of the three naught key, two and a half steps. The two naught key lever $7^r$ has on it an upwardly extending arm $6^r$, at the top of which is a wedge shaped cam $6^t$ which rests in a slot $6^{t'}$ at the far end of slot $7^w$ in which $6^s$ makes its excursion. This slot $6^{t'}$ has an inclined back $7^k$ against which wedge $6^r$ is held by means of spring $T^{15}$ when key lever $7^r$ is at rest, thus keeping slot $7^w$ open its full length while the three naught key 8 (Figs. 10 and 11) is depressed. When the two naught key 7 is depressed, (Fig. 10) i. e. when lever $7^r$ is raised and $6^r$ with it, wedge $6^t$ closes the far end of the slot $7^w$; at the same time the carrier $6^m$ is lifted raising the pawl $6^l$ free of the rack $5^g$ and allowing the one and a half step escapement on the upward movement and (as in every escapement on my machine) the half step on the downward movement. The two naught key lever $7^r$ and the three naught key lever $a^d$, being arched away, are never lifted by the cross rod $4^c$ which rests on the numeral key levers 21 and lifts the naught key lever 22 causing escapement when a numeral key 4 is depressed.

When the carriage $5^g$ is pulled back, its rack teeth $5^h$ oscillate on spring pressed pawl $6^l$ like any rack pulled forward on a spring pressed holding pawl.

The decimal counter $3^a$ (Figs. 4, 18 and 19) is used in addition, multiplication and division. In addition it may be used to keep a record of the items of each denomination added as well as the total number of items added. In multiplication it denotes the multiplier and in division the quotient. It is made up of counter wheels transversely in line with the total wheels $a^e$ of the total register B. The decimal totals are read (Fig. 1) in total register C. The decimal wheel $3^a$ has on a sector of its annular face figure ("0" to "9") $3^b$ and on the remainder of its circumference notches $3^c$, by which the wheel is yieldingly held by spring $T^{28}$ and advanced step by step or rotated by pawl $3^l$ on the carriage $5^v$. When the carriage is clear (as in Fig. 4), pawl arm $3^l$ is one space to the right of the first wheel $3^a$. When the carriage $5^v$ has advanced one step, the pawl $3^l$ is in position to actuate the first wheel to the right. As many steps as the carriage $5^v$ has advanced, that number of wheel $3^a$ (beginning from the right in the counter C) will be actuated. Every time the handle is pulled, the wheel in line with the pawl $3^l$ is advanced one notch, showing the next consecutive number $3^b$ in the register C. When the decimal total is clear, all the wheels show "0" in the decimal total C. To the side arm $a^g$ of carriage $5^v$ is pivoted rocking arm $a^t$ at $a^{e'}$. On its downwardly extending arm $3^l$ is pivoted by stud $a^h$, arm $3^l$. Arm $3^l$ is pulled back by means of spring $T^{25}$, thus resting rear projections $a^l$ of arm $3^l$ against carriage side arm $a^g$; and arm $3^l$ close to its pivoted point rests against pin $3^o$ on arm $a^t$. To the inner side of the right frame 30 by means of stud $3^r$ is journaled rocking arm $3^q$ having a cross arm $3^p$ (Fig. 18). Part $3^q$ has a weight arm $3^u$ which returns arm $3^q$, after being actuated and rests weight arm $3^u$ against stop pin $3^s$. On the handle arm 19 is a finger $3^w$; on the stud $3^r$ is a lever pivoted on pin $3^r$ with a forward arm $3^v$, and on the backward extending arm is a bent-over end $3^t$ which rests against arm $3^q$. When the handle is pulled, finger $3^w$ on the side arm 19 moves down and contacts with $3^v$ bearing it down until their ends pass. Arm $3^q$ with its cross arm $3^p$ is thrown forward carrying forward are $3^l$, together with arm $3^l$ on the carriage $5^v$. Arm $3^l$ is first thrown up to engage notch $3^c$ of the wheel $3^a$, then is advanced the distance of a notch, thus revolving $3^a$ one step, showing the next consecutive numeral of the wheel in register C. When arm $3^v$ is clear of arm $3^w$, arm $3^q$ drops back by means of weight arm $3^u$ and arm $3^l$ drops down to its rest position. In the wheel $3^a$ is a crescent cut-out $3^t$ on the wheel bearing shaft $1^a$. At the right side is a clearing arm $L^1$. To this arm is fastened a cross arm $3^g$ parallel with the bearing shaft $a^1$ and extending through the crescent slots $3^t$ in the counter wheels $3^a$. Arm $L^1$ is held down by means of a spring $T^{24}$, which also holds in mesh the catch $3^k$ of latch cross piece $5^t$ (pivoted at each end in the frames 29 and 30 by post $3^i$) with notch $3^j$ of stop rack $5^l$. By pulling up and backward the arm $L^1$, wheels $3^a$ are cleared, i. e. naughts will show in the decimal register C. The preferred construction of actuating means for the decimal counter is illustrated in Figs. $18^a$ and $19^a$, according to which the pawl $3^{l'}$ pivoted at $a^{h'}$ upon a lever $3''$ which is in turn fulcrumed at $a^{e'}$ upon the item carriage and afforded a movement thereon limited by the stop $3^{x'}$. A spring $T^{25}$ serves the dual purpose of retracting the lever $3''$ with the pawl $3^{l'}$ and pressing said pawl to its duty. It will be remembered that lever 3″ with its pawl and other parts, partakes of the decimal feed and other adjustments of the item carriage, the pawl being brought into actuating relation to the decimally related counter wheels $3^a$, etc., of the decimal counter by such feed or adjustments. In order to have the lever 3″ at all times under control of the actuating handle lever of the machine, a transverse rod is employed identical in principle with the rod $3^p$, already described in connection with Figs. 18 and 19, which, however, is in the present instance carried by the rocker arms $3^{q'}$ pivoted at $3^{r'}$, with a return spring $T^{52}$ and a pawl $3^{v'}$, which is in the path of the lug or projection $3^w$ mounted at a suitable point upon the main actuating lever.

In connection with the decimal counter C is a slide bar $M^6$ to be used for indicating in a division operation, the purpose of which was explained above in the illustration of division by an example. This slide bar $M^6$ occupies a transverse position in front of the total and decimal counters and below the sight openings thereof (Fig. 18). It is held and moved laterally by pins $M^8$ in the slots $M^9$, holding it to the frames and in position on the frames 28 and 29. At the left end is a thumb tab $M^2$ projecting through the casing (Fig. 1) by means of which it is pulled out. At its middle part and superposing the middle frame 29, are two perpendicular fingers $M^7$ and $M^{7'}$. Finger $M^7$ reaches up as far as the top of the sight opening in total register B. $M^{7'}$ extends downward and forward into the item register A. As these two perpendicular arms are integral with the bar $M^6$, they advance with it when it is pulled out by means of thumb tab $M^2$ and can be made to stop in any position in their respective registers A and B. At the right end of the cross rod $M^6$ is an adjustable secondary indicator $M^5$ (shown in detail in Fig. 32). According to the construction shown in Figs. 18 and 32, this indicator $M^5$ is held squarely on rod $M^6$ by the two turned over arms $a^p$; and the pressure spring $T^{34}$ holds it yieldingly slidable thereon. The indicating finger $M^5$ sticks out through the sight opening of register C and by means of it is slid to any position on the register desired or against the arm $3^h$ on the carriage $5^v$. At its lower end is a lug $a^o$ against which the arm $3^h$ abuts and carries back step by step, the indicating fingers in the three registers with the step-by-step backward movement of the carriage $5^v$ by means of the back space key 10 in a division operation. According to the preferred construction shown in Fig. $32^a$ the indicator $M^5$ of Figs. 18 and 32 is replaced by a clip $m^5$, which is slidingly mounted upon the rod $M^{6'}$ and carries a coupling hook $a^{p'}$ whose forward end $m^9$ is adapted to interlock with a horn $3^h$ on the carriage, while its rear end $m'$ is adapted to engage the wall of an opening $m''$ of the side wall 30 of the frame. A spring $T^{34'}$ serves the dual purpose of developing friction upon the bar $M^{6'}$ and swinging the pawl $a^{p'}$ to its duty. But when the end $m'$ enters the opening $m''$, the hook $m^9$ is released from the horn $3^h$; moreover, the swell $a^{o'}$ on the rear end yieldingly engages with the bottom of the slot $m''$ to retain the clip in its retracted position until forcibly pulled away by movement of the rod $M^{6'}$. Since the rod $M^{6'}$ carries the decimal indicators for both the item register and the total register, and said rod can be slid relatively to the clip $m^5$, any desired relation between said indicators and said clip can be established at will and thereafter the rod $M^{6'}$ can be drawn outward to couple the clip with the item carriage, so that the indicators will thereafter partake of the decimal adjustments of the item carriage and thus facilitate relating the indicators to the initial figures or factors and cause them to automatically expose ensuing figures or factors in response to decimal adjustments of the carriage in such transactions as division and subtraction.

*The handle stroke counter*—Figs. $18^a$ and $19^a$.—I prefer to employ in the machine, a counter that will indicate the number of strokes that have been imparted to the handle in putting an item or items into the calculation, and to this end, the lever $3^{q'}$ which actuates the decimal register in the preferred construction, has a relatively long pawl $T^{12}$ provided at its outer end with a pin $T^6$ that drops into the tooth spaces $T^9$ of the figure wheels T, T' of the counter, two of these figure wheels being deemed sufficient under ordinary circumstances, and the tooth spaces being ten in number, so that the wheels can be related decimally and in a manner to have the excess of nine units in the count transferred from the units to the tens wheel. For this latter purpose, the circumference of the toothed flange of the tens wheel lies within the circumference of the tooth spaces of the units wheel, so that the pin $T^6$ does not normally affect the tens wheel, but the tenth tooth space on the units wheel is of greater depth than the rest, so that when it reaches the pin $T^6$ in the revolution of the units wheel, said pin drops down into engagement with the, for the time being, coincident tooth on the tens wheel, and advances the latter one step as well. Having thus moved the units wheel to zero and the tens wheel to one, the pin, in withdrawing, passes again to a shallow tooth of the units wheel and thereafter remains out of engagement with the tens wheel until the units wheel has again completed its revolution and it becomes necessary to impart another single tooth stroke to the tens wheel. The wheels T and T' of the handle stroke counter are preferably located on opposite sides of the mounting frame 30, and the pin $T^6$ works through a clearance slot $T''$, which is so designed that while affording ample space for the pin $T^6$ to lift out of the tooth space at the beginning of its backward movement and also to move freely into engagement with a tooth at an intermediate point in its throw, it positively holds the pin out of engagement with the teeth when at the limit of its retraction and thus leaves the counter wheels free to rotate in the resetting or clearing operation.

*The transmitting mechanism.*

When an amount is set up by means of the keys 4, in case of mistake or if so desired, it can be eliminated, as already described, by the actuation of the blanking key 14, without adding it to the total, or printing it on the record. If such amount, showing in register A, is correct and it is desired to add it to the amount in the total register B or to print it, either or both, after arranging the proper shifts to predetermine this, the cross-bar 15 is depressed, i. e. the handle is pulled. See Figs. 1, 2 and 3.

The first impact by the fingers on the cross bar 15 which has its free end raised up nearly in line with the top of the keys, swings it slightly around on its end pivots 16, bringing it nearly level, thus pushing in unlocking bar 12 (pivoted to bar 15 by pin 21) and freeing pin 22 thereon of notch 23 on the cam plate F. At the same time, while pin is being freed of notch, bar 12 moves inward and the foot $9^y$ at its far end pushes back a lug on a cross latch, allowing all the rack blades $2^p$, thus released, to shoot forward against the respective stop racks of the carriage, turning the numbers on the printing wheels corresponding, respectively, with the numbers in register B into the printing position. The rack blades are centrally held while moving forward, so that on both sides they are clear of the pinion $2^t$ actuating the total wheels (see Fig. 2).

Fig. 23 shows a detail of the double-acting rack blade $2^p$. This blade has parallel straight edges above and below and a square front. In the cut-out, are two parallel internal racks with their respective ten teeth $2^q$ and $2^{q'}$ perpendicularly opposite and with the forward opposite teeth $r^t$ and $r^{t'}$ stubbed. At the rear end of the blade $2^p$ is a rack with upwardly extending teeth $2^y$, which are in mesh with the teeth $H^6$ of the printing wheels $H^9$. The double-acting blades $2^p$ with their opposite racks are astride a pinion $2^t$. All the teeth of the rack blade $2^p$, of the printing wheel $H^9$, of the pinion $2^t$ as well as of the stop racks $5^l$ and of the selector wheel $5^i$, are of the same pitch.

Rigid with the pinion $2^t$ and by its side on the cross shaft $2^u$ is gear wheel $2^s$. It is in mesh below with the ten toothed tens-carrying wheel $1^f$ journaled on cross shaft $1^e$ below and with the number bearing total wheel $1^b$ journaled on cross shaft $1^a$ above. The upper gear wheel $1^b$ and the lower gear wheel $1^f$ each with ten teeth have all their teeth $1^c$ and $1^g$, respectively, stubbed just outside their pitch line, except one, $1^{c'}$ and $1^{g'}$, respectively, which are full teeth; and the full tooth $1^{g'}$ of the tens-carrying wheel $1^f$ is turned over at right angles to form a cone-shaped cam $1^{g'}$ which projects from its left face and leaves that tooth the same in depth as the other teeth $1^g$. The long tooth $1^{c'}$ of the number bearing wheel $1^b$ above is used in total taking as a stop. The pinion $2^t$ and its companion gear wheel $2^s$ are of the same number of teeth, not necessarily ten.

The rack blade $2^p$ is guided at the rear by a cross shaft $2^w$ (directly under number wheel cross shaft $H^{17}$) through slots $2^x$ in the blade $2^p$ and with spacers Z between the blades on the cross shaft. Cross shaft $2^w$ holds the rack teeth $2^y$ in mesh with the printing wheel teeth $H^6$ and also forms a pivot for the blade $2^p$ to swing up or down at its forward end so as to bring the pinion $2^t$ in mesh with either the upper or lower rack teeth, $2^q$ or $2^{q'}$. At its forward end, this blade $2^p$ is controlled by a notched cross plate $2^m$ (see detail in Fig. 33) with a series of opposite notches $2^n$ in which the blades $2^p$ set, are kept spaced and through which they slide. The figure shows two blades (end view) in position. The cross plate $2^m$ rests in perpendicular slots $m^2$ in the side frames 28 and 29 (Figs. 2 and 18). The end posts $2^o$ and $2^{o'}$ of guide plate $2^m$ project through the frames and are connected with control mechanism set by the shifting of total key 5.

*The transmitting operation.*—The double-acting rack blade $2^p$ is controlled in its forward and backward sliding movement by means of arm $9^e$. This arm journaled on cross shaft $9^B$ (Fig. 2) is connected to blade $2^p$ by a link $9^g$ by means of studs $9^f$ and $2^z$. To the left below, is a catch $9^k$ held against latch cross bar $9^j$ by means of a tension afforded by spring $T^{10}$, adjustably held to cross-bar $9^l$ by means of a screw $9^l$ therethrough and applied to arm $9^e$ at eyelet $9^c$. Cross-bar latch $9^j$ is stirrup-shaped and has at its two ends inside the frames 28 and 29, upwardly extending arms $9^i$ with bearing $9^h$ in the frames. A pin $9^{j'}$ extends through a slot in the frame 28 and is in line with the foot $9^y$ (Fig. 3) on the unlocking bar 12. The stirrup latch $9^j$ is normally held forward in mesh with catch $9^k$ by means of a spring $T^9$, (Fig. 5).

When a number is set up (as is illustrated in Fig. 6) and the handle and transmitting parts unlocked by means of the first impact of hand on the operating cross bar 15 pushing in unlocking bar 12 and the foot $9^y$ thereon against pin $9^{y\prime}$ swinging back the stirrup latch $9^j$ free of the catches $9^k$ on the control arm $9^e$, the spring $T^{10}$ pushes forward the rack blade $2^p$, astride the pinion $2^t$, against the stop rack $5^l$. Each rack blade $2^p$ when thus released is set against its respective stop rack $5^l$ or against the stop bar $5^o$, if the number set up is of lower decimal denomination than the capacity of the machine, as shown in Fig. 6. The printing wheels $H^9$ are swung around, placing the printing number $H^{11}$ thereon corresponding with the number of its stop rack $5^l$ shown in register B into the printing position.

The gear wheel $2^s$ is held yieldingly in position by means of a pressure wheel $1^l$ rolling over and pressing between its teeth $P^t$ when the pinion $2^t$ (and gear wheel $2^s$ with it) is rotated by means of the rack blade $2^p$. Whenever pressure wheel $1^l$ is pressed between the teeth $P^t$ of gear wheel $2^s$, two of the teeth $P^t$ of pinion $2^t$ are in a perpendicular line P, P' (Fig. 23). Now the rack blade $2^p$ when it is set forward against its rack stop $5^l$, has the proper notches between the teeth $2^q$ and $2^{q\prime}$ of the blade $2^p$ in the line P, P', so that when the blade $2^p$ is pushed up or down, when in this position, by means of the transverse guide plate $2^m$ (Fig. 32), the teeth in line P, P' of pinion $2^t$ will engage the notches in line P, P' of blade $2^p$.

The blade $2^p$ in its forward movement against its stop rack $5^l$ is centrally held by means of guide plate $2^m$ and the pinion $2^t$ is free of the rack teeth $2^q$ and $2^{q\prime}$. While the printing is being done, guide plate $2^m$ is moved upward (in case of addition engaging the lower rack $2^{q\prime}$) or downward (in the case of subtracting engaging the upper rack $2^q$ with pinion $2^t$), and when the hammer H has moved away free of the printing wheels, these racks $2^p$ are pulled back in mesh and rotate their respective pinions $2^t$, with their gear wheels $2^s$, together with their respective intermeshed gears $1^b$ and $1^t$, the number of teeth corresponding to the respective number of teeth $5^n$ on the set up stock racks $5^l$ and the respective numbers thereon shown in register A. These rack blades $2^p$ are pulled back, by means of arm $9^e$, thus revolving the wheels in mesh by means of a cross rod $9^a$ (Fig. 2) resting in a slot $9^n$ in each of the side-actuating handles 16 and 19. The slots $9^n$ in the side frames 28 and 29 (Figs. 3 and 5) clear the path of the rod $9^A$ when moved upward by handle pull. Arm $9^e$ has on it a cam $9^p$, against which cross rod $9^A$ abuts in its movement upward (during the handle pull) and carries it back out of its path, where the latch bar $9^j$ engages the catch $9^k$ and retains it until again released by another handle pull. When thus held in the locked position, the printing wheel $H^9$ in mesh with rack $2^y$ has swung forward bringing all the numerals $H^{11}$, "0" to "9" beginning with "0" at the left thereon above the printing line.

The rack $2^p$ when in its locked home position has its forward stubbed teeth $r^t$ and $r^{t\prime}$ in a perpendicular line about one and a half steps, i. e. the distance of one and a half teeth away from the perpendicular line P, P' in which are two opposite teeth $p^t$ of pinion $2^t$. When a rack $2^p$ is set forward against a stop rack $5^l$ in the naught "0" position, the stub teeth $r^t$ and $r^{t\prime}$ are set against the pinion teeth $p^t$ in the line P, P', (Fig. 23) and when the rack is pulled back in mesh, the pinion is not affected as the first tooth $r^t$ thereon (also $r^{t\prime}$ opposite) is stubbed to the extent to merely contact with the first tooth $p^t$ of pinion $2^t$ next to the perpendicular one $p^t$ (in the line P, P'). When the rack blade $2^p$ is set forward against a stop rack $5^l$, which is, for example, set up for "1" and by the "1" numeral key, the perpendicular line P, P' in which are two teeth of the pinion $2^t$, passes through the notches of the rack $2^p$ between the stubbed tooth and the first full tooth thereon, and when the rack is pulled back to its locked position, the pinion will have rotated one notch or step. Were the first tooth $r^t$ and $r^{t\prime}$ of the opposed racks full like the remaining teeth $2^q$ and $2^{q\prime}$, then the blade $2^p$ could not be drawn home when in mesh, (shown in Fig. 23) to place a naught character in the printing position without disturbing the total-actuating gear $2^s$. The stubbed tooth affords the use of a normal pitched rack and pinion with the effect of the undesirable one tooth rack and pinion commonly used in adding machines. It is obvious that a rack cannot traverse a pinion in mesh therewith leaving the pinion stand advanced the number of teeth from the engaging point on the rack to its end unless the teeth on the pinion adjacent to the perpendicular in mesh are wholly beyond the line of travel of the rack teeth. Such a rack and pinion commonly known as a one tooth rack and pinion and almost universally employed in selective transmission produces a very badly articulating gear movement.

*The total wheel-holding and locking mechanism.*—Extending upward between the rack blades $2^p$ (Fig. 2) are arms $1^m$, at the upper end of which in a slot therein is a roller $1^l$ which presses between the teeth $P^t$ of wheels $2^s$ and holds them yieldingly in horizontal alinement. At their lower end, arms $1^m$ are set in longitudinal slots of an L-shaped cross piece $1^l$. A bearing rod $1^j$ passes through a hole through the slot portion of cross piece $1^l$ and through holes through the lower part of the arms $1^m$ in the respective slots. The ends of this fulcrum cross rod $1^j$ project and have their bearings in the side frames 28 and 29, thus pivoting thereon both the arms $1^m$ and the slotted cross piece $1^l$. Extending backward and overhanging the seat part of the holding cross piece $1^l$ are projecting arms $1^n$ which are fast to the main arms $1^m$ (see Fig. 2). In the seat of the cross piece $1^l$ are cups $1^k$, one under each arm $1^n$. Arms $1^n$ have a downwardly extending pin $1^{n'}$. In the cups $1^k$ and engaging pin $1^{n'}$ are coiled compression springs $T^{21}$, which push arms $1^n$ upward and arms $1^m$ with their rollers $1^l$ forward against the respective gear wheels $2^s$ and keep them laterally alined. At the right end of the cross piece $1^l$ above the bearing $1^j$ is a pin $1^u$ projecting through an opening in the frame 29 (see Fig. 19). On the handle part 19 pivoted thereon by a stud $1^v$ is a two-armed dog $1^k$; the arm $1^t$ thereof is held against a pin $1^q$ by means of a spring $T^{40}$ (Fig. 5). The forward part or cam $1^n$ thereof (at a predetermined place as the handle arm 19 is moved downward, i. e., just as the racks $2^p$ are leaving the pinion $2^t$, when pulled back in mesh with the pinion $2^t$ and in the position shown in Fig. 23), contacts with pin $1^u$ pushing it forward out of its path. The L cross bar $1^l$ is tilted forward on its fulcrum $1^j$ and the seat part thereof is raised away from its adjustable set screw $S^c$, Fig. 2, and is pressed up against the arms $1^n$, thus jamming the wheels $1^l$ between the teeth $P^t$ of wheels $2^s$ respectively and momentarily locking them until pin $1^u$ is freed of the passing cam $1^{n'}$ (Figs. 2, 5, and 19). This cam dog $1^n$ is on the operating-handle side arm 19 and the pin $1^n$ in its path is on the rocking spring cage $1^k$. Both cage and pressure arms $1^n$ set in slots therein are all mounted on a common bearing rod $1^j$ anchored in the side frames 28 and 29. During the handle pull operation, the projecting end $1^n$ of the dog abuts against the pin $1^u$, which is on an upwardly extending arm of the cage pivoted at $1^j$, camming it out of its path thus lifting the spring cage $1^k$ to momentarily jam the pressure rollers $1^l$ into the teeth $P^t$ of the wheels $2^s$ to stop their motion as just described. On the return of the handle 19, when arm $1^{n'}$ contacts with pin $1^u$, it passes by without throwing pin $1^u$ forward by reason of the spring connection $t^{40}$.

*The total wheels.*—The total wheels $1^b$ are stubbed gear wheels having ten teeth $1^c$, of which one is a normal tooth $1^{c'}$. Secured on the side is a number-bearing flange $a^e$ (the size of the stubbed gear wheel $1^b$) with a number $1^d$ opposite each tooth, (Figs. 1, 2, 4 and 18). The normal tooth $1^{c'}$ is opposite the "2" number and extends beyond the face of the number flange $a^e$ and beyond the stubbed teeth. This tooth is employed in total taking, as I shall describe under that subject. The total wheels are mounted side by side on the cross shaft $1^a$ and are in mesh with the intermediate actuating gears $2^s$. The numbers representing total on the total wheels are read in the register B shown in Fig. 1.

*The tens-carrying mechanism.*—This embraces gear wheels $1^f$ journaled side by side on the cross shaft $1^e$ and forms the lower tier of the three sets of intermeshed gear wheels shown in Fig. 2. The teeth $1^g$ are stubbed like those of the counter wheels $1^b$, but the full tooth $1^{g'}$ is bent over at right angles forming a face cam. This bent-over tooth is of equal length with the others on the wheel $1^f$. Fig. 27 shows the carrying parts connected with this wheel.

Below the wheel $1^f$ is a stirrup-shaped tappet guide plate N pivoted at the end of each of its legs $8^n$ and $8^{n'}$ by bearing pins $1^h$ and $1^{h'}$ in the bearing cross bars $8^l$ and $8^{l'}$, as shown in Fig. 28, which shows a section of a selected portion on the line $28^x$—$28^x$ of Fig. 27. The horizontal part $8^q$ of guide piece N has a double angle turn and a slot $8^p$ through it, in which rests and through which extends the tappet head $8^i$. On the part rearward of the slot $8^p$ is a cam lug $8^k$. On a cross bar $8^m$ are spring tongues which extend leftward and press their free end against arm $8^n$ of guide part N. At the left end above is a cam catch $8^r$. In longitudinal slots in a cross bar $8^x$ are cam latches $8^z$ journaled on a cross rod $8^y$. In the seat part $8^{x'}$ of the cross bar $8^x$ and in line with the latches are cups in which set pressure springs which engage a pin on the left member $8^{z'}$ of the patch piece $8^z$. On each side of the wheel $1^f$ and in the position shown is an L-shaped cross bar $8^j$ and $8^{j'}$, which serves as a guide, stop and lock for tappet $8^i$ and which limits the oscillating movement of stirrup guide piece N. Journaled on cross rod $8^c$ (one for each wheel $1^f$ and guide part N) is a bell crank G having pivoted at the end of its arm $8^d$ by means of a stud $8^f$, a tappet arm $8^h$ with its tappet head $8^i$ in the slot $8^p$ of guide piece N. The arm $8^d$ in its inactive position rests on a cross binding post $8^e$. The upward or free arm in this position rests against the spring bearing cross rod $8^m$.

A spiral step-by-step drum $8^u$ is seen to the right. This drum is also shown in Figs. 3, 4 and 18, and Fig. 27 is a view of a section on the line $27^x$—$27^x$ of Fig. 18. The drum $8^u$ is journaled in the frames 28 and 29 by means of its spindle ends $8^s$ and $8^{s'}$. A notch $8^t$ on spindle $8^{s'}$ engages a latch spring $T^{26}$ which holds it from turning back at the end of the revolution. The end posts $8^w$ and $8^{w'}$ connect the two end spindles $8^s$ and $8^{s'}$ with the spiral drum $8^u$ in which are the steps $8^v$, the function of which is to actuate the tappets in their order from left to right. The end of the spindle $8^s$ (Fig. 17) has a ratchet groove $D^{10}$. Rotatably mounted upon the end of the spindle $8^s$ projecting through the bearing frame 28 is a pinion $D^2$. This pinion has a pawl $D^5$ which, by means of a cushion spring $T^{20}$ sets the pawl in the groove $D^{10}$ (see Fig. 10) of the spindle $8^s$ (when the pinion is rotated contraclockwise), thus locking pinion and spindle together and revolving the drum with the pinion. When the pinion is turned backward, clockwise, the drum is held by means of the latch spring $T^{26}$ set in the notch $8^t$ on the spindle $8^{s'}$ of the drum (Fig. 27).

The pinion $D^2$ is in mesh with a rack $D^4$ on the side handle 16. When the handle is actuated by means of the downward pressure of cross bar 15, the pinion turns clockwise, and the drum stands still. When the handle returns, rack $D^4$ moves upward and revolves the pinion $D^2$ contra-clockwise actuating the tappets $8^i$ in their order from right to left, by means of the bell cranks G contacting at their free end $8^g$ with the steps $8^v$ of the spiral drum $8^u$. The pinion $D^2$ is held from slipping off the end of the spindle $8^s$ by a screw $D^3$. Fixed on the spindle $8^s$ between the pinion $D^2$ and bearing frame 28 is an arm $K^1$. On the inside of handle 16 is a pin K. (Figs. 3 and 4). When handle 16 has returned, the arm $K^1$ revolving contra-clockwise with the drum and spindle $8^s$ abuts against pin K, which has been moved into its path by the return of the handle arm 16. As the arm 16 moves down, the pin K thereon also moves down out of the path of stop arm $K^1$ and when the handle starts to return and the drum starts its rotation, (it will be noted that the drum rotates only contra-clockwise) the pin K is far below the path of arm $K^1$.

*The tens carrying operation.*—Now the part described is the carrying mechanism and the following is the operation: When the machine is clear all naughts show in the total register B, and the face cam tooth $1^{g'}$ of the intermeshed carrying wheel $1^f$ is forward (to the right) of the cam lug $8^k$ (in the position shown in Fig. 27). In an addition operation cam tooth $1^{g'}$ abuts against lug $8^k$ of tappet guiding part $8^p$ and pushes it out of its path toward the next wheel to the left. In subtraction the wheel $1^f$ is revolved clockwise and the first step of rotation sets over cam lug $8^k$.

Now when the cross bar 15 is up in its locked position a cross rod 36 having its ends fastened to the respective side arms 16 and 19 and having the side frames cut away from its path is up against the latches $8^z$ and holds them lifted free of the catches $8^r$ the springs $T^{16}$ pressing against arms $8^n$ rock over the stirrup slotted shaped guides $8^p$ against the far side of the limiting slots $j$ and $j'$. When in this unset position lug $8^k$ of any guide N is just free of the left face of its wheel $1^f$ but in the path of its face cam tooth $1^g$. The slot $8^p$ of the guide N, is in a plane between the gear $1^f$ actuating it and the next one to the left so that when the tappet $8^l$ resting in the slot $8^q$ is pushed up it will go between the carrying wheels $1^f$. This is the case when the handle is pulled and carrying does not take place which is always the case when the first item is recorded.

Suppose the first item is 999,999 this is set up on the machine and transmitted to the total wheels $1^b$ and to the carrying wheels $1^f$ by means of the operating racks $2^p$ in mesh with the pinions $2^t$ coacting with the intermediate gear wheels $2^s$ intermeshed with total wheels $1^b$ above and carrying wheels $1^f$ below. The six actuated total wheels beginning at the right will have advanced nine steps and 999,999 will show in total register A. The first six carrying wheels $1^f$ will have rotated contra-clockwise nine steps each and the cam teeth $1^{g'}$ thereon will rest in the position next to and left of the cam lug $8^k$. This will have happened on the downward movement of the handle bar 15 and on its return upward the spiral drum makes a revolution and pushes up the tappets $8^i$ in their order from right to left. But as the cam tooth $1^{g'}$ has not yet set over in line with the next wheel $1^f$ the guide part N by means of its lug $8^k$ all the tappets strike between the wheels. Now set up one (1) by means of the keys and pull. Only the first (the units rack blade $2^p$ will engage its pinion $2^t$ and pull it one step or notch, thus showing "0" in the units position and "9's" in the remaining positions in total register B when the handle is down. The first carrying wheel $1^f$ because in mesh, same as the number bearing wheels $1^b$, with the intermediate gear and pinion actuated by rack $2^p$ was also advanced one step when the cam tooth $1^{g'}$ passed the cam lug $8^h$ and moved guide piece N with its slot $8^p$ over in line with the tens wheel.

Now when the handle 15 returns the spiral drum $8^u$ is turned one revolution. The first tappet lifted is in line with the tens wheel $1^f$. In moving upward against the guide piece $8^j$ it engages a tooth $1^g$ of the tens wheel $1^f$ and advances it one step (and only one) when it strikes against the horizontal part of guide stop bar $8^j$ and remains there locking the wheel until cross rod 36, by means of the return home of the handle lifts the latches and allows spring $T^{16}$ to push over guide piece N and to release the tappet head $8^l$ from between the teeth $1^g$ of the wheel $1^f$ engaged, so that it drops down free of the wheel. Should it not drop the first downward movement of the handle pushes down cross rod $9^s$ which bears down arm $8^d$ with tappets thereon against cross binding post $8^e$.

When the first tappet $8^t$, by means of the rotating drum has advanced the tens wheel one step, it has moved the second guide N similarly to the first with its tappet in line with the hundredth wheel; and as this tappet rises it advances the hundredth wheel similarly and sets the next tappet under the thousandth wheel and so on, advancing the carrying wheels in their decimal order one step each to the seventh wheel. The intermeshed total wheels $1^b$ will also have advanced in their decimal order one step each to the seventh by the return of the handle, i. e., by the return revolution of the spiral step drum actuated by the returning handle and the total register will show 1,000,000 which is one added to 999,999 and is correct.

Subtraction implies taking from a number shown in the total register B a smaller number set up and showing in the item register A. Before pulling the handle when the respective numbers are shown in the two registers A and B, set the total key for subtraction. In addition the intermediate gear $2^s$ and its pinion $2^t$ are actuated by the rack blade $2^p$ clockwise by meshing with its lower rack $2^{q'}$. The cam tooth $1^{g'}$ on the carrying wheel $1^t$ has moved away contra-clockwise from the cam stepping up lug $8^k$ as the intermediate gear $2^s$ was turned notches by means of the rack and pinion. Now in subtraction, by means of the total shift key 5 set for subtraction the upper rack $2^q$ engages its pinion $2^t$ and turns the intermediate gear $2^s$ the reverse from addition (namely contra-clockwise). The tappets $8^t$ having been slid leftward with their free end in the slot $8^p$ by means of the cross guide wire $8^o$—$8^{o'}$ now operate the carrying wheels $1^t$ in exactly the opposite direction. You "borrow," instead of "lend" or carry "1" into the next higher denomination and the use of complements is not required.

*The addition-subtraction shifting mechanism.*—On the left (Fig. 1) projecting through a slot S' in the key plate 3 is a shiftable lever 5' with a tab 5 thereon marked "Total." This lever 5' is pivoted to the side frame 28 by means of a stud E. The key lever is in two telescoping parts 5' and 5" (Figs. 3 and 7). The upper part 5' has two fingers $E^1$ and a turned over flange with guide hole $E^a$. The lower part 5" has a central stem $E^2$ and two turned over flanges with guide holes $E^3$. The two fingers $E^1$ of part 5' are passed through the holes $E^3$ of part 5" and the stem $E^2$ of part 5" passed through a pressure spring $T^4$ is passed through the guide eyelet $E^a$ and its end turned over to limit the length of the key. On part 5" is a V shaped flap $E^4$ pushed back so as to form a catch. Fastened to the frame 28 is a pressure spring $T^5$ with a V shaped kink in it. This spring will hold the total key in its forward or backward position.

To the top of the key 5' is attached by means of a stud $E^o$ shift arm $E^{10}$, Figs. 3, 12 and 13. This shift arm at its left end has a guide slot $E^{12}$ through which is a guide stud with large head $C^2$ fastened to the frame 28. On the downward extending part $E^{11}$ are two inwardly extending cross rods $8^o$. These rods have clearance in the frame 28 and guide and shift the tappet bars $8^h$ (Figs. 3, 12 and 13). On the top and forward end of part $E^{10}$ is a two step cam $C^{15}$.

Loosely journaled on the cross bearing shaft $2^u$ is a tumbler $C^o$ with a dog $C^6$, pivoted at $C^{6'}$ and with an inwardly extending nose $C^7$ operating in slot $C^{7'}$. At the forward free cam end is a cam-way $C^9$ and two cam inclines $C^8$ and $C^{10}$. At the top and bottom of the free end are traverse faces $C^c$ and $C^{c'}$. The ward and the traversing faces are arcs of a radius the length of the distance pin $9^q$ is from the center of the operating cross shaft $H^{20}$. On the upward extending arm $9^p$ of the operating arm 16 is an inwardly extending pin $9^q$ which is in line with the tumbler $C^o$. Rigidly fixed on the cross shaft $2^u$ is a shifting and centering lever $C^5$. Forward of its fulcrum $2^u$ is the arm G with a slotted socket $g$ for the end post $2^o$ of the cross guide plate $2^m$ which is moved up or down or held in an intermediate position thereby in the guide slot $m^2$ in the frame 28. The far end of cross guide plate $2^m$ is guided in a slot $m^{2'}$ in the frame 29 and through which extends the end post $2^{o'}$ and rests in a slotted socket $g'$ of the arm G' rigidly fastened to the far end of cross rod $2^u$ as shown in Fig. 19. The arm $C^5$ of the shifting, centering lever has a cut away portion $g^1$ affording clearance for the foot $C^7$ of dog $C^6$. At the left of this cut out portion is a notch $L^n$ the upper or lower edges of which are engaged by foot $C^7$ when it is at the bottom of its limiting slot $C^{7'}$ when tumbler $C^o$ is actuated. The shifting, centering lever $C^5$ is held centered by means of a V shaped guide $C^{11}$ at its end against which is pressed, by means of a pressure spring $T^{41}$, a roller $9^x$ at the end of an oscillating arm $9^{x'}$.

When the machine is set for addition shown in Fig. 12, by means of the total key, arm $E^{10}$ attached to the total key is pulled out toward the right as far as stud $C^2$ lets it come in the slot $E^{12}$. The tumbler $C^o$ drops down, so that the foot $C^7$ rests on the bottom of the limiting notch $L^n$ of centering guide lever $C^5$. In this position of the tumbler $C^o$ the pin $9^q$ (when the handle is depressed and the arm $9^p$ on which it is fastened oscillates forward) abuts against the inclined end $C^8$ bearing it down and sliding along the traversing face $C^c$ thus holding it down against the pressure of the centering roller $9^x$ against the upper inclined face of the V-shaped guide $C^{11}$.

Set for subtraction the arm $E^{10}$, by means of the total key, is moved in so that the stud $C^2$ is at the right end of the limiting guide slot $E^{12}$ as shown in Fig. 13. The lower horizontal face of the tumbler $C^o$ rests on the upper plateau $C^{15}$ of arm $E^{11}$ and the pin $9^q$ when the handle is pulled contacts with the lower incline $C^{10}$ of the tumbler and guides it up so that the pin $9^q$ rides on the lower traversing face $C^{c\prime}$ holding the tumbler up against the pressure of the centering roller $9^x$ against the lower inclined face 9 of the T-shaped guide $C^{11}$.

Throwing the total key into an intermediate position, so that the stud $C^2$ occupies a middle position in the guide, limiting slot $E^{12}$ the base $E^{14}$ of the tumbler $C^o$ rests on the first plateau of cam part $C^{14}$ of arm $E^{10}$. The ward $C^9$ of the tumbler $C^o$ is in line with the pin $9^q$. During the handle pull the pin $9^q$ engages in the ward channel $C^9$ and holds the tumbler central. This is the requirement for non-adding, i. e. when it is desired to print an item set up without involving it in the total.

When the left arm of lever $C^5$ is moved through the instrumentality of the pin $9^a$ actuating the tumbler $C^o$, and tumbler $C^o$ locking to lever $C^5$ by means of the foot $C^7$ on dog $C^6$ thereof, thus also moving arm G in contact with the post $2^o$ by means of the socket $g$ moves down or up carrying cross, guide plate $2^m$ down or up, as the case may be in the slots $m^2$ in the side frames 28 and 29, thus meshing with the pinions $2^t$ either the upper or the lower racks $2^q$ or $2^{q\prime}$ of the reverse racks $2^p$ guided by the cross guide plate $2^m$. In the case of the non-add operation when the cross guide plate is in an intermediate position in the slots $m^2$ both upper and lower racks of rack blade $2^p$ are held clear of the pinion.

*The total taking mechanism.*—The parts involved in taking a total or a subtotal, are the same as those employed in shifting for addition or subtraction just described except that a few additional parts are required in the total operation of which the following is a description. The total key 5 (also already described) is depressible by means of a compression spring $T^4$. Just under the key plate 3 on the key bar 5 are two transverse lugs. The one is an outwardly extending lug $E^5$ and the other an inwardly extending one $E^6$ (Figs 3, 4 and 7). To the side frame 28, by means of a stud $D^6$ (Fig. 12) levers $C^a$ and $C^b$ are coaxially mounted side by side. The right free arms $E^7$ and $E^8$ of the respective levers $C^a$ and $C^b$ both extend under the lug $E^5$ when the total key is in the addition position at the end of the slot and when depressed in this position as in the case in total taking, the lug $E^6$ engages both arms and bears them down. When the total key 5 is pushed toward the middle of the slot $S^1$, Fig. 1, (in which it oscillates) as is the case in sub-total taking, (while it is being depressed until the outwardly extending lug $E^5$ abuts against a vertical flange $E^{13}$ projecting inward into its path from the side casing) arm $E^8$ is free of the lug $E^5$, because of the bend $E^{8\prime}$ therein, and only arm $E^7$ is borne down (see Fig. 12).

The outward extending lug $E^5$ is directly above the ribbon-color selector arm 17 and whenever the total key 5 is depressed in taking either a total or a sub-total the record thereof is made in the other color as shown in Figs. 3, 4 and 7, because lug $E^5$ bears arm 17 in its path, down with it. The other color can be used to print any item independently of the total key by depressing bar 17 by means of key 13 marked "Red" while the handle is being actuated.

At the left end of the lever $C^a$ above is a heel $C^{a\prime}$, which when arm $C^a$ is raised by means of the total key 5 abuts against and lifts the L-shaped guard cross bar $5^o$ hinged at $6^j$ on the side plate $6^h$ of the indicating stop carriage $5^v$ (Fig. 4). Below on lever $C^a$ is a toe upon which is mounted a dog $D^9$ by means of a stud and held normally against a stop pin by means of a spring $T^{34}$. The free end of this dog has an outwardly extending lug $D^{9\prime}$. The left end of the arm $C^b$ has a turned out flange $D^7$ through which is a slot $D^{7\prime}$. Pivoted by a stud $9^w$ to arm $9^p$, a member of the handle arm 16, is a lever C with the other end $F^5$ in the slot $D^{7\prime}$ at the end of the arm $C^b$. This lever C has a lug $C^1$ (in line with the dog $C^6$, on the tumbler $C^o$, and just back of it) farther to the right is an upward enlargement with two rightward extending fingers $C^3$ and $C^4$.

*The total and sub-total taking operation.*— When the total key 5 in the addition position (see Fig. 1) as already described is depressed both arms $C^a$ and $C^b$ move upward (Figs. 3 and 12). The key 5 is held down during the handle pull operation. Heel $D^8$ rising carries up bar $5^o$ of the carriage $5^v$ which is in its pulled back or inactive position. The cross bar $5^o$ (normally a stop for the rack blades $2^p$ when they are unlocked by the first impact, on cross bar 15 of the handle pull) is now raised free of the racks $2^p$. The bar $5^o$ moving upward pushes the cam arm $9^b$ of a cross latch bar $9^c$ up and consequently this latch bar fastened to it at both ends (see Fig. 15) and oscillating in a slot $9^{c\prime}$ in the side frames 28 and 29, moves forward and into the path of the normal tooth $1^{c\prime}$ of the stubbed, number-bearing gear wheel $1^b$, shown in Fig. 2. The dog $D^9$ engages the post $2^o$ of the rack guide plate $2^m$ and pushes it up against the top of the slot $m^2$ in which guide $2^m$ is held. Arm C is raised at its forward end $F^5$ by means of the arm $C^b$ lifted by the actuation of the total key 5. The lifted arm C has set lug $C'$, back of dog $C^7$ and cam $C^4$ up against lever $9^a$ and back of its lug $9^{a'}$ and the finger $C^3$ is in line with lug $D^{9'}$. Arm $9^a$ has a cross locking arm $9^d$ oscillating in the slot $9^{d'}$. Cross rods $9^d$ and $9^e$ are normally held out of line of the normal tooth $1^{c'}$ by means of a spring $T^{42}$ resting against their side arms $9^a$ and $9^b$ respectively.

Now when the handle is pulled, first is the unlocking of the transmitting mechanism. The racks $2^p$ are released and shoot forward, but as they have their lower teeth $2^{q'}$ in line with the pinion teeth $p^t$ they engage the pinions, and by means of the power afforded by springs $T^{10}$ revolve them together with the intermeshed gear wheels $2^s$, $1^b$ and $1^t$ until the normal tooth $1^{c'}$ on each wheel strikes the stop rod $9^c$ in its path. At this point all naughts show in the total register B, i. e. the total register is clear but the racks $2^p$ were borne forward in mesh with their respective pinions $2^t$ as many steps as the number shown on the corresponding number wheels $1^b$ in the total register B before the handle was touched, and the corresponding printing wheels have turned those respective numbers into the printing position.

Now as the handle advances downward the printing takes place and the arm C is moving forward. The post on the dog has been moved forward (in the slot $C^{7'}$ by the advancing lug $C^1$) out of contact with the notch $L^n$ in the centering arm $C^5$. Cam $C^4$ by means of the lug $9^{a'}$ on oscillating arm $9^a$ has thrown and secured cross locking bar $9^d$ on top of the normal teeth now in line and resting against the stop bar $9^c$. The finger $C^3$ has abutted against the lug $D^{9'}$ of the dog $D^9$ and immediately upon the printing impression has pushed the free end of dog $D^{9'}$ from under the end post $5^o$ of the guide plates $2^m$, and by means of the centering arm $C^5$ actuated by pressure pin $9^x$, guide plate $2^m$ drops and the rack blades held therein drop free of the pinion and are pulled back to their locked position leaving the total register B cleared, but pulling back the printing wheels, always in mesh, into their normal locked position. The total wheels remain locked in their cleared position, i. e, by means of the bars $9^d$ and $9^c$, until the handle 15 has returned home and the total key 5 is released.

The subtotal taking does not include the coöperation of the accessory lever $C^b$. Arm $C^a$ and its actuated parts act exactly as in total taking, but as arm C moves forward free of all its actuated parts, the top bar $9^d$ does not lock the wheels in their cleared position and the prop $D^9$ is not knocked from under the post 20, consequently when the racks $2^p$ are pulled back (to their normal locked position, after the printing act) they remain in mesh with the pinions $2^t$ and return the number in the register B which was there before the sub-total was taken.

*The printing mechanism.*

The printing mechanism is at the rear of the machine (Figs. 1, 2, 3, 4, 5, 6 and 29) and embodies the type wheels, the punctuating device, the impression hammer, the paper holder and paper feed and the ribbon mechanism.

*The type wheels.*—These wheels $H^9$ coaxially mounted on a cross shaft $H^{17}$ are sector shaped and have the numeral type $H^{11}$ on the face beginning with "0" at the rear and continuing in their digital order to "9" at the forward end of the sector. These wheels by means of cogs $H^6$ are in mesh with a rack $2^y$ of the transmitting blades $2^p$. The printing line is one step below the rearward figure "0" and consequently no printing can be done without the racks $2^p$ in mesh with the printing wheels $H^9$, moving forward the required number of steps. On the right face of each wheel (except the first on the right) is a flange $H^{10}$ (Figs. 4 and 6) which is a support for the punctuating characters $H^{12}$ and $H^{13}$ which are always in the printing line, but normally unsupported. On the rear end of the flange $H^{10}$, Fig. 29, is an incline $H^{10'}$.

*The punctuating device.*—This device is shown in Fig. 29, also in 3 and 1. On a cross rod $H^{14}$ with slide bearings $H^{14'}$ in the frames 28 and 29 are flexible, vertical arms (at periods the distance of three wheels apart) at the upper end of which in the printing position are period $H^{12}$ and comma $H^{13}$ characters. The Fig. 29 shows them set for printing dollars and cents, i. e., the period is placed between the tens and hundredth wheel. By means of the thumb piece $M^3$ projecting beyond the casing (Fig. 1) the punctuator can be slid in or out and the punctuating characters left in any position and held there by means of a spring latch $T^{31}$ resting in a notch $H^{15}$ (see also Fig. 5). When the slide $H^{14}$ is pushed into the last notch period $H^{12}$ is on the outside of the first wheel which has no flange and consequently does not print the period. The commas $H^{13}$ are three places inward and three places apart. On the back of the commas is an incline which when a wheel $H^9$ is advanced to the printing position, the punctuating characters are raised by means of their contacting inclines to the printing level.

*The impression hammer.*—The printing hammer is U-shaped. The hammer part H is a cross rod considerably weighted and is supported by perpendicular side arms $H^1$ pivoted, respectively, in the side frames 28 and 29 by means of pins $H^2$. At the lower end of an arm $H^3$ is a 45-degree, outwardly-extending inclined plane $H^4$, which is pushed back out of the path of a pin $H^5$ on the far end $H^{21}$ of the handle arms when the handle is actuated, thus throwing the hammer H forward against the type $H^{11}$ in the printing position, with the ribbon, paper and rubber dam intercepted, thus taking the impression. When the pin $H^5$, in the construction of Figs 3 and 5, has passed the inclined cam $H^4$, the hammer H moves backward away from the type by means of the centering spring $T^{20}$, into its normal upright position. When the handle returns, the pin $H^5$ strikes the incline $H^4$ on top and moves it inward until the pin passes and the hammer returns to its upright spring-held position. According to the preferred construction of hammer shown in Fig. $3^a$, arms $h$ pivoted coaxially with the hammer frame $H'$ and carrying the cam $H^4$, have a movement relatively to the frame $H'$ limited by the pin $h^2$ in slot $h^3$ and have their movements transmitted to the frame $H'$ and through it to the hammer by means of springs $T^{53}$ connected at their respective ends with the arms $h$ and with the upper portion of the frame, intermediate portions of said springs being made to overlie fulcrum pins $h^8$. With this construction, when the cams $H^4$ are encountered in the direction to develop a printing stroke, the springs $T^{53}$ rest against the pins $h^8$ and the printing throw is transmitted through a relatively short section of the spring, which, while affording desired resiliency to permit the operating mechanism to make its full stroke, is yet severe enough to insure a comparatively heavy stroke of the hammer and consequently a good impression; but when cams $H^4$ are encountered in the return direction, in which it is desired to have them yield to pass their actuating lugs on the main operating levers, the upper ends of the arms $h$ then act outwardly upon the springs $T^{53}$ and consequently avail of the resiliency of the entire length of spring, and thus while having ample resistance to keep them in place, they oppose very little resistance to the idling stroke of the parts. One of the pins $h^8$ serves the further function of coacting with a cam surface on the main operating lever or other suitable part, as for instance the rear surface of the arm $H^{21}$ in Fig. 3, which the pin encounters after the hammer has made the impression to positively return the hammer to normal position. In this way, the resistance of the return spring in this relation, which is quite objectionable, is wholly avoided, as also is the complication incident to arranging such springs in the machine.

*The paper holder and paper feed.*—The paper roll $P^6$ is held in a box $B^7$ provided for the purpose, resting in the base 1 in the rear of the right side of the machine and inside the casing, Figs. 6 and 20. At the rear of the base, shown to the left in Figs. 20 and 21, is a cut-out in which sets the removable carrier 43 (Fig. 22), upon which are fixed the roll holder $B^7$ with its forward slot $P^{18}$ for the paper ribbon to be led through, and its guard $B^{7\prime}$ and with the guide wires $P^9$, $P^{9\prime}$ and $P^{13}$, by means of which the paper ribbon $P^5$ is conveyed to the feed rolls $P^{10}$ and $P^{11}$ with their respective end bearings $P^7$ and $P^{7\prime}$ in the frames 28 and 29 (Figs 6, 12 and 13). To supply a new roll of paper, a turn button 41, Fig. 20, at the rear pulls the holder 43 which when turned lets it drop down. The roll is placed in the box $B^7$. Its end is pulled out through the slot $P^{18}$ and through the deflector guide $P^9$. It is recoiled and passed through guides $P^{9\prime}$ and $P^{13}$. It is now pushed back into its place in the base, and locked. This can be done without overturning the machine. The free end is pulled out and passed between the feed rolls and the machine is ready for use. The paper as it passes through between the rolls $P^{10}$ and $P^{11}$ enters the guide channel of an oscillating paper leader P. This leader at its lower end is pivoted in the two side frames 28 and 29 (in line with the paper $P^5$ coming through the rolls shown in Fig. 12) by means of bearing pins $P^{14}$. The paper guide channel is formed by the turned-over side edges $P^1$. At the top or free end of the oscillating leader P is a rectangular plate $P^2$ with toothed knife $P^{2\prime}$ and with a rectangular cut-out $P^e$, to afford clearance for the hammer H. At the ends of the rectangular plate $P^2$ are flexible turned-over tongues $P^4$ between which and the plate $P^2$ are pulled the ends of the rubber dam $P^3$ spanning the cut-out part $P^e$ and in line where the hammer H strikes in the event of printing (see Fig. 1).

Close to the fulcrum point $P^{14}$ of the paper leader P, through a clearance slot $P^{16}$ in the frame 28, projects a transverse post $P^{15}$ (fastened to the leader P) which is in co-operation with the arm $H^{21}$ of the handle bar 16. Arm $H^{21}$ has on its upper end an oblique slot $F^1$, in which rests the pin $P^{15}$ in the inactive position, *i. e.*, when the handle 15 is up, and holds paper leader P perpendicular, away from the printing wheels. When the handle is pressed, its arm $H^{21}$ moves up, the lower cam face of slot $F^1$ pushes the pin $P^{15}$ forward in the slot $P^{16}$, swinging the paper holder P against the printing wheels, where it is held (during the printing act and until the handle 15 returns) by means of the arm $P^{15}$ riding on the traversing face $P^{20}$. When the handle returns, i. e. when the lifted arm $H^{21}$ drops, the pin $P^{15}$, forward in the slot $P^{16}$, is struck by the retracting cam arm $P^{17}$, and pushed back in the clearance slot $P^{16}$ and held and locked in the cam slot $F^1$, thus holding the holder P again in the upright position with its printed record in full view of operator.

The feed roll $P^{10}$ has at its left end an extended bearing stem $P^7$, on the end of which sticking through the casing is a thumb, feeding-knob $P^\circ$. Further in (inside the casing) and on the same stem $P^7$ is a ratchet wheel $P^8$ held from turning back by means of a latch spring $T^{33}$ and in line with a pawl $P^{19}$ pivoted by a stud $P^a$ on the arm $H^{21}$ of the handle 16, and held against a stop $P^b$ by means of a spring $T^{32}$. When the handle 15 is pulled, the pawl $P^{19}$ is advanced upward (and after the printing operation is completed and the hammer has moved away) and engages a tooth of the ratchet $P^8$ and rotates the feed roll $P^{10}$ one step. The idler feed roller $P^{11}$ is impinged against the power feed roller $P^{10}$ by means of a pressure spring $T^\circ$ resting against its end bearings $P^{7\prime}$ (Fig. 12.) The rollers have knurled lines on them so as to grip the paper $P^5$ pinched between them.

*The ribbon mechanism.*—At the rear of the machine, on each side of the printing wheels (Figs. 1, 4 and 29), are the upright ribbon spools. These rotatable spools $R^5$ are journaled to a seat $R^{16}$ formed by turning outward at right angles, the lower free ends of the spool-carrying arms $R^a$ which are fastened to the ends of a cross rod $R^{22}$ which passes through a tubular binding post $R^{22\prime}$, which forms its bearing.

The spools $R^5$ have knurled thumb knobs $R^2$ which form the head of screws passing therethrough, and also form the bearing spindle which holds the spools in their support and bearing in the seat $R^{16}$ by means of a nut $R^{2\prime}$. The upper flange $R^\prime$ of the ribbon spools has equally spaced radial slits $R^6$, with the one side thereof bulged up so as to form ratchet teeth. Resting over the top flange of each spool (Fig. 24 shows the one on the right) is a flat plate lever $R^7$ pivoted on the one side to the carrying arm $R^a$, by means of a pintle $R^{12}$ thereon; and at the other side, transversely in line, by means of bearing pintle $R^8$, to the upturned end $R^{17}$, which constitutes an extension from the spool-supporting arm $R^a$. Resting in the notch $R^{8\prime}$ of the forward turned end of the bearing post $R^8$ is a pressure spring carried by arm $R^a$ which bears downward the front end $R^3$ of the lever plate $R^7$ (Fig. 3). On the side forward of the bearings is a cut-out $R^{21}$ (Fig. 24) with an incline $R^{21\prime}$ at its rear. At the other side is a downward turned holding catch $R^{11}$. At the tip of the free end is a transverse incline $R^3$ with lower and upper plateaus $a$ and $b$. An upright post $R^{18}$ (Fig. 29) on each side on the spool support $R^{16}$ holds the ribbon $R^{5\prime}$ passing thereover out of the path of rotation of the printing wheels as it is stretched across the back from one spool to the other. Extending across from the spool bearing arm $R^a$ on one side to that of the other (Fig. 3) and supported in guide slots $R^{10}$ is a ribbon reversing guide wire $R^4$ with a loop $R^{14}$ at each end, through which the ribbon is drawn as it is fed from spool to spool (Figs. 16 and 29). On the top at each end is a cam $R^{10}$. The plates $R^7$ rest their free end on this cam $R^{10}$, one resting its $a$ plateau and the other its $b$ plateau. The ribbon is wound on the spool of the side having the $b$ plateau of its lever plate $R^7$ resting on the cam $R^{10}$ and unwound from the spool having the $a$ plateau of its lever plate $R^7$ resting on the cam $R^{10}$. Pivoted on the upper end of the up-extending arms $9^p$ of the handle arms 16 and 19 (Figs. 4, 5 and 12) by means of a stud $R^{19}$ is a pawl $R^9$ with the forward end turned down, so as to engage the radially extending teeth $R^6$ on the upper flange of the spool $R^5$, which it operates through the cut-out $R^{21}$ in the plate $R^7$. At the forward end of the pawl $R^9$ is a transverse pin $R^{20}$ (Figs. 1 and 4). When the handle is pulled, the arms $9^p$ rock forward, drawing the pawls $R^9$ thereon backward out of mesh with the ratchet notches $R^6$ by means of the inclined face $R^{21\prime}$, with which the backwardly moving down-turned end of the pawl $R^9$ articulates and by means of which it is raised on top of the plate $R^7$ where it continues its backward sliding until the end of the handle pull. On the return of the handle arms $9^p$ which carry the pawls $R^9$, the said pawls slide forward on the plates $R^7$ until they reach the cut-out $R^{21}$ when they drop in the latter to feed the spool one step. The one on the side where the plateau $b$ (Fig. 29) of the plate $R^7$ rests on the cam $R^{10}$ engages the ratchet notch $R^6$ on the flange of the ribbon spool of that side (Figs. 1 and 4). The pawl $R^9$ on the other side, when it reaches cut-out $R^{21}$, is prevented from dropping down far enough to engage it with the ratchet teeth $R^6$ of the spool on that side, because of the transverse pin $R^{20}$ resting on the plane of the plate $R^7$ uptilted by cam $R^{10}$ under its $a$ plateau.

At each end of the ribbon $R^{5\prime}$ close to where it is fastened to the spool $R^5$ is a pin $R^{13}$, as shown in Fig. 16. When the spool is nearly unwound, the pin $R^{13}$ approaches the loop $R^{14}$ of the reversing cross wire $R^4$. As the pin cannot pass through the loop, it carries it with it, sliding it transversely, pulling the cam $R^{10}$ over from under the plateau $a$ of the plate $R^7$ on that side, letting the plate drop down with plateau $b$ resting on the cam. At the other end, the cam $R^{10}$ pushing against the incline $R^3$ lifts up plate $R^7$ and rests plateau $a$ on the cam $R^{10}$. Now the pawl on the side where the plate $R^7$ dropped will be allowed to engage the ratchet teeth of the spool on that side, and the pawl on the side where it is lifted will be prevented from thus engaging, because of the pin $R^{20}$ at the end of the pawl sliding on the face of the lifted plate and limiting the depth it drops down. The empty spool (now the power spool) is ratcheted back step by step, upon the handle pulls, pulling the ribbon the reverse direction and winding it on that spool, while the full spool is the idler spool and is unwound. The catch $R^{11}$ of the actuating spool at each step drops down in mesh with one of the ratchet teeth $6^r$ and prevents it from recoiling.

The ribbon $R^{5\prime}$ is two-color. It is stretched across the rear of the faces of the printing wheels $H^{11}$ from spool to spool and having its upper margin, the black zone, normally overlying the printing line, and held in that position by a spring $T^{11}$. The forwardly extending color shifting arm 17, passing through a slot $S^2$ in the housing, terminates at the front of the machine in a key 13 marked "Red." This arm 17 normally rests, by means of the action of spring $T^{11}$, against the transverse flange $E^5$ on the total key 5, which limits its upward movement. When the total key 5 is depressed, it is borne down by the flange $E^5$ thereon, and the spools rise and bring into printing line, the lower margin or color zone of the ribbon. Depressing the key 13 to the bottom of the slot $S^2$ accomplishes this, independently of the total key 5 and offers the facilities for printing any item the other color, red. According to the preferred construction of ribbon mechanism shown in Fig. $29^a$, the ribbon spools $r^\prime$ are mounted to swing coaxially with the group of printing numbers in shifting to bring one or another of the different color ribbon zones into the printing line, so that the spacing of the ribbon from the printing characters is constant. The feed ratchets $R^{6\prime}$ are presented circumferentially on the ribbon spools, instead of in the direction of the axis, as in the form above described, and the actuating pawls $R^9$ operate between the edge of the ratchet flange and the side walls of the frame. In order to determine which of the pawls shall be effective and consequently the direction of ribbon feed, deflecting shoes $r^8$ are pivoted at $r^{17}$ on the plates $r^7$, beneath which the spools are journaled and have projections $r^5$ extending into bearings $r^{18}$ on the sliding bar $r^4$. The latter slides with friction upon the connecting yoke or shield $r$ upon which it is mounted through means of its ends $r^{13}$ fitted in bearings $r^{10}$, and when it is moved, say to the right, by encountering the obstruction located at the left end of the ribbon, as already described, the deflecting shoe $r^8$ on the left hand spool will be withdrawn and the adjacent feed pawl $R^9$ permitted to act and start the feed of the ribbon toward the left; the deflecting shoe $r^8$ at the right having its edge $r^{21}$ simultaneously protruded into the path of the feed pawl $R^9$ at the right and holding the latter away from its feed ratchet, thus permits the spool at the right to idle in response to the ribbon pull and subject to suitable frictional devices to prevent racing. $R^{20}$ is a guiding projection on the feed pawl $R^9$, which engages beneath the guide $r^0$. $r^2$ is a spindle upon which the ribbon spool is mounted.

*Disconnecting the printing mechanism.*—Mounted free on the ends (Figs. 3 and 5) of the main actuating spindle $H^{20\prime}$, by means of studs $H^{20}$, are the arms $H^{21}$ which, when the handle 15 is pulled, actuate the printing and paper feeding mechanism, as already described, provided that they are locked to the arms $H^{22}$ integral with the actuating arms 16 and 19 during the handle pull operation. This locking is accomplished by means of a dog $9^o$ pivoted to each arm $H^{21}$ by means of a stud $F^{10}$. The dog has two arms; an upright holding arm $F^8$ with an engaging notch $F^{9\prime}$ for catch $F^9$ and held engaged therein by means of a spring $T^{36}$, and a horizontal control arm $9^o$ against which the spring $T^{36}$ presses and which is in coöperation with the disconnecting cross bar $F^7$ which extends through the left side casing, terminating in the thumb tab $M^4$, as shown in Fig. 1. The disconnecting rod $F^7$, shown in detail in Fig. 36, is held in its transverse position in the frames 28 and 29 by means of a guide slot $F^{7\prime}$. When it is pushed in (Fig. 1) so that the thumb tab $M^4$ is against the casing, the control arms $9^o$ of the locking dogs are free of the cross disconnecting rod $F^7$ when the handle is up. When it is pulled out by means of tab $M^4$ the control arms $9^o$ (Figs. 3 and 5) riding on the incline $b^t$ of cross bar $F^7$, at each side, raise up the control arms on the plateaus $c^t$, of the cross slide $F^7$, and push back the latch arms $F^8$ to a position free of the notch $F^9$, but under an offset $f^d$ punched up out of the respective frames 28 and 29. In this position, the arms $H^{21}$ are held disconnected and locked down until tab $M^4$ is again pushed in. In this disconnected condition, the machine is for all intents and purposes a non-listing machine.

*The actuating mechanism.*

The actuating mechanism represented by the handle-pull, cross bar 15 (Fig. 1) and the side, handle arms 16 and 19 shown in Figs. 3, 4 and 5, is intricately connected with the various interacting parts embodied in the machine, and it was necessary in the discussion of the function and operation of these parts to fully identify these actuating parts and disclose their connection therewith. It is, therefore, unnecessary to reiterate this description under the specific heading.

The foregoing description has been directed specifically to the particular machine selected for purposes of illustration and as constituting the best means known to me whereby my invention may be put into effect, but it is to be understood that the several parts of the invention are not restricted in scope to the details of the instrumentalities which go to make up the machine, but include, rather, any machine embodying instrumentalities substantially corresponding in function, principles of construction, and coöperative relationship with any of the several mechanisms herein involved, and within the purview of any of the following claims.

I claim:—

1. In a calculating machine comprising a register, an item carriage, a keyboard, and an operating handle, all arranged in longitudinal series; said operating handle having its actuating throw downward from the keyboard and in front of the machine; said item carriage being movable, laterally of the machine, to operative position, in the longitudinal series of said mechanisms, and to inoperative position to one side of said series, and the lever on the side of the inoperative position being laterally offset for a portion of its length to give place for the item register.

2. In a calculating machine comprising a register, an item carriage, a keyboard, and an operating handle, all arranged in longitudinal series; said operating handle having its actuating throw downward from the keyboard and in front of the machine; said item carriage being movable, laterally of the machine, to operative position, in the longitudinal series of said mechanisms, and to inoperative position to one side of said series; said machine also embodying a decimal register, offset laterally from said longitudinal series of mechanisms.

3. In a calculating machine comprising a register, an item carriage, a keyboard, and an operating handle, all arranged in longitudinal series; said operating handle having its actuating throw downward from the keyboard and in front of the machine; said item carriage being movable, laterally of the machine, to operative position, in the longitudinal series of said mechanisms, and to inoperative position to one side of said series; said machine also embodying a decimal register, offset laterally from said longitudinal series of mechanisms; said decimal register comprising a plurality of decimally related individually operable digit members, having an actuating member shiftable by the decimal adjustment of the item carriage, and thereby brought into actuating relation with the different digit members.

4. In a calculating machine comprising a register, an item carriage, a keyboard, and an operating handle, all arranged in longitudinal series; said operating handle having its actuating throw downward from the keyboard and in front of the machine; said item carriage being movable, laterally of the machine, to operative position, in the longitudinal series of said mechanisms, and to inoperative position to one side of said series; said machine also embodying a decimal register, offset laterally from said longitudinal series of mechanisms; said decimal register comprising a plurality of decimally related individually operable digit members, having an actuating member shiftable by the decimal adjustment of the item carriage, and thereby brought into actuating relation with the different digit members; and an operating member controlled by the operating handle, for driving said decimal register actuating member, having a fixed location but constructed to retain driving relation to the decimal register actuating member at all adjustments of the latter.

5. In a calculating machine comprising a register, an item carriage, a keyboard, and an operating handle, all arranged in longitudinal series; said operating handle having its actuating throw downward from the keyboard and in front of the machine; said item carriage being movable, laterally of the machine, to operative position, in the longitudinal series of said mechanisms, and to inoperative position to one side of said series; said machine also embodying a decimal register, offset laterally from said longitudinal series of mechanisms; said decimal register comprising a plurality of decimally related individually operable digit members, having an actuating member shiftable by the decimal adjustment of the item carriage, and thereby brought into actuating relation with the different digit members; and said actuating member having an indicator partaking of its adjustments and indicating the decimal position in which it is acting.

6. In a calculating machine comprising a register, an item carriage, a keyboard, and an operating handle, all arranged in longitudinal series; said operating handle having its actuating throw downward from the keyboard and in front of the machine; said item carriage being movable, laterally of the machine, to operative position, in the longitudinal series of said mechanisms, and to inoperative position to one side of said series; said machine also embodying a decimal register, offset laterally from said longitudinal series of mechanisms, and a handle pull register.

7. In a calculating machine, a movable item carriage, a ten key key-board to set up an item on said carriage, stationary total and decimal registers to coöperate with the movable carriage to receive the respective counting values therefrom by transfer, and an operating handle to accomplish the transfer.

8. In a calculating machine comprising a register, an item carriage, a keyboard, and an operating handle, all arranged in longitudinal series; said operating handle having its actuating throw downward from the keyboard and in front of the machine; said item carriage being movable, laterally of the machine, to operative position, in the longitudinal series of said mechanisms, and to inoperative position to one side of said series; said machine also embodying a decimal register, offset laterally from said longitudinal series of mechanisms; said decimal register comprising a plurality of decimally related individually operable digit members, having an actuating member shiftable by the decimal adjustment of the item carriage, and thereby brought into actuating relation with the different digit members; and an operating member controlled by the operating handle, for driving said decimal register actuating member, having a fixed location but constructed to retain driving relation to the decimal register actuating member at all adjustments of the latter, and a handle pull register actuated by said decimal register operating member.

9. In a calculating machine comprising a a register, an item carriage, a keyboard, and an operating handle, all arranged in longitudinal series; said operating handle having its actuating throw downward from the keyboard and in front of the machine; said item carriage being movable, laterally of the machine, to operative position, in the longitudinal series of said mechanisms, and to inoperative position to one side of said series; said machine also embodying a decimal register, offset laterally from said longitudinal series of mechanisms in lateral alinement with the total register and in longitudinal alinement with the inoperative position of the item carriage and the handle lever on that side extending laterally along the side of and having actuating connections with said item and decimal registers and being offset inwardly beyond the decimal register and extended laterally along the mechanism in rear thereof.

10. In a calculating machine comprising a register, an item carriage, a keyboard, and an operating handle; said operating handle having its actuating throw downward from the keyboard and in front of the machine; said item carriage normally occupying a position to one side of said series of mechanisms, and said machine also embodying a blanking lever extending along the handle lever on the item-carriage side of the machine and terminating adjacent the operating handle.

11. In a calculating machine comprising a register, an item carriage, a keyboard, and an operating handle, all arranged in longitudinal series; said operating handle having its actuating throw downward from the keyboard and in front of the machine; said item carriage normally occupying a position to one side of said series of mechanisms, and said machine also embodying a blanking lever extending along the handle lever on the item-carriage side of the machine, and said last-named levers being both offset inward in rear of said item carriage.

12. In a calculating machine comprising a register, an item carriage, a keyboard, and an operating handle, all arranged in longitudinal series; said operating handle having its actuating throw downward from the keyboard and in front of the machine; said item carriage normally occupying a position to one side of said series of mechanisms, and said machine also embodying a blanking lever extending along the handle lever on the item-carriage side of the machine; and an actuating connection being provided through which to operate said blanking lever from said last-named handle lever.

13. In a calculating machine comprising a register, an item carriage, a keyboard, and an operating handle, all arranged in longitudinal series; said operating handle having its actuating throw downward from the keyboard and in front of the machine; said item carriage, normally occuying a position to one side of said series of mechanisms, and said machine also embodying a blanking lever extending along the handle lever on the item-carriage side of the machine; and an actuating connection being provided through which to operate said blanking lever from said last-named handle lever, and a repeat key being provided which is adapted to render inoperative said last-named actuating connection.

14. In a calculating machine comprising a register, an item carriage, a keyboard, and an operating handle, all arranged in longitudinal series; said operating handle having its actuating throw downward from the keyboard and in front of the machine; said item carriage being movable, laterally of the machine, to operative position, in the longitudinal series of said mechanisms, and to inoperative position to one side of said series; said item carriage comprising a plurality of adjustable stop bars, and a blanking lever being provided for returning the item carriage to inoperative position, and a cross bar for returning the stop bars to initial position, 15. In a calculating machine comprising a register, an item carriage, a keyboard, and an operating handle, all arranged in longitudinal series; said operating handle having its actuating throw downward from the keyboard and in front of the machine; said item carriage being movable, laterally of the machine, to operative position, in the longitudinal series of said mechanisms, and to inoperative position to one side of said series; said item carriage comprising a plurality of adjustable stop bars, and a blanking lever being provided for returning the item carriage to inoperative position, and a cross bar for returning the stop bars to initial position; said blanking lever actuating said cross bar on the return stroke of the blanking lever.

16. In a calculating machine comprising a register, an item carriage, a keyboard, and an operating handle, all arranged in longitudinal series; said operating handle having its actuating throw downward from the keyboard and in front of the machine; said handle bar having an unlocking movement in addition to an operating stroke, and having an unlocking connection carried on the rearwardly extending handle lever.

17. In a calculating machine, the combination of counting mechanism an item-indicator selector-carriage movable into and out of position for coacting with the counting mechanism and having individually adjustable digit members, and means for shifting the selector carriage to initial position, acting upon said selector carriage independently of the position of its digit members.

18. In a calculating machine, the combination of counting mechanism, an item-indicator selector-carriage movable into and out of position for coacting with the counting mechanism and having individually adjustable digit members, and means for restoring the digit members to initial position, acting upon said digit members independently of their returning movement, and only after the item carriage has returned to its initial position.

19. In a calculating machine, the combination of counting mechanism, an item-indicator selector-carriage movable into and out of position for coacting with the counting mechanism and having individually adjustable digit members, and means for restoring the digit members to initial position, acting upon said digit members independently of their returning movement, and only after the item carriage has returned to its initial position; said machine also having a back spacer for moving said item carriage decimally back toward initial position at will.

20. In a calculating machine, the combination of counting mechanism, an item-indicator selector-carriage movable into and out of position for coacting with the counting mechanism and having individually adjustable digit members, and means for restoring the digit members to initial position, acting upon said digit members independently of their returning movement, and only after the item carriage has returned to its initial position; said machine also having a back spacer for moving said item carriage decimally back toward initial position at will, and means for feeding it decimally forward at will, without changing adjustments previously established in the digit members.

21. In a calculating machine, counting mechanism, an item-indicator selector-carriage movable into and out of position for coacting with said counting mechanism and having individually adjustable digit members for determining the counting value of such coaction, means for withdrawing the item carriage, means for restoring the digit members to initial position after the carriage is returned, and an operating lever actuating the carriage-withdrawing means by its movement in one direction, and the digit-member restoring means by its movement in the other direction.

22. In a calculating machine, counting mechanism, an item carriage movable into and out of operative relation to the counting mechanism, a blanking member, and a handle for operating the machine having optional driving connection with the blanking member.

23. In a calculating machine, counting mechanism, an item carriage movable into and out of operative relation to the counting mechanism, a blanking member, and a handle for operating the machine having optional driving connection with the blanking member; said operating members being also operable independently of each other at will.

24. In a calculating machine, the combination of a base; counting mechanism mounted upon the base; a key mechanism mounted on said base but having its key-operating area elevated above the base; and a manually operated power element comprising a finger bar extending across the front of the keyboard and having a vertical range of movement between the operating area of the keyboard and the base, and a lever extending rearwardly from the finger bar along the side of and in operative connection with said counting mechanism; said lever being fulcrumed between its ends, and said counting mechanism comprising a plurality of elements connected with said lever on opposite sides of its fulcrum.

25. In a calculating machine, the combination of a base; counting mechanism mounted upon the base; a key mechanism mounted on said base but having its key-operating area elevated above the base; and a manually operated power element comprising a finger bar extending across the front of the keyboard and having a vertical range of movement between the operating area of the keyboard and the base, and a lever extending rearwardly from the finger bar along the side of and in operative connection with said counting mechanism; said counting mechanism comprising counting elements, and automatically-set counter-driving elements limited by the action of the keys.

26. In a calculating machine, a ten key key-board, a total register, an intermittently movable item carriage controlled by said keyboard and decimally adjustable therefrom relatively to said total register and controlling the same, and a decimal register, having an actuator movable with the item carriage and thereby decimally adjusted relatively to the decimal register.

27. In a calculating machine, a self-denominating keyboard, a total register, an intermittently movable item carriage decimally and numerically controlled by said keyboard and decimally adjustable therefrom relatively to said total register and controlling the same, a decimal register, having an actuator movable with the item carriage and thereby decimally adjusted relatively to the decimal register, and a pull register also operated by said actuator and adapted to register the strokes of the machine occurring at any decimal adjustment of said decimal register actuator.

28. In a calculating machine, counting mechanism, an item register comprising a carriage having rack bars movable at right angles to the direction of travel of the carriage and in a horizontal plane and adapted to have set up thereon at will, items to be entered in the calculation, an operating handle adapted to transfer each item to the counting mechanism, as it is presented in controlling relation thereto, and a handle pull decimal register connected to record operating pulls of the handle for each decimal position of the item register.

29. In a calculating machine, counting mechanism, an item register comprising a carriage having rack bars movable at right angles to the direction of travel of the carriage and in a horizontal plane and adapted to have set up thereon at will, items to be entered in the calculation, an operating handle adapted to transfer each item to the counting mechanism, as it is presented in controlling relation thereto, a decimal register adapted to indicate the handle pulls in each decimal position assumed by the item register, and a handle pull register adapted to indicate all handle pulls, whatever the position of the item register, said handle pull register being connected to record operating pulls of the handle.

30. In a calculating machine, counting mechanism, normally locked and automatically projected driving members for said counting mechanism, extending to the rear thereof, key mechanism adapted to determine the counting value of movements of the driving members, located in front of the counting mechanism, and an actuator comprising a finger bar located in front of the key mechanism, and a lever extending from the finger bar along the side of the machine to the rear thereof and there having connection with the driving members in the direction to retract the same; said finger bar having an unlocking movement and an operating stroke, and having connections through which it releases the driving members by its unlocking movement.

31. In a calculating machine, a counting mechanism, an operating handle for said counting mechanism, an item register comprising a carriage movable across the machine and adapted to have set up in it, an item that is to enter into the calculation, constructed to predetermine the counting movements of the counting mechanism, when the latter is released by the operating handle, and movable to and from position of such control, and a carriage return member adapted to withdraw the item register from control position without restoring the indicating elements of the item register to normal position.

32. In a calculating machine, a counting mechanism, an operating handle for said counting mechanism, an item register comprising a carriage movable across the machine and adapted to have set up in it an item that is to enter into the calculation, constructed to define the counting movements of the counting mechanism, when the latter is released by the operating handle, and movable to and from position of such control, and a carriage return member adapted to withdraw the item register from control position without restoring the indicating elements of the item register to normal position; said operating handle having a connection through which it actuates the return member after actuation of the counting mechanism.

33. In a calculating machine, the combination of a counting mechanism, actuating means for said counting mechanism adapted to return to normal position after acting upon the counting mechanism, an operating handle through which to control the actuating means, an item register adapted to have set up therein, items to be entered in the calculation, movable to and from position in which it controls the counting mechanism, and adapted to remain in such control position during repeated strokes of the operating handle, a return member for withdrawing said item register from its control position, a dog connecting the operating handle with the return member, to operate the return member by the operating handle, a guide for said dog, and a repeat key adapted to adjust said guide to direct the dog out of its path of engagement with the return member.

34. In a calculating machine, a counting mechanism, an operating handle for said counting mechanism, an item register adapted to have set up in it an item that is to enter into the calculation, and including longitudinally movable bars having indicia thereon, the varying movement of which define the counting movements of the counting mechanism, when the latter is released by the operating handle, and movable to and from position of such control, an item register clearing member, and a carriage return member adapted to withdraw the item register from control position and to actuate the item register clearing member.

35. In a calculating machine, a register, an indicating device coacting with and shiftable relatively to the register for indicating successively, different portions of its readings to be regarded in a calculation, an item carriage carrying an expressed item to be introduced into the calculation and adjustable to vary the decimal relation of the item to the register reading, and means for connecting the indicator and causing it to partake of the adjustments of the carriage.

36. In a calculating machine, a register, an indicating device coacting with and shiftable relatively to the register for indicating successively different portions of its readings to be regarded in a calculation, an item carriage carrying an expressed item to be introduced into the calculation and adjustable to vary the decimal relation of the item to the register reading, and means for connecting the indicator and causing it to partake of the adjustments of the carriage; said connecting means being slidably connected with the indicator, whereby the indicator may have different initial adjustments relatively to the carriage.

37. In a calculating machine, a register, an indicating device coacting with and shiftable relatively to the register for indicating successively different portions of its readings to be regarded in a calculation, an item carriage carrying an expressed item to be introduced into the calculation and adjustable to vary the decimal relation of the item to the register reading, and means for connecting the indicator and causing it to partake of the adjustments of the carriage, and being releasably connected with the carriage.

38. In a calculating machine, a register, an indicating device coacting with and shiftable relatively to the register for indicating successively different portions of its readings to be regarded in a calculation, a laterally adjustable item carriage carrying an expressed item to be introduced into the calculation and adjustable to vary the decimal relation of the item to the register reading, and means for connecting the indicator and causing it to partake of the lateral adjustments of the carriage and being releasably connected with the carriage.

39. In a calculating machine, the combination of a total register, an item carriage, an indicator coacting with the total register, a slide rod on which said indicator is mounted, a latch slidingly mounted on said rod but having driving friction therewith; said latch being adapted to grip said carriage when moved thereto, and thereby couple the indicator with the carriage.

40. In a calculating machine, the combination of a total register, a decimal register, an item carriage, an indicator coacting with the total register, a slide rod on which said indicator is mounted, a latch slidingly mounted on said rod but having driving friction therewith; said latch being adapted to grip said carriage when moved thereto, and thereby couple the indicator with the carriage, an indicator being provided on said latch, coacting with the decimal register.

41. In a calculating machine, the combination of a total register, an item carriage, an indicator coacting with the total register, a slide rod on which said indicator is mounted, a latch slidingly mounted on said rod but having driving friction therewith, said latch being adapted to grip said carriage when moved thereto, and thereby couple the indicator with the carriage; means being provided in position to release the latch from the carriage when the carriage reaches its limit of movement.

42. In a calculating machine, an indicating item carriage having a step-by-step decimal adjustment, a ratchet through which to effect said adjustment, a single space escapement pawl governing said escapement, a multiple space escapement pawl adapted to control said ratchet, zero keys having connections with said single space pawl, the amplitude of movement of the carriage corresponding to the zero value on the particular key depressed, actuating the latter to effect a single space adjustment, and another key having connection with said single space pawl adapted to displace it from ratchet-controlling position, and leaving the ratchet subject to the multiple-space escapement pawl.

43. In a calculating machine, an indicating item carriage having a step-by-step decimal adjustment, a ratchet through which to effect said adjustment, a single space escapement pawl governing said escapement, a multiple space escapement pawl adapted to control said ratchet, a multiple-space-pawl stop adapted to limit the throw of the multiple space pawl, zero keys having connections with said single space pawl, actuating the latter to effect a single space adjustment, another key having connection with said single space pawl adapted to displace it from ratchet-controlling position, and leaving the ratchet subject to the multiple-space escapement pawl, and a key adapted to not only displace said single space pawl, but to inject the multiple-space-pawl stop, the amplitude of movement of the carriage corresponding to the zero value on the particular key depressed.

44. In a calculating machine, a register comprising a series of slide bars, each carrying a numeral series; said slide bars being movable in a group transversely of their length to bring them into different decimal positions and movable individually in the direction of their lengths to bring any one of their several numerals to the reading line.

45. In a calculating machine, an item register comprising a carriage having a step-by-step lateral movement, said carriage having mounted upon it, a series of slide bars, each provided with a series of digits and individually movable in the direction of their lengths to bring any digit on any bar, into a predetermined reading line, said carriage, by its lateral adjustment, being adapted to present in different decimal positions, a number expressed by the digits on said bars.

46. In a calculating machine, an item register comprising a carriage having a step-by-step adjustment, a series of digit members mounted on said carriage, each bearing a rack bar and a series of figures for use in expressing an item, associated in relation to present their figures in a reading line, and individually adjustable longitudinally, to bring any of their figures in the reading line, and means for adjusting said rack bars at will, comprising a toothed member with which said rack bars are brought into mesh successively, by the adjustment of the carriage.

47. In a calculating machine, an item register comprising a carriage having a step-by-step adjustment, a series of digit members mounted on said carriage, each bearing a rack bar and a series of figures for use in expressing an item, associated in relation to present their figures in a reading line, and individually adjustable longitudinally, to bring any of their figures in the reading line, and means for adjusting said rack bars at will, comprising a toothed member with which said rack bars are brought into mesh successively, by the adjustment of the carriage, and value keys adapted to impart varying throws to said toothed member.

48. In a calculating machine, an item register comprising a carriage having a step-by-step adjustment, a series of digit members mounted on said carriage, each bearing a rack bar and a series of figures for use in expressing an item, associated in relation to present their figures in a reading line, and individually adjustable longitudinally, to bring any of their figures in the reading line, and means for adjusting said rack bars at will, comprising a toothed member with which said rack bars are brought into mesh successively, by the adjustment of the carriage, and value keys adapted to impart varying throws to said toothed member and also actuate the carriage adjustment.

49. In a calculating machine, an item regter comprising a series of digit members, each bearing a rack bar and a series of figures for use in expressing an item, associated in relation to present their figures in a reading line, and individually adjustable longitudinally, to bring any of their figures in the reading line, and means for adjusting said rack bars at will, comprising a toothed adjusting member common to all the rack-bar digit members, and means for effecting a step-by-step adjustment between the adjusting member and the digit members, in the direction to bring the adjusting member into adjusting relation with the racks of the several digit members, successively.

50. In a calculating m chine, an item register comprising a series of digit members, each bearing a rack bar and a series of figures for use in expressing an item, associated in relation to present their figures in a reading line, and individually adjustable longitudinally, to bring any of their figures in the reading line, and means for adjusting said rack bars at will, comprising a toothed adjusting member common to all the rack-bar digit members, and means for effecting a step-by-step adjustment between the adjusting member and the digit members, in the direction to bring the adjusting member into adjusting relation with the racks of the several digit members, successively; a carriage being provided upon which the rack-bar digit members are mounted and upon which the step-by-step adjusting means acts.

51. In a calculating machine, an item register comprising a series of digit members, each bearing a rack bar and a series of figures for use in expressing an item, associated in relation to present their figures in a reading line, and individually adjustable longitudinally, to bring any of their figures in the reading line, and means for adjusting said rack bars at will, comprising a toothed adjusting member common to all the rack-bar digit members, and means for effecting a step-by-step adjustment between the adjusting member and the digit members, in the direction to bring the adjusting member into adjusting relation with the racks of the several digit members, successively; said step-by-step adjusting means including both forward and backward spacing means.

52. In a calculating machine, an item register comprising a series of digit bars individually adjustable to bring any digits of any bar into a reading line and movable in a group to bring them successively to adjusting position, an adjusting member, comprising a key controlled gear wheel which enters laterally into coaction with each digit bar as it reaches adjusting position.

53. In a calculating machine, an item register comprising a series of digit bars individually adjustable to bring any digit of any bar into a reading line, and movable in a group to bring them successively to adjusting position, an adjusting member comprising a key controlled gear wheel which enters laterally into coaction with each digit bar as it reaches adjusting position, and guiding means on either side of the adjusting position which mesh with said bars and resist individual adjusting movement in them when on either side of said adjusting position.

54. In a calculating machine, an item register comprising a series of digit bars individually adjustable to bring any digit of any bar into a reading line, and movable in a group to bring them successively to adjusting position, an adjusting member which enters into coaction with each digit bar as it reaches adjusting position, and guiding means on either side of the adjusting position which mesh with said bars and resist individual adjusting movement in them when on either side of said adjusting position; said adjusting means comprising a toothed wheel, and said guiding means beyond the wheel comprising a rail lying in continuation of a tooth of the wheel.

55. In a calculating machine, an item register comprising a series of digit bars each having a rack and being individually adjustable to bring any digit of any bar into a reading line, and movable in a group to bring them sucessively to adjusting position, an adjusting member comprising a gear wheel which enters laterally into coaction with each digit bar as it reaches adjusting position, guiding means on either side of the adjusting position which mesh with said bars and resist individual adjusting movement in them when on either side of said adjusting position, keys adapted to impart varying throw to the adjusting member at will, and an escapement controlling the bodily movement of the bars; said escapement being controlled by said keys.

56. In a calculating machine, an item register comprising a series of digit bars each having a rack and being individually adjustable to bring any digit of any bar into a reading line, and movable in a group to bring them successively to adjusting position, an adjusting member comprising a gear wheel which enters laterally into coaction with each digit bar as it reaches adjusting position, guiding means on either side of the adjusting position which mesh with said bars and resist individual adjusting movement in them when on either side of said adjusting position, keys adapted to impart varying throw to the adjusting member at will, and an escapement controlling the bodily movement of the bars; said escapement being controlled by said keys, and being effected in part as the key moves in one direction and completed as the key returns.

57. In a calculating machine, an item register comprising a series or digit bars individually adjustable to bring any digit of any bar into a reading line, and movable in a group to bring them successively to adjusting position, an adjusting member which enters into coaction with each digit bar as it reaches adjusting position, guiding means which mesh with said bars and resist individual adjusting movement in them when on either side of said adjusting position, keys adapted to impart varying throw to the adjusting member at will, and an escapement controlling the bodily movement of the bars; said escapement being controlled by said keys, and being effected in part as the key moves in one direction and completed as the key returns, a portion of the item register feed together with the release of the bar from the guiding means, and its adjustment by the adjusting member being incident to the first movement of the key, and the completion of the feed and the reëngagement of the bar by the guiding means being incident to the return movement of the key.

58. In a machine of the character described, a total register, a carriage having flat bars independently movable across the carriage adapted to control the elements of said total register and movable step by step to bring it into controlling positions, a decimal register embodying a plurality of independently movable registering elements, and a common setting device for the elements of the decimal register, brought into controlling relation with said elements, successively, by the step-by-step movement of the carriage.

59. In a machine of the character described, a total register, a carriage adapted to control the elements of said total register and movable step by step to bring it into controlling positions, a decimal register embodying a plurality of independently movable registering elements, and a common setting device for the elements of the decimal register, brought into controlling relation with said elements, successively, by the step-by-step movement of the carriage; said decimal register setting device comprising a pawl moving with the carriage to bring it into its successive operating positions, but having a setting thrust independently of the carriage through which it imparts setting movements.

60. In a machine of the character described, a total register, a carriage adapted to control the elements of said total register and movable step by step to bring it into controlling positions, a decimal register embodying a plurality of independently movable registering elements, a common setting device for the elements of the decimal register, brought into controlling relation with said elements, successively, by the step-by-step movement of the carriage, and means for developing the setting thrust in said decimal register setting device, having a fixed location but maintaining its control over said setting device in all positions of the latter.

61. In a machine of the character described, a total register, a carriage adapted to control the elements of said total register and movable step by step to bring it into controlling positions, a decimal register embodying a plurality of independently movable registering elements, a common setting device for the elements of the decimal register, brought into controlling relation with said elements, successively, by the step-by-step movement of the carriage, an operating handle for developing registering movements predetermined by the carriage, and means for developing the setting thrust of the decimal register setting device, having a connection through which it is energized by said operating handle.

62. In a machine of the character described, a total register, a carriage adapted to control the elements of said total register and movable step by step to bring it into controlling positions, a decimal register embodying a plurality of independently movable registering elements, a common setting device for the elements of the decimal register, brought into controlling relation with said elements, successively, by the step-by-step movement of the carriage, an operating handle for developing registering movements predetermined by the carriage, and means for developing the setting thrust of the decimal register setting device, having a connection through which it is energized by said operating handle; said operating handle also having connection through which it returns the carriage to normal position, and its connection through which it develops the decimal register setting thrust being automatically released previous to the resetting of the carriage.

63. In a machine of the character described, a total register, an item carriage having a step-by-step feeding movement through which it is brought into control with the constituent elements of the total register, successively, an operating handle for developing in said total register elements, calculating movements predetermined by the carriage, reversing mechanism determining the direction in which the total register elements shall move, a decimal register, a decimal register actuating device on said item carriage common to all the elements of the decimal register and brought into controlling relation with them successively, by the feeding movements of the carriage; said decimal register actuating device being adapted to set the decimal register elements in the same direction, notwithstanding changes in the direction of setting movements in the total register.

64. In a machine of the character described, a total register, an item carriage having individual register controlling elements comprising independently movable flat bars adjustable on the carriage to determine the value of the movements of the total register elements, said carriage having a selective feeding movement to position its controlling elements in controlling relation to the different total register elements, at will, a decimal register, and a decimal register actuating device common to all the decimal register elements, and brought by the feeding movement of the carriage into actuating relation with each decimal register element, as the corresponding decimally located element of the total register is brought into controlled relation to a carriage element; said decimal register actuating device having a straight line feeding movement notwithstanding the individual adjustments of the carriage elements.

65. In a calculating machine, the combination of counting mechanism, an item-register carriage having independently actuated flat bars with indicia upon the visible faces thereof and adapted to have set up thereon, an item that is to enter repeatedly into a calculation to be worked in the counting mechanism, and adapted to assume controlling relation to the counting mechanism in varying positions of decimal relationship thereto, and a back spacer for said carriage.

66. In a calculating machine, the combination of counting mechanism, an item-register carriage having independently actuated flat bars with indicia upon the visible faces thereof and adapted to have set up thereon, an item that is to enter repeatedly into a calculation to be worked in the counting mechanism, and adapted to assume controlling relation to the counting mechanism, means for feeding the carriage forwardly at will and thereby placing it in varying positions of decimal relationship thereto, and a back spacer for said carriage.

67. In a calculating machine, the combination of counting mechanism, an item-register carriage having independently actuated flat bars with indicia thereon adapted to have set up thereon, an item that is to enter repeatedly into a calculation to be worked in the counting mechanism, and adapted to assume controlling relation to the counting mechanism in varying positions of decimal relationship thereto, and a back spacer for said carriage, there being an indicator coacting with the readings of the counting mechanism and subject to the back-spacing action upon the carriage.

68. In a calculating machine, the combination of counting mechanism, an item register comprising a carriage having independently actuated flat rack bars with indicia thereon adapted to have set up thereon, an item that is to enter into the calculation repeatedly but in different decimal relations thereto, operating means for working the item into the calculation, a decimal register having actuating means and adapted to indicate the number of times the item is introduced, a spacer for shifting the position of the item-register carriage to the different decimal positions relatively to the counting mechanism, and connections through which the decimal register actuating means are correspondingly shifted decimally.

69. In a calculating machine, the combination of counting mechanism, an item register comprising a carriage having independently actuated flat rack bars with indicia thereon adapted to have set up thereon, an item that is to enter into the calculation repeatedly but in different decimal relations thereto, operating means for working the item into the calculation, a decimal register having actuating means and adapted to indicate the number of times the item is introduced, and a spacer for shifting the position of the item-register carriage to the different decimal positions relatively to the counting mechanism; said decimal register actuating means being mounted on the item-register carriage and being thereby shifted in decimal relation to its register, correspondingly with changes in the relation of the item register to the counting mechanism.

70. In combination with printing elements, adjustable to express items entering into a transaction to be printed, an item register comprising a carriage having independently operated flat bars moving lengthwise and adapted to have items set up therein and movable to different positions of decimal relationship to said printing elements and when in such positions, to control the adjustment of the same, spacing means adapted to establish the positions of said item register at will, a decimal register and actuating means for the decimal register automatically adjusting conformably with the item register.

71. A calculating machine comprising printing wheels adapted to be adjusted to express a number, blades for said printing wheels each having a counter-driving stroke and an idling or setting stroke to determine the value of the driving stroke, a detent normally retaining the blades at the end of their driving strokes, a projector for each blade automatically imparting its idling stroke to the printing wheel whenever it is released, an adjustable stop carriage consisting of a plurality of rack bars shiftable laterally in mass and longitudinally individually to determine the value of the idling stroke, said bars being in the path of the blades when an item has been expressed on the machine, the longitudinal movement of the bar actuated determining the value of the same movement of the blade, a figure key for operating the bar and an actuator to impart a driving stroke to the blade.

72. A calculating machine comprising printing wheels adapted to be adjusted to express a number, blades for said printing wheels, each having a counter-driving stroke and an idling or setting stroke to determine the value of the driving stroke, a detent normally retaining the blades at the ends of their driving stroke, a projector for each blade automatically imparting its idling stroke whenever it is released, figure keys for determining the items to be counted, adjustable stop mechanism comprising bars shiftable laterally in mass and longitudinally individually by means of said keys to determine the value of the idling stroke, said bars being in the path of the blades when an item has been expressed on the machine, the longitudinal movement of each bar determines the value of a particular setting movement, and an actuator which imparts the driving stroke to the blades; the actuator being effective to release the detent.

73. A calculating machine comprising counters adapted to be adjusted to express a number, blades for said counters, each having a counter-driving stroke and an idling or setting stroke to determine the value of the driving stroke, a detent normally retaining the blades at the ends of their driving strokes, a projector for each blade automatically imparting its idling stroke whenever it is released, figure keys for determining the items to be counted, adjustable stop mechanism adapted to be positioned by said keys in the path of the blades, to determine the value of the setting movements, and an actuator which imparts the driving stroke to the blades; said actuator being also adapted to release said detent, and having a preliminary movement by which it releases the detent, and a subsequent movement by which it imparts the drive to the blades.

74. A calculating machine comprising counters adapted to be adjusted to express a number, blades for said counters, each having a counter-driving stroke and an idling or setting stroke to determine the value of the driving stroke, a detent normally retaining the blades at the ends of their driving strokes, a projector for each blade automatically imparting its idling stroke whenever it is released, figure keys for determining the items to be counted, adjustable stop mechanism adapted to be positioned by said keys in the path of the blades, to determine the value of the setting movements, and an actuator which imparts the driving stroke to the blades; said blades being adapted to assume a plurality of driving relations to said counters and a shifter being provided for shifting said blades into their several said relations.

75. A calculating machine comprising counters adapted to be adjusted to express a number, blades for said counters, each having a counter-driving stroke and an idling or setting stroke to determine the value of the driving stroke, a detent normally retaining the blades at the ends of their driving strokes, a projector for each blade automatically imparting its idling stroke whenever it is released, figure keys for determining the items to be counted, adjustable stop mechanism adapted to be positioned by said keys in the path of the blades, to determine the value of the setting movements, and an actuator which imparts the driving stroke to the blades; said blades being adapted to assume a plurality of driving relations to said counters and a shifter being provided for shifting said blades into their several said relations; said shifter being also controlled by the actuator.

76. A calculating machine comprising counters adapted to be adjusted to express a number, blades for said counters, each having a counter-driving stroke and an idling or setting stroke to determine the value of the driving stroke, a detent normally retaining the blades at the ends of their driving strokes, a projector for each blade automatically imparting its idling stroke whenever it is released, figure keys for determining the items to be counted, adjustable stop mechanism adapted to be positioned by said keys in the path of the blades, to determine the value of the setting movements, and an actuator which imparts the driving stroke to the blades; said blades being adapted to assume a plurality of driving relations and a non-drive relation to said counters, and a shifter being provided for shifting said blades into their several said relations.

77. A calculating machine comprising counters adapted to be adjusted to express a number, blades for said counters, each having a counter-driving stroke and an idling or setting stroke to determine the value of the driving stroke, a detent normally retaining the blades at the ends of their driving strokes, a projector for each blade automatically imparting its idling stroke whenever it is released, figure keys for determining the items to be counted, adjustable stop mechanism adapted to be positioned by said keys in the path of the blades, to determine the value of the setting movements, and an actuator which imparts the driving stroke to the blades; said blades being adapted to assume a plurality of driving relations to said counters, and a shifter being provided for shifting said blades into their several said relations; said shifter being also controlled by the actuator, and a key-controlled directing connection being provided for varying the presentation of the shifter to the actuator.

78. A calculating machine comprising counters adapted to be adjusted to express a number, blades for said counters, each having a counter-driving stroke and an idling or setting stroke to determine the value of the driving stroke, a detent normally retaining the blades at the ends of their driving strokes, a projector for each blade automatically imparting its idling stroke whenever it is released, figure keys for determining the items to be counted, adjustable stop mechanism adapted to be positioned by said keys in the path of the blades, to determine the value of the setting movements, and an actuator which imparts the driving stroke to the blades; said blades being adapted to assume a plurality of driving relations to said counters and a shifter being provided for shifting said blades into their several said relations; said shifter being also controlled by the actuator; said driving relations being appropriate, respectively, for addition and subtraction.

79. A calculating machine comprising counters adapted to be adjusted to express a number, blades for said counters, each having a counter-driving stroke and an idling or setting stroke to determine the value of the driving stroke, a detent normally retaining the blades at the ends of their driving strokes, a projector for each blade automatically imparting its idling stroke whenever it is released, figure keys for determining the items to be counted, adjustable stop mechanism adapted to be positioned by said keys in the path of the blades, to determine the value of the setting movements, and an actuator which imparts the driving stroke to the blades; said blades being adapted to assume a plurality of driving relations to said counters, and a shifter being provided for shifting said blades into their several said relations; said shifter being also controlled by the actuator; said driving relations being appropriate, respectively, for addition and subtraction, and the shifter being normally in position to receive the actuator in the relation to cause the addition drive of the counters.

80. A calculating machine comprising counters, printing wheels adjustable to express a number, total rack-toothed blades for said printing wheels, each having a counter-driving stroke and an idling or setting stroke to determine the value of the driving stroke, a detent normally retaining the blades at the ends of their driving strokes, a projector for each blade automatically imparting its idling stroke whenever it is released, figure keys for determining the items to be counted, adjustable stop mechanism comprising a carriage having bars movable en masse transversely to the machine and independent across its carriage and adapted to be adjusted by said keys in the path of the blades, to determine the value of the setting movements, and an actuator which imparts the driving stroke to the blades; said counters being disposed in controlled relation to said blades and detachable therefrom at the ends of the driving strokes, and being thereby adapted to accumulate numerical items transmitted thereto by successive working strokes of the blades as predetermined by the adjustment of said carriage bars.

81. A calculating machine comprising counters, consisting of accumulating printing wheels adapted to be adjusted to express a number, blades for said counters, a projector for each blade, figure keys for determining the items to be counted, and adjustable item carriage comprising bars movable in a plane coincident with the plane of the blades, said bars being movable in mass in one direction and individually in another direction, and means for effecting the relative movements of the bars both in mass and individually.

82. A calculating machine comprising printing counters adapted to be adjusted to express a number, blades for said counters, each having a counter-driving stroke and an idling or setting stroke to determine the value of the driving stroke, a detent normally retaining the blades at the ends of their driving strokes, a projector for each blade automatically imparting its idling stroke whenever it is released, figure keys for determining the items to be counted, adjustable stop mechanism adapted to be positioned by said keys in the path of the blades, to determine the value of the setting movements, and an actuator which imparts the driving stroke to the blades; said counters being left by the blades at the ends of the driving strokes and being thereby adapted to accumulate numerical items transmitted thereto by successive working strokes of the blades, and said machine being provided with a second set of counters, which are actuated by the idling or automatic stroke of the blades to give temporary expression to an item introduced into the machine, and returned to cleared position by the working stroke of the blades, and printing mechanism, operated by the actuator, being provided in operative relation to the second counters, and timed to act after release and automatic projection of the blades.

83. A calculating machine comprising counters, adapted to be adjusted to express a number, blades for said counters, a detent normally retaining the blades against movement, a projector for each blade tending to impart movement thereto, figure keys to determine the items to be counted, and adjustable item carriage comprising a carriage movable across the machine and having flat bars thereon and lying in the same horizontal plane as the blades, said bars being responsive to the keys to move longitudinally to serve as adjustable abutments for the blades, an actuator for imparting a driving stroke to the blades and carrying mechanism associated with the counters to transmit from each counter to the next values in excess of its range of movement.

84. A calculating machine comprising counters adapted to be adjusted to express a number, blades for said counters, each having a counter-driving stroke and an idling or setting stroke to determine the value of the driving stroke, a detent normally retaining the blades at the ends of their driving strokes, a projector for each blade automatically imparting its idling stroke whenever it is released, figure keys for determining the items to be counted, adjustable stop mechanism normally in the path of the blades adapted to be positioned by said keys, to determine the value of the setting movements, and an actuator which imparts the driving stroke to the blades; said counter comprising figure wheels, and driving and control wheels meshing with said figure wheels, which mesh with the blades during the driving stroke of the latter.

85. A calculating machine comprising counters adapted to be adjusted to express a number, blades for said counters, each having a counter-driving stroke and an idling or setting stroke to determine the value of the driving stroke, a detent normally retaining the blades at the ends of their driving strokes, a projector for each blade automatically imparting its idling stroke whenever it is released, figure keys for determining the items to be counted, adjustable stop mechanism adapted to be positioned by said keys in the path of the blades, to determine the value of the setting movements, and an actuator which imparts the driving stroke to the blades; said counter comprising figure wheels, control wheels located beneath and meshing with the figure wheels and coacting with the blades, carrying wheels located beneath and meshing with the control wheels, and carrying mechanism coacting with said carrying wheels.

86. In a calculating machine, a suitable actuator, a counter wheel to be actuated, and a drive blade for said wheel constructed with a pair of parallel racks adapted to separately mesh with said wheel, and shifting means for bringing either rack into mesh at will, comprising a cam lever controlling said rack, a camming projection connected with the actuator, and a key-controlled directing device for presenting the cam lever in different relations to the camming projection at will.

87. In a calculating machine, a suitable actuator, a series of counter wheels to be actuated, a series of rack bars, each having two racks adapted separately to coact with a corresponding wheel, means for shifting the rack bars to bring either of their racks into mesh at will, and means for controlling the throws of the respective racks to accord with a numerical item to be counted, comprising an item register embodying a series of stop bars adapted to coact with and control the rack bars when in either of their meshing positions.

88. In a calculating machine, a suitable actuator, counting wheels to be actuated, drive blades for said wheels, having an automatic movement in one direction, and projectors for said blades, comprising levers connected with the blades, springs for throwing said levers, and a detent common to all said levers, resisting the action of their springs, said detent being adapted to release the levers independently of any movement of the actuator.

89. In a device of the character described, the combination of a printing register, a total register, an item register, a shiftable carrying mechanism for the total register and a shiftable setting means for the total register adapted to assume any one of the three positions which respectively adapt the setting means to drive the total register in the direction of adding, or to leave the total register at rest, or to engage it in the direction of subtracting, said total register setting means being adapted to also shift said carrying mechanism, and a controlling lever adapted to position said setting means at will.

90. In a device of the character described, the combination of a printing register, a total register, an item register, an alining means for the total register, and a shiftable setting means for the total register adapted to assume any one of the three positions which respectively adapt the setting means to drive the total register in the direction of adding, or to leave the total register at rest, or to engage it in the direction of subtracting, and a controlling lever adapted to position said setting means at will; said setting means comprising pinions in driving relation to the total register elements, and reciprocating bars each having a pair of oppositely presented racks on opposite sides of its pinion; said bars being movable to bring either rack of each bar into mesh with its pinion, and each pinion being yieldingly held by said alining means in a position to mesh with said rack blades at the end of any of their several adding positions.

91. In a device of the character described, the combination of a printing register, a total register, an item register, and a setting means for the total register adapted to assume any one of the three positions which respectively adapt the setting means to drive the total register in the direction of adding, or to leave the total register at rest, or to engage it in the direction of subtracting, and a controlling lever adapted to position said setting means at will; said setting means having driving connection with the printing register when in all of its three said positions; said setting means comprising pinions in driving relation to the total register elements, and reciprocating bars each having a pair of oppositely presented racks on opposite sides of its pinion, a shiftable cage for guiding said bars at one end and a pin positioned in a slot in the bars for guiding the other end; said bars being movable to bring either rack of each bar into mesh with its pinion; said bars having racks meshing with sectors of the printing register, said guiding pin being tangential to the axis of the sector at the meshing point.

92. In a machine of the character described, a printing register, comprising a plurality of figure-bearing elements having sectors through which to set them, reversibly shiftable reciprocating bars having double racks meshing with said sectors, whereby they impart setting movements and return movements to the printing register, means for making an impression from the printing register at the end of the setting movement and before the return movement of the printing elements, and means for controlling the setting movements of the rack bars at will, and means for alining the figures on the figure bearing elements on the printing line.

93. In a machine of the character described, a printing register, a total register, reversibly shiftable double rack bars serving in common for the elements of the printing register and those of the total register, and means for limiting the throw of the rack bars in one direction; said rack bars being in constant mesh with the elements of the printing register and having means for throwing them out of mesh with the elements of the total register during their movements in the direction opposite to that in which the length of their throw is controlled.

94. In a machine of the character described, a register comprising a series of individually adjustable digit members, each carrying a series of figures and all being associated in relation to adapt them to present any of their figures in a predetermined expression line and in proper decimal relation to express any desired number within the decimal capacity of the register; the figures on said digit members including zeros and said zeros being normally out of the expression line, whereby numbers varying in length decimally may be printed with or without zeros at either end thereof, and a total register controlled by the same setting means, bearing figures including zeros which are normally in the expression line; said setting means having lost motion connections with the total register, whereby initial setting movements sufficient to bring zeros into the printing line will leave the total register undisturbed and permit the two registers to be set to read in consonance.

95. In a machine of the character described, a register comprising a series of individually adjustable digit members, each carrying a series of figures and all being associated in relation to adapt them to present any of their figures in a predetermined expression line and in proper decimal relation to express any desired number within the decimal capacity of the register; the figures on said digit members including zeros and said zeros being normally out of the expression line, whereby numbers varying in length decimally may be printed with or without zeros at either end thereof, a series of actuating members, one for each digit member, adapted to impart varying ranges of adjustment thereto, necessary to bring their respective digits or figures in the expression line; these actuating members having a preliminary setting movement and a common range of actuating movement, and their actuating movements being varied by changing their points of arrest in their setting movement.

96. In a machine of the character described, a register comprising a series of individually adjustable digit members comprising flat bars movable across the machine collectively and longitudinally independently, each carrying a series of figures and all being associated in relation to adapt them to present any of their figures in a predetermined expression line and in proper decimal relation to express any desired number within the decimal capacity of the register; the figures on said digit members including zeros and said zeros being normally out of the expression line, whereby numbers varying in length decimally may be printed with or without zeros at either end thereof, and means being provided for selectively locating decimal point characters relatively to such numbers.

97. A calculating machine having register members, printing members normally positioned with their zeros out of printing line, common setting means for the respective register members and the corresponding printing members, said setting means having zero-setting throws each adapted to set its controlled printing member with the zero in the printing line, but with lost motion connection with the register members that leaves the latter in undisturbed positions.

98. A calculating machine having register members, printing members normally positioned with their zeros out of printing line, common setting means for the respective register members and the corresponding printing members, said setting means having zero-setting throws each adapted to set its controlled printing member with the zero in the printing line, but with lost motion connection with the register members that leaves the latter in undisturbed positions, and a zero key adapted to develop the zero throws in said setting members by imparting only lateral movement thereto.

99. A calculating machine having register members, printing members normally positioned with their zeros out of printing line, common setting means for the respective register members and the corresponding printing members, said setting means having zero-setting throws each adapted to set its controlled printing member with the zero in the printing line, but with lost motion connection with the register members that leaves the latter in undisturbed positions, and a zero key adapted to develop the zero throws in a plurality of said setting devices simultaneously.

100. A calculating machine having register members, printing members normally positioned with their zeros out of printing line, common setting means for the respective register members and the corresponding printing members, said setting means having zero-setting throws each adapted to set its controlled printing member with the zero in the printing line, but with lost motion connection with the register members that leaves the latter in undisturbed positions, and a plurality of zero keys adapted to develop zero throws in said setting members individually or in a plurality of said setting members simultaneously at will.

101. A calculating machine having register members, printing members normally positioned with their zeros out of printing line, common setting means for the respective register members and the corresponding printing members, said setting means having zero-setting throws each adapted to set its controlled printing member with the zero in the printing line, but with lost motion connection with the register members that leaves the latter in undisturbed positions, and stop members at all times in the path of and controlling said setting members.

102. A calculating machine having register members, printing members normally positioned with their zeros out of printing line, common setting means for the respective register members and the corresponding printing members, said setting means having zero-setting throws each adapted to set its controlled printing member with the zero in the printing line, but with lost motion connection with the register members that leaves the latter in undisturbed positions, and stop members adapted to be fed into controlling positions with respect to the several setting members, adjustable to determine the throws of the setting members, but constructed to permit said zero-throws without such adjustment.

103. A calculating machine having register members, printing members normally positioned with their zeros out of printing line, common setting means for the respective register members and the corresponding printing members, said setting means having zero-setting throws each adapted to set its controlled printing member with the zero in the printing line, but with lost motion connection with the register members that leaves the latter in undisturbed positions, a barrier normally barring the setting members but movable therefrom step by step, stop bars movable step by step into alinement with the setting members, and spaced from the latter when in controlling positions sufficient to permit said zero throws.

104. A calculating machine having register members, printing members normally positioned with their zeros out of printing line, common setting means for the respective register members and the corresponding printing members, said setting means having zero-setting throws each adapted to set its controlled printing member with the zero in the printing line, but with lost motion connection with the register members that leaves the latter in undisturbed positions, a barrier normally barring the setting members but movable therefrom step by step, stop bars movable step by step into alinement with the setting members, and spaced from the latter when in controlling positions sufficient to permit said zero throws, and setting and zero keys, all of which are adapted to develop step-by-step feeding movement in the stop bars, the setting keys being also adapted to develop adjusting movements in the stop bars to vary at will the setting throws of the setting members.

105. A calculating machine having register members, printing members normally positioned with their zeros out of printing line, common setting means for the respective register members and the corresponding printing members, said setting means having zero-setting throws each adapted to set its controlled printing member with the zero in the printing line, but with lost motion connection with the register members that leaves the latter in undisturbed positions, each of said setting members comprising a full-tooth rack with coacting pinions connected, respectively, with the printer and the register; the last tooth of the rack driving the register pinion being stubbed to permit said lost motion.

106. In a calculating machine, in combination with a decimally-shiftable item register and a total register; a decimally shiftable punctuator associated with both registers.

107. In a calculating machine, in combination with a decimally-shiftable item register and a total register; a decimally shiftable punctuator associated with both registers, and pointing off the same decimal punctuation on both registers.

108. In a calculating machine, in combination with an item register and a total register; a decimally shiftable punctuator associated with both registers, and having for each of said registers, a plurality of decimal pointers.

109. In a calculating machine, in combination with an item register and a total register; a decimally shiftable punctuator associated with both registers, and having for each of said registers, a plurality of decimal pointers, with three digit spaces between adjacent pointers.

110. In a calculating machine, in combination with an item register and a total register; a decimally shiftable punctuator associated with both registers, and having a movement limit in one direction which positions it to divide off hundredths of a whole number or cents, and at the same time to divide hundreds from thousands in the integer expressed.

111. In a calculating machine, in combination with an item register and a total register; a decimally shiftable punctuator associated with both registers, and having a movement limit in one direction which positions it to divide off hundredths of a whole number or cents, and at the same time to divide hundreds from thousands in the integer expressed, and movable in the other direction to divide all the figures expressed into groups of three.

112. In a calculating machine, in combination with an item register and a total register having their respective digit positions superposed; a decimally shiftable punctuator located between said registers and having two oppositely presented sets of pointers, whereby it is associated with both registers.

113. In a calculating machine, in combination with an item register and a total register having their respective digit positions superposed; a decimally shiftable punctuator located between said registers and having two oppositely presented sets of pointers, whereby it is associated with both registers; said punctuator having an intermediate sliding mounting.

114. In a calculating machine having a plurality of registers one of which is decimally shiftable, both adapted to express the same transaction, a punctuator for each register, and a connection between the punctuators causing them to punctuate the transactions in consonance.

115. In a calculating machine having a plurality of registers, both adapted to express the same transaction, a punctuator for each register, and a connection between the punctuators causing them to punctuate the transactions in consonance; one of said registers and its associated punctuator comprising printing characters.

116. In a calculating machine having a plurality of registers, both adapted to express the same transaction, a punctuator for each register, and a connection between the punctuators causing them to punctuate the transactions in consonance; one of said registers and its associated punctuator comprising printing characters, and the other register being a totalizing register and having its punctuator associated therewith as an indicator.

117. In a calculating machine having a plurality of registers, both adapted to express the same transaction, a punctuator for each register, and a connection between the punctuators causing them to punctuate the transactions in consonance; one of said registers and its associated punctuator comprising printing characters, and the other of said indicators being an item indicator.

118. In a calculating machine having a plurality of registers, both adapted to express the same transaction, a punctuator for each register, and a connection between the punctuators causing them to punctuate the transactions in consonance; one of said indicators and its associated punctuator comprising printing characters, another of said registers being a total register and having its punctuator associated therewith as an indicator, and a third of said registers being an item register and having its punctuator associated therewith as an indicator.

119. In a calculating machine, a printing mechanism embodying separately adjustable printing members, each having printing characters including zeros but normally occupying positions with their zeros out of the printing line; setting means for the printing members, a plurality of digit keys acting through said setting means to control different groups of printing members simultaneously, to introduce their zeros into a plurality of decimal positions.

120. In a calculating machine, a printing mechanism embodying separately adjustable printing members, each having printing characters including zeros but normally occupying positions with their zeros out of the printing line; setting means for the printing members, digit keys, and means through which the keys control the setting means, adapted to introduce zeros to the printing line, and a series of punctuation printing means adjustable to different decimal positions relatively to the printing members, whereby both zeros and decimal points may be printed, both before and after other figures at will, and decimals, whole numbers and mixed numbers may be expressed in proper vertical alinement.

121. In a calculating machine, the combination of an item register, a total register having its transactions determined by said item register, a printing mechanism adapted to record the transaction expressed by the total register, an actuating mechanism adapted to control both the item and total registers and the printing mechanism, and means for disconnecting said actuating mechanism from the printing mechanism and permitting it to control the registers alone; there being a setting means through which the actuating mechanism controls the total register, and blanking means through which it controls the item register.

122. In a calculating machine, a plurality of printing members, each having printing characters including naughts, and normally positioned to exclude their naughts from the printing line; printing member movers normally tending to move the several printing members across the printing line; a bar normally resisting all of these movers but withdrawing from them successively, commencing with the decimally lowest; a single stop member for each mover, normally a zero throw, for said mover, from said bar, replacing the bar in controlling relation to its mover as the bar withdraws therefrom; and means for setting the stop members at will to determine the value of the throws which they respectively permit in the printing member movers.

123. In a calculating machine, a plurality of printing members, each having printing characters; printing member movers normally tending to move the several printing members across the printing line; a single stop member for each mover, normally a zero throw, for said mover, from said bar, replacing a bar normally in controlling relation to its mover as the bar withdraws therefrom; and means for setting the stop members at will to determine the value of the throws which they respectively permit in the printing member movers.

124. In a calculating machine, a plurality of printing members, each having printing characters; printing member movers normally tending to move the several printing members across the printing line; a single stop member for each mover, normally a zero throw, for said mover, from said bar, replacing a bar normally in controlling relation to its mover as the bar withdraws therefrom; and means for setting the stop members at will to determine the value of the throws which they respectively permit in the printing member movers; said movers having locking means normally resisting their throws, and means being provided for releasing said locking means after the stop members are set.

125. In a calculating machine, a plurality of printing members, each having printing characters; printing member movers normally tending to move the several printing members across the printing line; said movers having locking means normally resisting their throws, and means being provided for releasing said locking means after the stop members are set; a bar normally resisting these movers but withdrawing from them successively, commencing with the decimally lowest; a single stop member for each mover replacing a bar normally in controlling relation to its mover as the bar withdraws therefrom, and means for setting the stop members at will to determine the value of the throws which they respectively permit in the printing member movers.

126. In a calculating machine, a plurality of printing members, each having printing characters; printing member movers normally tending to move the several printing members across the printing line; a single stop member for each mover replacing a bar normally in controlling relation to each mover as the bar withdraws therefrom; and means for setting the stop members at will to determine the value of the throws which they respectively permit in the printing member movers; said movers having locking means normally resisting their throws, and means being provided for releasing said locking means after the stop members are set; and an operating handle having connections through which it replaces the mover-locking means during an earlier part of its throw, and connections through which it returns the printing members by a later part of its throw.

127. In a calculating machine, a plurality of printing members, each having printing characters; printing member movers normally tending to move the several printing members across the printing line; said movers having locking means normally resisting their throws, and means being provided for releasing said locking means after the stop members are set; a bar normally resisting these movers but withdrawing from them successively, commencing with the decimally lowest; stop members constituting slidable racks, normally permitting zero throws of the printing members, replacing the bar in controlling relation to each mover as the bar withdraws therefrom, and means for setting the stop members at will to determine the value of the throws which they respectively permit in the printing member movers, and an operating handle having connections through which it releases the mover-locking means during an earlier part of its throw, and connections through which it returns the printing members by a later part of its throw, and a printing platen coacting with said printing members, and having connections through which it is controlled by said operating handle at a time in the movement of said handle between the release of the mover locking means and the return of the printing members.

128. In a calculating machine, printing mechanism comprising a platen for developing an impression, a plurality of decimally related printing members, each bearing a series of figure-printing characters and normally positioned to exclude its characters from the printing line, inter-decimally located supporting ledges between adjacent printing members, and movable therewith across the printing line as the characters are brought to printing position, and punctuation-printing members, having point-printing characters positioned in the printing line in planes of the supporting ledges, mounted to yield in the direction of printing pressure, but overlying and supported, each by an inter-decimal ledge, when a correspondingly positioned printing member is adjusted to printing position.

129. In a calculating machine, a series of printing members, each having figure characters thereon, and punctuation printing means associated with said printing members and adapted to be shifted decimally in relation thereto.

130. A calculating machine having a register and a printer with printing zeros normally out of the printing line, a series of common setting devices, each adapted to control a register member and a printing member, and having a zero-setting throw with a lost motion connection with the register member sufficient to enable it to set the printing member with its zero on the printing line without moving the register member.

131. In a calculating machine, a series of printing members, each having figure characters thereon, and punctuation printing means associated with said printing members and adapted to be shifted decimally in relation thereto; said punctuation printing means being normally out of but movable into printing position.

132. In a calculating machine, a series of printing members, each having figure characters thereon, and punctuation printing means associated with said printing members and adapted to be shifted decimally in relation thereto; said punctuation printing means being normally out of but movable into printing position, and each figure-character printing-member being constructed to introduce to the printing position, a punctuation printing means located between it and the next lower figure-character printing-member, so that punctuation printing takes place only when there are figure characters printed beyond the same.

133. In a calculating machine, a series of figure-character printing-members arranged in decimal series, a punctuation character printing member movable decimally to adapt it to be introduced between any two of the figure-character printing-members; said punctuation-character printing member being normally out of printing position, and each figure-character printing member being also normally out of printing position and having means for moving the punctuation character into printing position by its own movement to printing position.

134. In a calculating machine, a series of figure-character printing-members arranged in decimal series, a punctuation-character printing member movable decimally to adapt it to be introduced between any two of the figure-character printing-members; said punctuation-character printing member being normally out of printing position, and each figure-character printing member being also normally out of printing position and having means for moving the punctuation character into printing position by its own movement to printing position; said last-named means comprising a cam projection on the side of the figure-character printing member adapted to engage beneath the punctuation-character printing member.

135. In a calculating machine, a series of figure-character printing-members arranged in decimal series, a punctuation-character printing member movable decimally to adapt it to be introduced between any two of the figure-character printing-members; said punctuation-character printing member being normally out of printing position, and each figure-character printing-member being also normally out of printing position and having means for moving the punctuation character into printing position by its own movement to printing position; said last-named means comprising a cam projection on the side of the figure-character printing-member adapted to engage beneath the punctuation-character printing member; and each of said figure-character printing-members being provided with a series of printing digits, any one of which is adapted to be brought to the printing line, and said cam being continued alongside of said digits to maintain the punctuation character in punctuating relation to any one of said digits.

136. In a calculating machine comprising a total counter, a decimal counter, an item counter, figure keys for setting up the item therein, shiftable double rack blades for transferring the item from the item counter to the total counter, shiftable tens carrying tappets for the total counter, and means for shifting said blades and tappets together at will.

137. In a calculating machine comprising a total counter, a decimal counter, an item selector carriage, figure keys for setting up the item therein, shiftable double rack blades for transferring the item set up in said selector carriage to the total counter, shiftable tens carrying tappets in said total counter, and means for shifting said blades and tappets together at will.

138. In a calculating machine comprising a total counter, a decimal counter, a step-by-step moving selector carriage, means for retracting said selector carriage step-by-step, figure keys for producing step-by-step movement of the selector carriage and setting up the item values therein; shiftable double rack blades for transferring the item set up in the selector carriage to said total counter, shiftable tens carrying tappets in said total counter, and means for shifting said blades and tappets at will.

139. In a calculating machine comprising a total counter, tens carrying means therefor, a decimal counter, a step-by-step laterally moving selector carriage, means for retaining in any advance position said selector carriage with an item set up therein, whereby the same may be held intact during successive operations of the actuating mechanism; rack blades for transferring the item set up on said selector carriage to the total counter and means for reversing the action of said blades, and of said tens carrying means, together at will.

140. In a calculating machine comprising a total counter, a decimal counter, a step-by-step laterally moving selector carriage, means for controlling the lateral position of said selector carriage with an item set up therein and held intact during successive operations of the actuating mechanism, rack blades for transferring the item set up on said selector carriage to the total counter, shiftable tens carrying tappets in said total counter, and means for shifting said blades and tappets together at will.

141. In a calculating machine comprising a total counter, a decimal counter, a step-by-step laterally moving selector carriage, means for controlling the lateral position of said selector carriage with an item set up therein held intact during successive operations of the actuating mechanism, rack blades for transferring the item set up on said selector carriage to the total counter, shiftable tens carrying tappets in said total counter, means for shifting said blades and tappets together at will, and means for expressing in the decimal counter, the number of transactions between the selector carriage and the total counter in each decimal position.

142. In a calculating machine comprising a total counter, a movable step-by-step selector carriage having shiftable racks thereon, figure keys to effect both the step-by-step movement of said carriage and a sliding movement of the said slidable stop racks, a distance equal to the value of the key chosen; shiftable double rack blades in the path of the shiftable stop racks of the said selector carriage in its advance position and in the path of a shiftable cross rail on said carriage in its retracted position, said shiftable rack blades being in driving relation with printing members carrying ciphers normally out of the printing line and which are adapted to be positioned in the printing line by allowing said double rack blades to abut the shiftable racks carried by the selector carriage.

143. In a calculating machine, the combination of counting mechanism, an item register adapted to have set up therein, an item that is to enter into the calculation repeatedly, but in different decimal relations thereto, operating means for working the item into the calculation, a decimal register having actuating means and adapted to indicate the number of times the item is introduced, a spacer for shifting the decimal position of the item relatively to the counting mechanism, connections through which the decimal register actuating means are correspondingly shifted decimally; and an indicator adapted to point off equal decimal places in the counting mechanism, item register and decimal register.

144. In a calculating machine, the combination of counting mechanism, an item register adapted to have set up therein, an item that is to enter into the calculation repeatedly, but in different decimal relations thereto, operating means for working the item into the calculation, a decimal register having actuating means and adapted to indicate the number of times the item is introduced, a spacer for shifting the decimal position of the item relatively to the counting mechanism, connections through which the decimal register actuating means are correspondingly shifted decimally; an indicator adapted to point off equal decimal places in the counting mechanism, item register and decimal register and means coöperating with the item register for shifting said indicator.

145. In a calculating machine of the character described a total register, a shiftable carriage in which an item to be repeatedly used in a calculation is set up, means for shifting said carriage, a decimal register for registering the number of times the item is used in the calculation in each decimal position and an actuating register adapted to register the total number of times the machine is operated.

146. A calculating machine comprising a total register, an item register, a decimal register, means for alining the item in the item register with the selected portion of the total register, means for covering certain portions of the item and total register, means for laterally shifting the item register and uncovering additional numbers in the total register due to realining by the item register movement, and means for actuating all the registers in unison independent of the item register.

147. In a calculating machine, a laterally moving item carriage, a rack thereon, a pawl for said rack and a key for oscillating said pawl laterally over the face of and free of said rack, and means connected with said rack to intercept the rack and effect a predetermined step escapement of said item carriage.

148. In a calculating machine, a laterally moving item carriage, a rack thereon, a retaining pawl for the rack, normally in mesh therewith, a retracted pawl normally out of mesh with the rack and a key for driving said latter pawl into mesh with the rack to retract said item carriage thereby one step.

149. In a calculating machine, a laterally movable item carriage having longitudinally movable rack bars thereon, keys for controlling the carriage and means for connecting the keys to the carriage, the arrangement of said keys constituting a row of keys to control the lateral movement of the carriage, two rows of keys for controlling the longitudinal movement of the rack bars, said two rows containing respectively the even numbers and the odd numbers of units.

150. In a calculating machine, a laterally moving item carriage having longitudinally movable rack bars thereon, keys for controlling the carriage, and means for connecting the keys to the carriage, the arrangement of the keys constituting a carriage controlling mechanism which contains a row of keys for controlling the lateral movement of the carriage, two rows of keys for controlling the longitudinal movement of the rack bars, said two rows containing respectively the even numbers and the odd numbers of units and an operating handle forming a cross bar which normally returns the carriage laterally and the rack bars longitudinally to their retracted position.

151. In a calculating machine, a total counter, an item counter, a decimal counter, an operating handle, a laterally shiftable item carriage, means for conveying the value of an item on the item carriage to the total counter and also common means thereon for actuating the decimal and the item counters during handle operation.

152. In a calculating machine, a total counter, an item counter, a decimal counter, an operating handle and a laterally shiftable item carriage, means for conveying the value of an item from the carriage to the total counter and also common means thereon for actuating the decimal and the item counters during handle operation, all of said means being actuated by the operating handle.

153. In a calculating machine, a total counter, having a reversible actuator therefor and a reversible tens carrying mechanism, a keyboard for determining the amount of the item to affect the total counter, a printing mechanism for recording the item determined by the keyboard and that of the total counter, and a key for reversing the actuator with the total counter and its tens carrying mechanism and for recording the amount in the total register, said key adapted to also determine whether the item to be recorded shall affect the total register or not.

154. In a calculating machine, a total counter having a double-rack reversible actuator therefor and having connected therewith a reversible tappet tens carrying mechanism, and means for simultaneously reversing both the actuator and the tappet.

The foregoing specification signed at Washington, District of Columbia, this fourteenth day of September, 1915.

JOSEPH H. BAIR.